United States Patent [19]
Wulf et al.

[11] Patent Number: 6,154,826
[45] Date of Patent: Nov. 28, 2000

[54] METHOD AND DEVICE FOR MAXIMIZING MEMORY SYSTEM BANDWIDTH BY ACCESSING DATA IN A DYNAMICALLY DETERMINED ORDER

[75] Inventors: William A. Wulf, Charlottesville, Va.; Sally A. McKee, Portland, Oreg.; Robert Klenke, Charlottesville, Va.; Andrew J. Schwab, Raleigh, N.C.; Stephen A. Moyer, Atlanta, Ga.; James Aylor, Charlottesville, Va.; Charles Young Hitchcock, E. Thetford, Vt.

[73] Assignee: University of Virginia Patent Foundation, Charlottesville, Va.

[21] Appl. No.: 08/808,355

[22] Filed: Feb. 28, 1997

Related U.S. Application Data

[63] Continuation-in-part of application No. 08/340,740, Nov. 16, 1994, abandoned.

[51] Int. Cl.[7] .................................................. G06F 9/26
[52] U.S. Cl. .......................... 711/217; 711/204; 711/167; 711/169
[58] Field of Search ................................ 345/418; 701/1; 395/500; 711/202, 100, 101, 109, 110, 163, 167, 132, 217, 204, 169; 710/52, 53

[56] References Cited

U.S. PATENT DOCUMENTS

| | | | |
|---|---|---|---|
| 4,325,120 | 4/1982 | Colley et al. | 711/202 |
| 4,821,181 | 4/1989 | Iwasawa et al. | 395/702 |
| 5,313,636 | 5/1994 | Noble et al. | 707/1 |
| 5,606,207 | 2/1997 | Tomassi et al. | 345/418 |

OTHER PUBLICATIONS

Tanenbaum, Structured Computer Organization, Second Edition, 1984, pp. 10–12.

*Primary Examiner*—B. James Peikari

[57] ABSTRACT

A data processing system is disclosed which comprises a data processor and memory control device for controlling the access of information from the memory. The memory control device includes temporary storage and decision ability for determining what order to execute the memory accesses. The compiler detects the requirements of the data processor and selects the data to stream to the memory control device which determines a memory access order. The order in which to access said information is selected based on the location of information stored in the memory. The information is repeatedly accessed from memory and stored in the temporary storage until all streamed information is accessed. The information is stored until required by the data processor. The selection of the order in which to access information maximizes bandwidth and decreases the retrieval time.

7 Claims, 65 Drawing Sheets

| VECTOR LENGTH | PERCENTAGE OF PEAK BANDWIDTH | | | | | | |
|---|---|---|---|---|---|---|---|
| | W/O SMC | SMC FIFO DEPTH | | | | | |
| | | 8 | 16 | 32 | 64 | 128 | 256 |
| 10 | 25.0 | 63.83 | 62.5 | 62.5 | 62.5 | 62.5 | 62.5 |
| 100 | | 78.53 | 85.71 | 87.98 | 80.43 | 73.53 | 73.53 |
| 10000 | | 79.94 | 88.78 | 93.97 | 96.75 | 98.11 | 98.53 |

FIG. 5

METHOD AND DEVICE FOR MAXIMIZING MEMORY SYSTEM BANDWIDTH BY ACCESSING DATA IN A DYNAMICALLY DETERMINED ORDER

RELATE BACK

This invention is a continuation-in-part of U.S. application Ser. No. 08/340,740 filed Nov. 16, 1994 which is now abandoned.

This invention was made with government support under NASA Grant NAG-1242 and NSF Grant MIP-9307626. The government may have certain rights in the invention.

BACKGROUND OF THE INVENTION

1. Field of the Invention

The instant invention relates to hardware-assisted access ordering to increase memory system performance for commercially available high-performance processors.

2. Brief Description of the Prior Art

Processor speeds are increasing much faster than memory speeds. Microprocessor performance has increased by 50% to 100% per year in the last decade, while DRAM performance has risen only 10–15% per year. Memory bandwidth is, therefore, rapidly becoming the performance bottleneck in the application of high performance microprocessors to vector-like algorithms, including many of the "grand challenge" scientific problems. Currently, it may take as much as 50 times as long to access a memory element than to perform an arithmetic operation once accessed. Alleviating the growing disparity between processor and memory speeds is the subject of much current research.

Prior art has centered on a mechanism called a "cache" which automatically stores the most frequently used data in a higher speed, smaller, and much more costly memory. The success of cache technology hinges on a property called "locality", which is the tendency for a program to repeatedly access data that is "close". Assuming locality, a cache can reasonably predict future memory accessed based on recent past references.

Although the addition of cache memory is often a sufficient solution to the memory latency and bandwidth problems in general purpose scalar computing, the vectors used in scientific computations are normally too large to cache, and many are not reused soon enough to benefit from caching. Furthermore, vectors leave large footprints in the cache. For computations in which vectors are reused, iteration space tiling can partition the problems into cache-size blocks, but this can create cache conflicts for some block sizes and vector strides, and the technique is difficult to automate. Caching non-unit stride vectors leaves even larger footprints, and may actually reduce a computation's effective memory bandwidth by fetching extraneous data. " . . . while data caches have been demonstrated to be effective for general-purpose applications . . . , their effectiveness for numerical code has not been established". Lam, Monica, et al, "The Cache Performance and Optimizations of Blocked Algorithms", Fourth International Conference on Architectural Support for Programming Languages and Systems, April 1991.

Software techniques such as reordering and "vectorization" via library routines can improve bandwidth by reordering requests at compile time. Such techniques cannot exploit run-time information and are limited by processor register resources.

The traditional scalar processor concern has been to minimize memory latency in order to maximize processor performance. For scientific applications, however, the processor is not the bottleneck. Bridging this performance gap requires changing the approach to the problem and concentrating on minimizing average latency over a coherent set of accesses in order to maximize the bandwidth for scientific applications.

While many scientific computations are limited by memory bandwidth, they are by no means the only such computations. Any computation involving linear traversals of vector-like data, where each element is typically visited only once during lengthy portions of the computation, can suffer. Examples of this include string processing, image processing and other DSP applications, some database queries, some graphics applications, and DNA sequence matching.

The assumptions made by most memory architectures simply don't match the physical characteristics of the devices used to build them. Memory components are usually assumed to require about the same amount of time to access any random location; indeed, it was this uniform access time that gave rise to the term RAM, or Random Access Memory. Many computer architecture textbooks specifically cultivate this view. Others skirt the issue entirely.

Somewhat ironically, this assumption no longer applies to modern memory devices as most components manufactured in the last ten to fifteen years provide special capabilities that make it possible to perform some access sequences faster than others. For instance, nearly all current DRAMs implement a form of page-mode operation. These devices behave as if implemented with a single on-chip cache line, or page (this should not be confused with a virtual memory page). A memory access falling outside the address range of the current DRAM page forces a new page to be accessed. The overhead time required to set up the new page makes servicing such an access significantly slower than one that hits the current page.

Other common devices offer similar features, such as nibble-mode, static column mode, or a small amount of SRAM cache on chip. This sensitivity to the order of requests is exacerbated in emerging technologies. For instance, Rambus, Ramlink, and the new DRAM designs with high-speed sequential interfaces provide high bandwidth for large transfers, but offer little performance benefit for single-word accesses.

For multiple-module memory systems, the order of requests is important on yet another level, successive accesses to the same memory bank cannot be performed as quickly as accesses to different banks. To get the best performance out of such a system, advantage must be taken of the architecture's available concurrency.

Most computers already have memory systems whose peak bandwidth is matched to the peak processor bus rate. But the nature of an algorithm, its data sizes, and placement all strongly affect memory performance. An example of this is in the optimization of numerical libraries for the iPSC/860. On some applications, even with painstakingly hand-crafted code, peak processor performance was limited to 20% by inadequate memory bandwidth.

A comprehensive, successful solution to the memory bandwidth problem must therefore exploit the richness of the full memory hierarchy, both its architecture and its component characteristics. One way to do this is via access ordering, which herein is defined as any technique for changing the order of memory requests to increase bandwidth. This is especially concerned with ordering a set of vector-like "stream" accesses.

There are a number of other hardware and software techniques that can help manage the imbalance between processor and memory speeds. These include altering the placement of data to exploit concurrency, reordering the computation to increase locality, as in "blocking", address transformations for conflict-free access to interleaved memory, software prefetching data to the cache, and hardware prefetching vector data to cache.

Memory performance is determined by the interaction of its architecture and the order of requests. Prior attempts to optimize bandwidth have focused on the placement of data as a way of affecting the order of requests. Some architectures include instructions to prefetch data from main memory into cache, referred to as software prefetching. Using these instructions to load data for a future iteration of a loop can improve processor performance by overlapping memory latency with computation, but prefetching does nothing to actually improve memory performance.

Moreover, the nature of memories themselves has changed. Achieving greater bandwidth requires exploiting the characteristics of the entire memory hierarchy; it cannot be treated as though it were uniform access-time RAM. Moreover, exploiting the memory's properties will have to be done dynamically—essential information (such as alignment) will generally not be available at compile time.

The difference between the foregoing prior art techniques and the instant disclosure is the reordering of stream accesses to exploit the architectural and component features that make memory systems sensitive to the sequence of requests.

Reordering can optimize accesses to exploit the underlying memory architecture. By combining compile-time detection of streams with execution-time selection of the access order and issue, the instant disclosure achieves near-optimal bandwidth for vector-like accesses relatively inexpensively. This complements more traditional cache-based schemes, so that overall effective memory performance need not be a bottleneck.

SUMMARY OF THE INVENTION

The method of rapid data accessing uses a data processor for processing information with memory for information storage in conjunction with a memory control device which controls the access of stored information from the memory. The memory control device is provided with temporary storage and decision ability which allows the memory control device to select an access order, prefetch and store the information. The temporary memory temporarily holds the prefetched information until required by the data processor. The information is subsequently sent to the data processor in the order required for use. The compiler detects the ability to use the memory control device in response to the requirements of the data processor for information stored in the memory. The decision ability determines the order to execute the memory accesses based on the location of stored data within the processor's memory. The information is repeatedly accessed from memory and stored in the temporary storage until all information is accessed and stored. The information is sent to the data processor, when requested, in the order required for use. The use of the memory control device to select the order in which to access information maximizes bandwidth and decreases the retrieval time. The information requirements detected by the memory control can be data vectors. The memory is can be multibank, interleaved or page-mode DRAMS.

BRIEF DESCRIPTION OF THE DRAWINGS

The advantages of the instant disclosure will become more apparent when read with the specification and the drawings, wherein:

FIG. 5 is a chart illustrating the performance effect of FIG. 4;

DETAILED DESCRIPTION OF THE INVENTION

Figure 1:
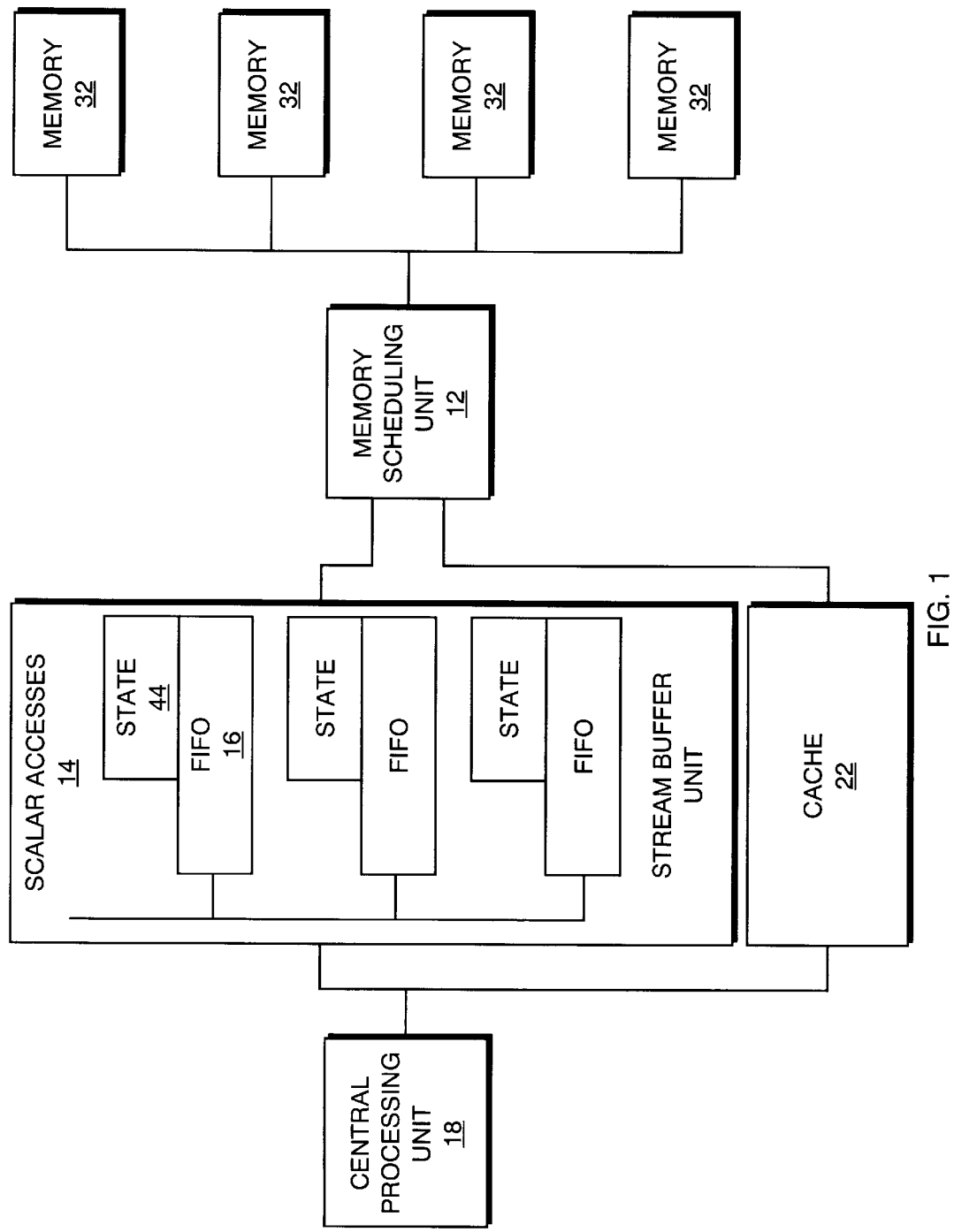
FIG. 1 is a plan view of the Stream Memory Controller.

The instant invention discloses the use of hardware-assisted access ordering on a uniprocessor system. Using the instant disclosure with current memory parts and only a few hundred words of buffer storage, nearly the full peak bandwidth that the memory system can deliver can be consistently achieved. Moreover, this is done with naive code, and performance is independent of operand alignment. This technique combines compile-time detection of memory access patterns with a memory subsystem that decouples the order of requests generated by the processor from that issued to the memory system. This decoupling permits the requests to be issued in an order that optimizes use of the memory system. The approach involves detecting the pattern of future memory references in an algorithm at compile time then, using an analytic model of the memory, determining an optimal sequence of requests. The disclosed Smart Memory Controller (SMC) is used at execution time to issue "actual" memory requests in the order that maximizes bandwidth.

As with any scalable performance architecture, the only possible solution is concurrency. At some level, independent memory subsystems must be provided whose aggregate bandwidth is sufficient even if that of the individual subsystems is not. This is what parallel memory systems, both partitioned and interleaved have done for three decades.

Unfortunately, as with scalable computing systems, concurrent memory systems do not uniformly deliver their peak bandwidth, as both systems are sensitive to the order of requests. This is illustrated by the dot product example:

do 10, i=1, n 10 s=s+a(i) *b(i)

Scalar code for this example involves fetching an alternating sequence of the a's and b's: <a(1), b(1), a(2), b(2), . . . >. Whether or not this sequence will achieve the maximum possible bandwidth from a given memory architecture is problematic. In an interleaved memory system, if the arrays happen to begin on the same even/odd boundary, the same module will be accessed twice in succession rather than alternating between them. This provides only a fraction of the possible bandwidth.

Non-interleaved memory using page-mode DRAMS behaves similarly. These memory parts provide significantly faster access to data that is in the same row of the two-dimensional physical storage array. The sequence of alternating requests will flush the page-mode buffer on each request, thus negating the potential gains from this type of memory.

In both of the above, the problem is due to the interaction of the memory architecture and the order of requests. Exploiting this interaction is the basis for the instant invention. The program is processed in accordance with the following overall outline.

The compiler reads the user program, translating the program to machine language.

During compilation, the compiler detects the pattern of memory references which can utilize streaming; typically these will be a set of vector accesses, each of which can be characterized by a base address, stride, mode (read or write), and count.

The compiler divides the code into streaming code which can take advantage of the SMC, and natural order code to be processed by the CPU in a convention manner.

The streaming code is arranged to proceed the natural order code in the order of execution.

At execution time the streaming code is coveyed to the Memory Scheduling Unit (MSU), which then initiates streamed data references.

The streamed data is prefetched and buffered according to the instant disclosure, as set forth hereinafter.

Simultaneously, the CPU is procesing the data in its natural order.

Once all information has been accessed from standard memory and SMC, the information is "returned" as originally requested.

In order for the compiler to recognize and know to convey the required information to the MSU, a recurrence detection and optimization algorithm is utilized, for example as disclosed by Davidson, Jack W., and Benitez, Manuel E., "Code Generation for Streaming: An Access/Execute Mechanism", Fourth International Conference on Architectural Support for Programming Languages and Operating Systems, April 1991, incorporated herein by reference.

This can be illustrated using the above dot product example. In prior art interleaved memory systems, the processor will continue to issue its requests in the canonical order: <a(1), b(1), a(2), b(2), . . . >. In contrast, the SMC handles the foregoing example in two ways. If the arrays start on different boundaries, it will simply pass through the canonical request order, thereby providing full bandwidth. If the arrays start on the same boundary, however, the SMC will alternate pairs of requests: <a(1), a(2), b(1), b(2), a(3), . . . >, buffering one element from each array to allow the request to be supplied to the processor in the canonical order.

If the memory system uses page-mode DRAMS, the SMC again utilizes two methods. In the likely case that the arrays are not in the same DRAM pages, the SMC's optimal request sequence is alternating sequences of accesses to the same array, each sequence getting all of the data in a page. This method improves bandwidth by a factor of five on current memory chips. Additionally, modest amounts of buffering are adequate to achieve near-optimal performance. In the less likely case that the arrays overlap in the same page, alternating requests between the arrays is possible, but the boundary conditions are subtle. Unless the arrays have the same number of elements per page, the boundaries behave like the previous non-overlapped case.

The key to reordering requests at compile time is knowledge of the future. For typical applications this is difficult or impossible to know, however these are the applications for which traditional cache schemes work well. By contrast, scientific computations, where traditional caching is not as effective, are precisely those for which prediction of future references is possible. The instant invention works in conjunction with traditional caching to span a broader set of applications.

In the two examples discussed above, if the physical starting addresses are known, the transformation would be performed at compile time. Generally, this is impossible for a variety of reasons, such as the code is a library function and cannot know its argument addresses at compile time. Thus, at least some of the request string transformations must be done at execution time. The typical role of the compiler is to determine the pattern of references and a set of possible transformations, the actual transformation must be selected at execution time.

The data reference patterns in most scientific computations can be described as an interleaved collection of accesses to vectors. Individual vector accesses can be described by a four tuple consisting of the name of the vector, the "stride" of the accesses (distance between vector elements), a count of the number of vector elements, and a "mode" (read or write).

<name, stride, count, mode>

If a particular tuple is denoted by a $\alpha_i$, then a general "access pattern", can be defined as follows:

$\alpha_i$ is an access pattern, if A is an access pattern, then a:n is an access pattern and denotes a repetitions of A n times, if $A_1, \ldots, A_n$ are access patterns, then $\{A_1, \ldots, A_n\}$ is an access pattern and denotes sequential execution of the pattern $A_1$ followed by the execution of pattern $A_2$, etc.

Thus if 'a' and 'b' are vectors, an expression such as $\{A:2, B:3\}:100$ denotes the access pattern $a_1\ a_2\ b_1\ b_2\ b_3\ a_4\ a_5\ b_4\ b_5\ b_6\ a_6\ \ldots$ These expressions can be used to describe both the access pattern specified in the original scientific algorithm, and hence requested by the CPU, and the optimal access sequence for the memory. The simple form of these expressions make them easy to implement as an "instruction sequence" for the SMC.

The SMC is generally applicable to any computing system having a processor which can perform non-caching loads and stores so that non-unit stride streams can be accessed without concomitantly accessing extraneous data and wasting bandwidth. For clarity within the specification, however, the description herein will be based on the architecture illustrated in FIGS. 1–3.

The instant invention was added to an Intel i860, which was selected for its support of vector operations and non-cacheable floating point load and store instructions, which will be used to access stream operands. This has the disadvantage that the stream buffers are external to the processor, and therefore incur a higher access cost than the internal cache. However, accesses to the stream buffers are fast enough that using the instant invention results in a significant performance increase. Utilization of the instant disclosure on a computer having on-chip stream buffers would further decrease the access time. The Intel i860 is used herein as an example and in no limits the scope of the invention.

The SMC 10 is comprised of the Memory Scheduling Unit, MSU 12 and the Stream Buffer Unit, SBU 14. As illustrated in FIG. 1, the computer's memory 32 is interfaced to the central processing unit, CPU 18 through the MSU 12. The MSU 12 includes logic to issue memory requests as well as logic to determine the order of requests during streaming computations. For non-stream accesses, the MSU 12 provides the same functionality and performance as a traditional memory controller. This is crucial, as the access-ordering circuitry of the MSU 12 is not the critical path to memory and in no way affects scalar processing.

The MSU 12 has full knowledge of all streams currently needed by the processor and, given the base address, vector stride, and vector length, it can generate the addresses of all elements in a stream. The MSU 12 also knows the details of the memory architecture, including interleaving and device characteristics. The access-ordering circuitry uses this information to issue requests for individual stream elements in an order that attempts to optimize memory system performance.

The separate SBU 14, provides registers that the CPU 18 uses to specify stream parameters (base address, stride, length, and data size) and high-speed buffers for stream operands. As with the stream-specific parts of the MSU 12, the SBU 14 is not on the critical path to memory, and the speed of non-vector accesses is not adversely affected by its presence.

There are a number of options for the internal architecture of the SBU 14 and MSU 12 and the examples of organization disclosed herein should, in no way, limit the scope of the invention. To discuss each and every architectural option would require an extensive number of pages and would be obvious to one skilled in the art based on the instant disclosure.

Figure 2:
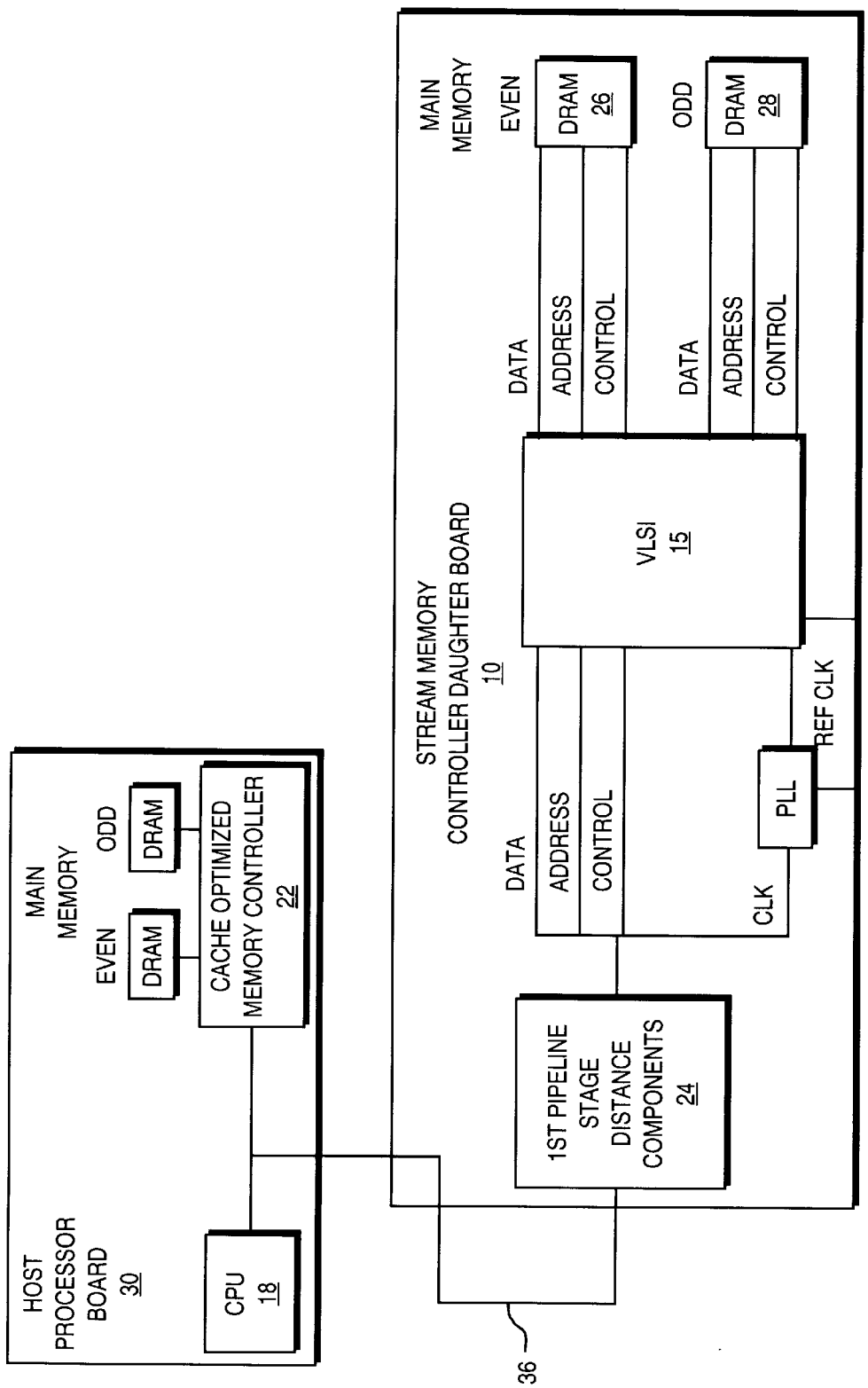
FIG. 2 is a plan view of the architecture of the SMC board.

An example of the overall architecture of the SMC 10 in relation to the host board is shown in FIG. 2. The host processor board 30 contains a 40 MHz microprocessor CPU 18, and a 2-way cache optimized interleaved 16 MB memory system 22.

The SMC board 10, which contains the MSU 12 and SBU 14 within the VLSI chip 15, is connected to the processor board 30 via an expansion connector 36. The SMC board 10 consists of the SBU 14, the SMC control logic, several data path elements, and two interleaved banks of DRAM main memory 26 and 28.

In processors having a maximum latency of 11 ns for the address and cycle definition lines, accesses to the SMC board 10 are pipelined due of this high latency. Further delay is encountered as the signals travel to the expansion connector from the CPU 18, making the signals available at the edge of the SMC board only 10–12 ns before the (40 MHz) clock edge. A pipeline stage is used to latch these signals, thereby increasing the available time to access the SMC board 10 within the next cycle. The onboard cache-optimized memory system is similarly pipelined. The pipeline stage 24 is required on the i860, as well as computers with similar architectures, however whether or not pipelining is required will be evident to those versed in the art.

The high-speed memory of the SBU 14 is implemented logically as a set of FIFOs 16. The order in which the buffer is filled is determined by the MSU 12. In the case of stream read accesses, the FIFOs 16 are filled from the DRAM and drained by the CPU 18. For stream writes, the FIFOs are filled by the CPU 18 and drained to the DRAM. From the memory system's point of view, each stream FIFO will be implemented as a set of smaller FIFOS, or subFIFOs, one per memory bank. The control logic must therefore fill (or drain) the stream elements from a particular memory bank in stream order. This is not a significant restriction, however, as there will very rarely be any performance benefit from servicing these elements out of order. On the other hand, the subFIFO organization significantly reduces SMC 10 complexity, simplifying both the FIFO 16 status logic and the logic to determine the next stream request to the DRAM 26 and 28.

In order to provide the flexibility necessary to explore performance ramifications of different FIFO 16 configurations, a virtual FIFO scheme is used having an internal dual-ported SRAM (DP-SRAM 50) for storage. The depth and number of FIFOs 16 is thus limited only by the size of the implemented DP-SRAM 50. To provide 100% bus bandwidth between the CPU 18 and FIFOs 16 for pipelined, double-precision floating point loads and stores, the SMC 10 must be able to provide a double word every 25 ns, as the CPU 18 can supply a new quadword address every 50 ns. Since the DP-SRAM 50 (implemented in 1.2 mm CMOS technology) used with the SMC 10 has an access time on the order of 12 ns, two banks of interleaved DP-SRAM are used to meet the bandwidth requirement. In order to service continuous, double-precision floating point accesses with no wait states, the SMC 10 must also be able to accept a new address every 50 ns. This address is presented to both banks of DP-SRAM 50, and two double words are accessed. For reads, the first double word is sent directly to the processor and the second is latched, at pipeline 24, within the SMC 10 so that it can be sent on the next bus cycle. For writes, the first double word from the processor is latched within the SMC 10, again at pipeline 24, until the next cycle, when the second double word arrives. Both double words are then written into the DP-SRAM 50 together.

Figure 3:
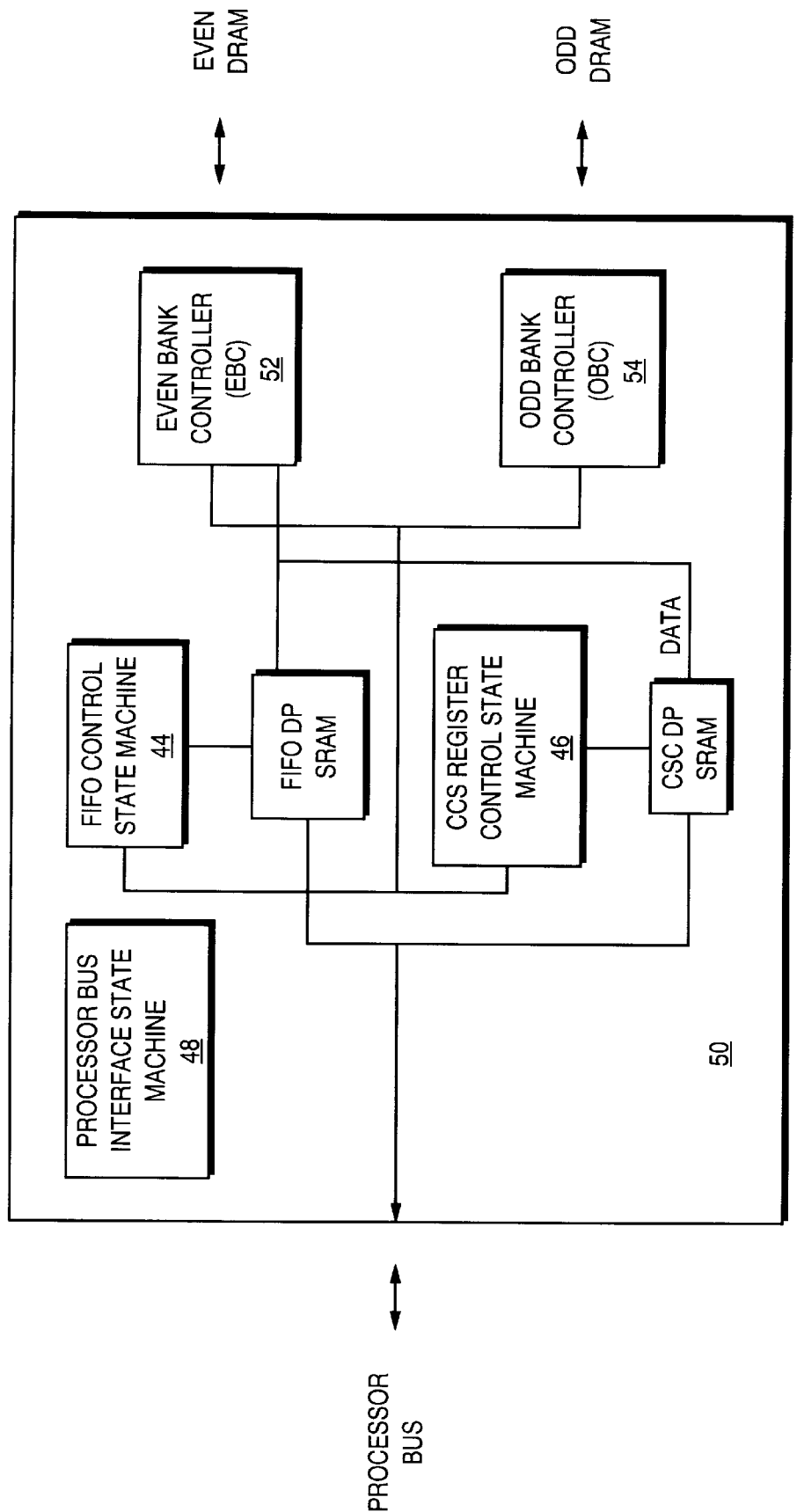
FIG. 3 is a plan view of SMC VLSI implementation.

The SMC VLSI 15 implementation, shown in FIG. 3, consists of several FIFO Control State Machines 44 and Control/Status (CSC) registers 46 and are parts of the SBU 10. In addition to storing the stream parameters (base, length, and stride), the CSC registers 46 govern the read/write modes of the individual FIFOs 16 and provide a user-accessible reset control for the entire SMC 10.

The Processor Bus Interface (PBI) state machine 48 is responsible for handling all handshaking between the SMC 10 and the CPU 18, interfacing all requests from the SMC board 10 memory, including stream, scalar, and cache line accesses.

The FIFO state machine 44 maintains pointers to the virtual FIFOs 16 contained in the DP-SRAM 50, as well as status signals on the condition of each (full, empty, half full, etc.). The FIFO state machine 44 allows simultaneous access to the FIFO DP-SRAM 50, so that the SMC 10 bank controllers 52 and 54 and the processor 18 can access the FIFOs 16 concurrently. This capability is necessary for the SMC bank controllers 52 and 54 to keep pace with the CPU 18's stream requests.

The SMC 10 has low-skew clock distribution trees built into its architecture, but the fixed delay in the clock as it is driven onto the SMC 10 might be as great as 6 to 8 ns, which is unacceptable for the high-speed design of 40 MHz or greater. The SMC 10 therefore uses a phased locked loop (PLL) to synchronize its on-chip clock with the system clock. In this design, the reference signal for the PLL is connected to the clock driven off of the SMC 10 from its distributed clock tree, and the locked signal is fed back to the input of the SMC clock network. Clock synchronization within 1 ns is possible using this approach.

A set of memory-mapped registers provides a processor-independent way of specifying stream parameters. Setting these registers at execution time allows the CPU 18 to initiate an asynchronous stream of memory access operations for a set of string operands. Data retrieval from the streams (loads) and insertion into streams (stores) is done in any of several ways. For example, the SBU 14 could appear to be a traditional cache, or alternatively, the model would include a set of FIFOs 16. In this organization, each stream is assigned to one FIFO 16, which is asynchronously filled from, or drained to, memory by the access/issue logic. The "head" of the FIFO 16 is another memory-mapped mapped register. Load instructions from, or store instructions to, a particular stream will reference the FIFO 16 head via this register, dequeueing or enqueueing data as is appropriate. It should be noted that the use of DRAM on both the host and the SMC boards is shown for illustration in this application. In a preferred embodiment all of the memory would be in one location and accessible from either the SMC or cache.

Traditional caches retain their importance for code and non-vector data in a system equipped with an SMC 10. Furthermore, if algorithms can be blocked and data aligned to eliminate significant conflicts, the cache and SMC can be used in a complementary fashion for vector access. Under these conditions multiple-visit vector data can be cached, with the SMC 10 used to reference single-visit vectors. To illustrate this, consider implementing the matrix-vector multiply operation:

$$y=(A+B)x$$

where A and B are n×m matrices and y and x are vectors. The code for a straightforward implementation using matrices stored in column-major order is:

```
        do 20 j = 1,m
           do 10 i = 1,n
              y(i) = y(i) + (A(i,j) + B(i,j)) * x(j)
10         continue
20      continue
```

When the computation is strip-mined to reuse elements of y the code changes to:

```
        do 30 IT-a,n,IS
           load y(IT) through y(min(n,IT+IS-1)) into cache
           do 20 j = 1,m
              load x(j) into processor register
              do 10 I - IT,min(n,IT+IS-1)
                 y(i) = y(i) + (A(i,j) + B(i,j)) * x(j)
10            continue
20         continue
30      continue
```

Partition size depends on cache size and structure. Elements of "y" are preloaded into cache memory at the appropriate loop level, and the SMC 10 is then used to access elements of "A" and "B", since each element is accessed only once. The reference to "x" is a constant within the inner loop, and is therefore preloaded into a processor register.

Although the SMC 10 provides near-optimal bandwidth for a given memory architecture, algorithm, and data placement, it cannot compensate for an unfortunate placement of operands. For example, a vector stride that results in all elements placed in a single bank of a multi-bank memory. The SMC 10 and data placement are complementary and the SMC 10 will perform better given good operand placement.

To illustrate one aspect of the bandwidth problem, as discussed with respect to the tridiag hereinafter, and how it might be addressed at compile time, the effect of executing the fifth Livermore Loop (tridiagonal elimination) using non-caching accesses to reference a single bank of page-mode DRAMs is shown. This computation occurs frequently in practice, especially in the solution of partial differential equations by finite difference or finite element methods. Since it contains a first-order linear recurrence, it cannot be vectorized. Nonetheless, the compiler can employ the recurrence detection and optimization algorithm disclosed by Davidson, supra to reorder the request and utilize the prefetching capabilities of the SMC 10. This algorithm generates streaming code where each computed value $X_i$ is retained in a register so that it will be available for use as $X_i-1$ on the following iteration. For medium or long vectors, elements from "x", "y", and "z" are likely to reside in different pages, so that accessing each vector in turn incurs the page miss overhead on each access. The natural reference sequence for a straightforward translation of the computation:

$$\forall_i \quad x_i \leftarrow z_i \times (y_i - x_{i-1})$$

is shown as:

| loop: | loop: |
|---|---|
| load z[i] | load z[i] |
| load y[i] | load z[i + 1] |
| stor x[i] | load y[i] |
| jump loop | load y[i + 1] |
|  | stor x[i] |
|  | stor x[i + 1] |
|  | jump loop |
| (a) | (b) |

The memory references likely to generate page misses in the above tridiag code would be: load z[i], load y[i], stor x[i] of loop (a) and load z[i], load y[i] and stor x[i] of loop (b). In the loop (a), a page miss occurs for every reference. Unrolling the loop and grouping accesses to the same vector, loop (b), amortizes the page-miss cost over a number of accesses; in this case three misses occur for every six references.

Reducing the page-miss count increases processor-memory bandwidth significantly. For example, consider a device for which the time required to service a page miss is four times that for a page hit, a miss/hit cost ratio that is representative of current technology. The natural-order loop in (a) only delivers 25% of the attainable bandwidth, whereas the unrolled, reordered loop (b) delivers 40%. There are other factors, such as bus limitations, that could affect effective memory bandwidth, but they are ignored here for the sake of simplicity.

Figure 4:
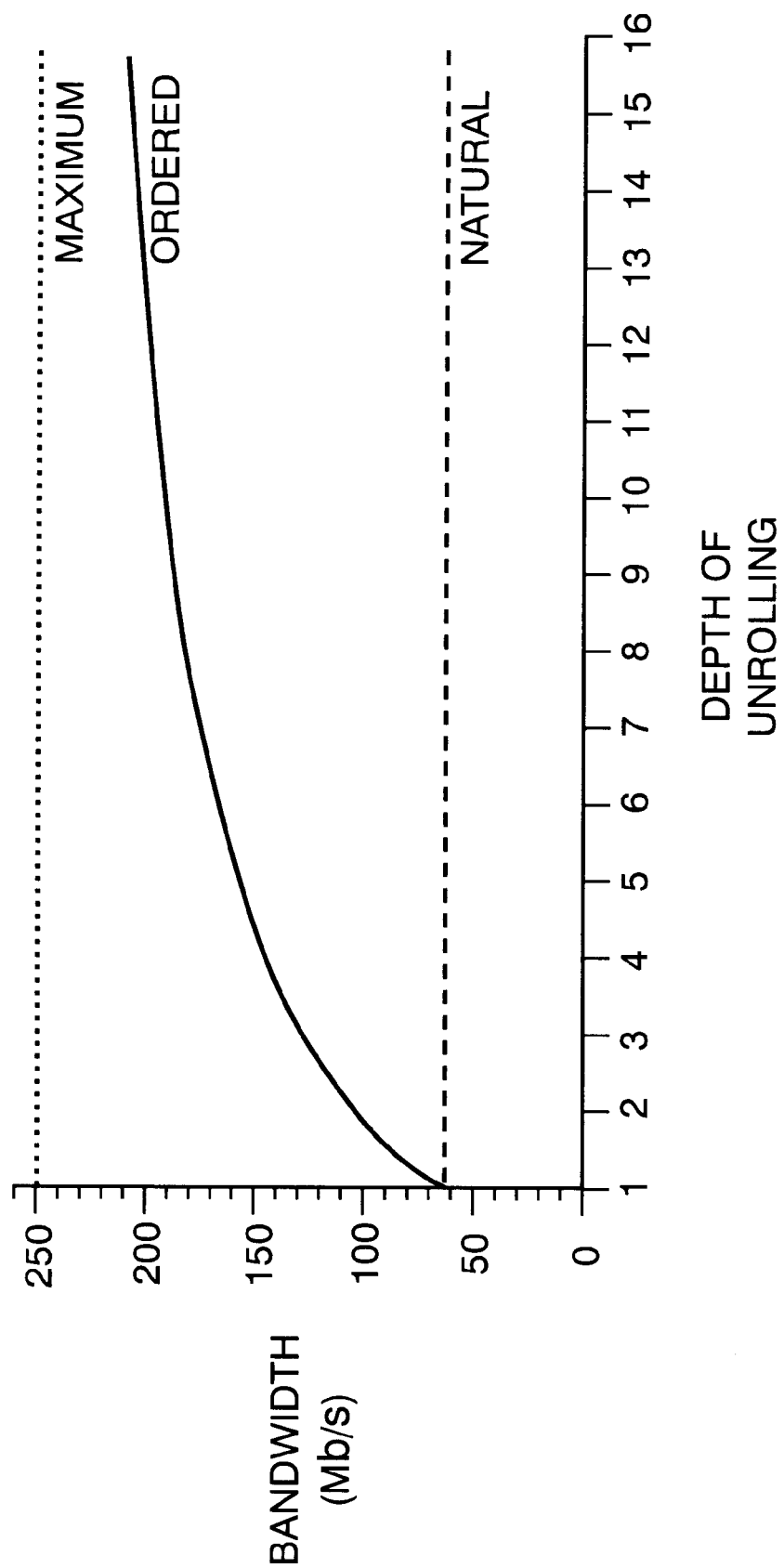
FIG. 4 is a graph illustrating effective memory bandwidth versus depth of unrolling.
Figure 6A:
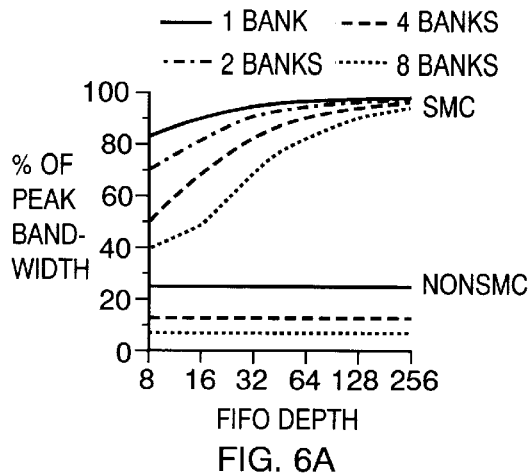
FIGS. 6a, 6b, 6c, 6d, 6e and 6f are graphical representations of the P1—Long Vector Performance.
Figure 6B:
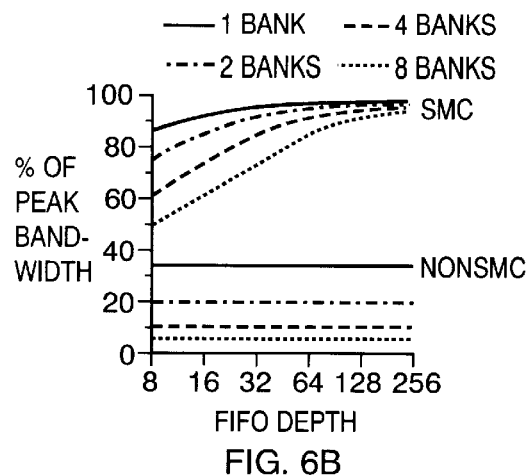
Figure 6C:
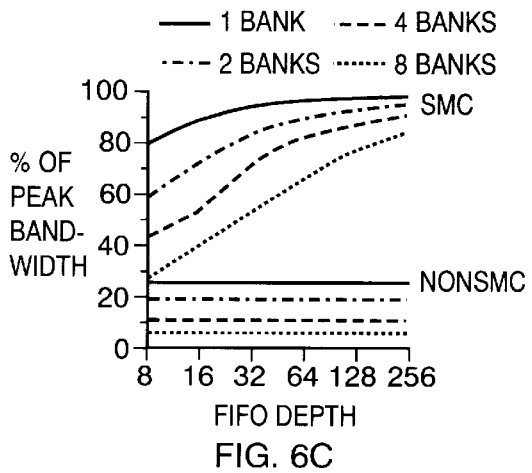
Figure 6D:
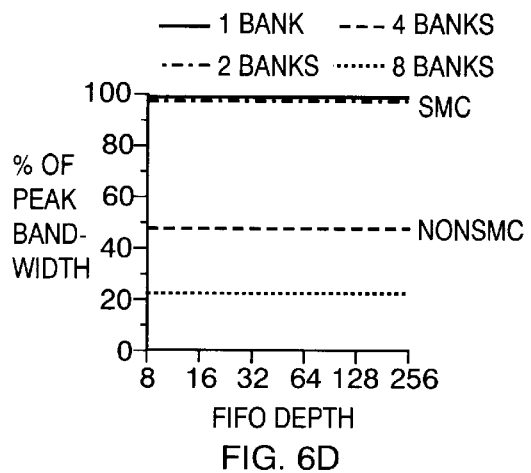
Figure 6E:
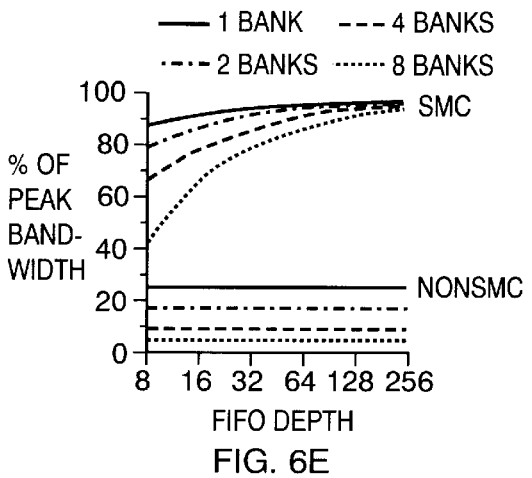
Figure 6F:
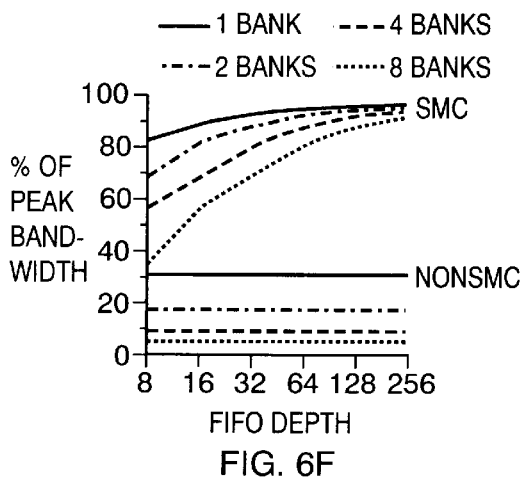

FIG. 4 illustrates effective memory bandwidth versus depth of unrolling, given access times of 160 ns for page misses and 40 ns for page hits. The bottom curve, the loop body (a), is essentially replicated the appropriate number of times, as is standard practice. In the middle curve, accesses have been arranged as per loop (b). The top curve depicts the bandwidth attainable if all accesses were to hit the current DRAM page. Reordering the accesses realizes a performance gain of almost 130% at an unrolling depth of four, and over 190% at a depth of eight. A size register which allows an unrolling depth of sixteen would improve performance by approximately 240%.

The performance effect of FIG. 4 is illustrated in FIG. 5. As illustrated, performance using the instant invention on very short vectors is about 2.5 times that of a system without an SMC 10. Performance on moderate length vectors is about triple that of the non-SMC system and for long vectors and deep FIFOs, bandwidth reaches 98.5% of peak.

As the foregoing illustrates, the performance benefits of doing such static access ordering can be quite dramatic. However, without the kinds of address alignment information usually only available at run time, the compiler can't generate the optimal access sequence. Additionally, the extent to which a compiler can perform this optimization is further constrained by such things as the size of the processor register file, for instance tridiag can be unrolled at most eight times on the CPU 18. The SMC 10 provides the compiler, altered as stated heretofore, with the addressing assistance required to generate optimal access sequence.

TAXONOMY

There are a number of options for when and how access ordering can be done, therefore the following set forth the taxonomy relied upon herein.

Access ordering systems can be classified by three key components:

stream detection (SD): the recognition of streams accessed within a loop, along with their parameters (base address, stride, etc.);

access ordering (AO): the determination of interleaving of stream references that most efficiently utilize the memory system; and access issuing (AI): the determination of when the load/store operations will be issued.

Each of these functions may be addressed at compile time, CT, or by hardware at run time, RT. This taxonomy classifies access ordering systems by a tuple (SD,AO,AI) indicating the time at which each function is performed.

Some prior art systems detect streams at compile time, while others derive access-ordering algorithms relative to a precise analytic model of memory systems. The second approach unrolls loops and orders memory operations to exploit architectural and device features of the target memory system. The (CT,CT,CT) system, although providing some increase in bandwidth, is limited by the size of the processor register file and lack of vector alignment information available at compile time.

The SMC 10 can further increase the bandwidth utilization of the (CT,CT,CT) system by providing buffer space and automating vector prefetching to produce a (CT,CT,RT) system. The MSU 12 relieves register pressure and decouples the sequence of accesses generated by the CPU 18 from the sequence observed by the memory components. The compiler recognizes the sequence of vector references to be issued and buffered, but the actual access issue is executed by the MSU 12.

Both of these solutions, however, are static in the sense that the order of references seen by the memory is determined at compile time since static techniques are inherently limited by the lack of alignment information. Dynamic access ordering systems introduces logic to determine the interleaving of a set of references.

In a dynamic (CT,RT,RT) system, stream descriptors are developed at compile time and sent to the MSU 12 at run time, where the order of memory references is determined dynamically and independently. Determining access order dynamically allows the MSU 12 to optimize behavior based on run-time interactions.

Fully dynamic (RT,RT,RT) systems implement access ordering without compiler support by augmenting the previous controller with logic to induce stream parameters. Whether or not such a scheme is superior to another system depends on the relative quality of the compile-time and run-time algorithms for stream detection and relative hardware costs. Proposals for "vector prefetch units" have recently appeared, but these do not order accesses to fully exploit the underlying memory architecture.

Based on analysis and simulations, the best engineering choice is to detect streams at compile time, but to defer access ordering and issue to run time—(CT,RT,RT). Choosing this scheme over an (RT,RT,RT) system follows a philosophy that has guided the design of RISC processors, that is to move work to compile time whenever possible. This speeds processing and helps minimize hardware.

This organization is both simple and practical from an implementation standpoint. The FIFO 16 organization utilized herein is close to the "stream units" of the WM architecture as disclosed in Wulf, W. A., "Evaluation of the WM Architecture", 19th Annual International Symposium on Computer Architecture, May 1992, which is incorporated herein as if cited in full. The FIFO 16 organization as disclosed herein can be considered a special case of a decoupled access-execute architecture. Goodman, Jr. R., et al, "PIE: A VLSI Decoupled Architecture", Twelfth International Symposium on Computer Architecture June 1985 and Smith, J. E. et al, "The ZS-1 Central Processor", the Second International Conference on Architectural Support for Programming Languages and Systems, October 1987, which are incorporated herein as if cited in full. An Apparatus for Reading to and Writing from Memory Streams of Data While Concurrently Executing a Plurality of Data Processing Operations is disclosed in U.S. Pat. No. 4,819, 155 to Wulf et al and is incorporated herein as if cited in full. The disclosed combination hardware/software scheme does not require heroic compiler technology, as the compiler need only detect the presence of streams, which can be accomplished through the use of streaming algorithms.

TESTING PARAMETERS

Tests were conducted by simulating a wide range of SMC 10 configurations, wherein the following factors were varied:

FIFO depth, vector length, stride, and alignment dynamic order/issue policy, number of memory modules, DRAM speed, The results involve the following restrictions:

All memories modeled here consist of interleaved banks of page-mode DRAMs, where each page is 2K doublewords.

The DRAM page-miss cycle time is four times that of a DRAM page hit, unless otherwise noted.

NonSMC results are for the "natural" reference sequence for each benchmark, using non-caching loads and stores.

SMC initialization requires two writes to memory-mapped registers for each stream; this overhead has no significant effect on results, and has not been factored into the following tests.

The onboard memory, which is optimized for cache line access (loads and stores of four 64-bit double words), provided a basis of comparison. Initially, vector algorithm test cases were run out of the onboard memory to obtain base-line timing information. These real-time results are compared herein with those of the same algorithms run out of the SMC-controlled memory. The cache-optimized onboard memory provides functionality (such as parity, error correction, and cache snooping capabilities) that the SMC-controlled memory will not, which may have affected the overall timing results. This consideration was factored into the comparisons.

The processor is modeled as a generator of load and store requests only and arithmetic and control are assumed never to be a computational bottleneck. This places the maximum stress on the memory system by assuming a computation rate that out-paces the memory's ability to transfer data. Scalar and instruction accesses are assumed to hit in the cache for the same reason.

Utilized Computations

The benchmark kernels used herein are:

copy: $\forall i \; y_i \leftarrow x_i$ daxpy: $\forall i \; y_i \leftarrow ax_i + y_i$ hydro: $\forall i \; x_i \leftarrow q + y_i \times (r \times zx_{i+10} + t \times zx_{i+11})$ scale: $\forall i \; x_i \leftarrow ax_i$ swap: $\forall i \; tmp \leftarrow y_i \; y_i \leftarrow x_i \; x_i \leftarrow tmp$ tridiag: $\forall i \; x_i \leftarrow z_i \times (y_i - x_{i-1})$ vaxpy: $\forall i \; y_i \leftarrow a_i x_i + y_i$ msort: merge sort mul: sparse matrix multiply Daxpy, copy, scale, and swap are from the BLAS (Basic Linear. Algebra Subroutines). These vector and matrix computations occur frequently in scientific computations and have been collected into libraries of highly optimized routines for various host architectures. Hydro and tridiag are the first and fifth Livermore Loops, a set of kernels culled from important scientific computations. The former is a fragment of a hydrodynamics computation, and the latter is a tridiagonal elimination computation. Vaxpy is a vector axpy computation that occurs in matrix-vector multiplication by diagonals. This algorithm is useful for the diagonally sparse matrices that arise frequently when solving parabolic or elliptic partial differential equations by finite element or finite difference methods. Mul is a sparse matrix multiply, and msort is a merge sort.

Herein "axpy" refers to a computation involving some entity, "a", times a vector "x" plus a vector "y". For daxpy, "a" is a double-precision scalar, so the computation is effectively a scalar times a vector, plus another vector. In the case of vaxpy, "a" is a vector, making the computation a vector times a second vector, plus a third vector.

These benchmarks were selected because they represent access patterns found in real scientific codes, including the inner-loops of blocked algorithms. These benchmarks constitute a representative subset of all possible access patterns for computations involving a small number of vectors (computations requiring more vectors can usually be broken down into several parts, each using only a small number of vectors).

Although these computations do not reuse vector elements, they are often found in the inner loops of algorithms that do. Examples include the blocked algorithms of the Level 3 BLAS libraries, as well as the matrix-multiply by diagonals operation mentioned above (which uses vaxpy). Whether or not the vectors are reused has no bearing on SMC performance, although lack of temporal locality greatly diminishes the effectiveness of caching. The ability to obtain good memory performance, even for computations that do not benefit from caching, is one of the main attractions of the instant invention.

The results for mul and msort are not addressed here. The many simulations indicate that the performance curves for the other benchmarks are remarkably similar. This similarity results from the SMC's ability to reorder accesses, regardless of the access pattern expected by the processor.

As the SMC 10 exploits the underlying memory architecture to issue accesses in an order that optimizes memory bandwidth, for any memory system composed of interleaved banks of DRAM components, there are at least two facets to this endeavor. One is taking advantage of the available concurrency among the interleaved banks, the other taking advantage of the device characteristics. At each "decision point" (i.e. each available memory bus cycle), the SMC 10 must decide how best to achieve these goals.

The algorithm design space, in the example disclosed herein, is divided into two subspaces. The first subspace being algorithms that first choose a bank (bank-centric schemes), and the second subspace being algorithms that first choose an access (access-centric schemes). The following is based on a memory composed of interleaved banks of page-mode DRAMs and a FIFO-based SBU implementation, as depicted in FIG. 1.

In these schemes, each bank operates independently, thus each may be on a different DRAM page at any given time. This kind of memory architecture differs from traditional prior art interleaving schemes, where each bank "listens" to the page address for each access, but only one bank responds to the request.

A bank-centric algorithm for choosing the next access must:

select the memory bank(s) to which the next access(es) will be issued, and choose an appropriate access from the pool of ready accesses for each memory bank (this is equivalent to selecting a FIFO to service).

As used herein a ready access refers to an empty position in a read FIFO 16 (that position is ready to be filled with the appropriate data element) or a full position in a write FIFO 16 (the corresponding data element is ready to be written to memory).

Bank Accessing

Once the FIFO 16 to service has been determined, the selection mechanism chooses an appropriate bank from the set of banks servicing that FIFO 16. The possible candidates are those banks that are presently idle. Since there may be fewer banks than potential accesses, a set of available banks is determined, and then access considered only to those banks. Strategies for selecting banks vary in the number of banks accessed at a time, and in how many banks considered in the search. At one end of the spectrum lies the exhaustive search strategy, to keep looking until the appropriate number of banks is found or no unexamined banks remain. At the other end of the spectrum, only one bank is considered. These schemes must also impose an ordering on the banks to determine which will be considered first.

The three bank-selection schemes simulated herein are Parallel Access Initiation (P), Round-Robin Selection (R) and Token Round-Robin Selection (T).

In the first scheme, Parallel Access Initiation (P), it is attempted to initiate accesses to all available (non-busy)

banks. This greedy algorithm attempts to take full advantage of available concurrency, but is generally impractical to implement, since it requires a separate bus to each bank. Although it appears that this algorithm should perform at least as well as any other, it isn't always the case. In general, the interaction between memory bank availability, access initiation, and processor activity is quite complex and the results unobvious.

In the Round-Robin Selection (R) scheme, only one access is initiated, however each bank is considered in turn until an available one is found or there are no more banks left. In a balanced system, where the number of banks is matched to the memory speed, Scheme R essentially staggers the accesses, so that it performs similarly to Scheme P, but with slightly greater latency. The advantage of this algorithm is lower implementation cost, since the bandwidth requirements between the SMC and memory are lower than for Scheme P.

In the last scheme, Token Round-Robin Selection (T), again only one access is initiated, and only the next bank in sequence is considered. If that bank is busy, nothing is done at the current time. This is the easiest and least expensive to implement of the three algorithms. In spite of Scheme T's simplicity, its performance rivals and sometimes exceeds that of Scheme P and Scheme R.

For the Scheme R and Scheme T approaches, the most reasonable strategy is to start with the next bank in sequence after the bank to which the last access was initiated. Starting with a fixed bank each time would cause some banks to be under-used and accesses to those banks would effectively have lower priority.

FIFO Algorithms

The FIFO-selection algorithms vary in sophistication, ranging from those that use all available information to decide what to do next, to those that do the easiest and quickest thing they can.

Some algorithms first look for an access that hits the bank's current DRAM page. Others simply choose the next FIFO in round-robin order, regardless of whether the next access from that FIFO hits the current page.

If an algorithm that looks for a page hit can't find one, there are several ways to chose the next access. One is to look for a "best" candidate based on how full (empty) the read (write) FIFOs are. Since it is known that the page-miss overhead will be incurred, it is optimal to amortize that cost over as many page-hits as possible, hence choosing a FIFO for which there will be many accesses to the new DRAM page. Other algorithms simply choose the next FIFO in sequence when they can't find a page-hit.

When trying to decide which FIFO is "best" to service next, the algorithm may consider the total contents of the FIFO (this is the global view), or it may restrict itself to just the portion of the FIFO for which the current bank is responsible, referred to as a subFIFO (this is the local view). Some algorithms require that a FIFO (subFIFO) meet a certain "threshold" in order to be considered for service: for instance, an algorithm might require that a read FIFO (subFIFO) be at least half empty before it can be considered among the best candidates for the next access. The rationale for this sort of restriction springs from the overhead involved in accessing a new DRAM page. Whenever DRAM pages must be switched, the cost of that miss over should be amortized on as many accesses as possible. If there are sufficiently few ready accesses to a given page, it may be worthwhile to wait until the processor has generated more accesses to that page (by removing elements from the read FIFO or writing elements to the write FIFO) than to pay the page overhead now. In the event that these algorithms find no valid candidates, they either choose the next FIFO in sequence, or do nothing until the next decision-making time.

There are several possibilities for prioritizing the FIFOs. They can be considered in random order; imposed a fixed order, always considering a given FIFO first; given priority to reads (or writes); started with the last FIFO the selected bank serviced; or started with the last FIFO any bank serviced. The latter two options seem most fair and reasonable from an implementation standpoint. The first of these encourages different banks to be working on different FIFOs, while the second encourages several banks to be working on the same FIFO. It is not intuitively obvious which of these will yield better performance.

The following ten FIFO-selection algorithms were chosen spanning the design space and conducted numerous simulations for each combination of bank- and FIFO-selection schemes. The following algorithms should be considered as examples an in no way limit the scope of the invention.

| | |
|---|---|
| 1 | look for page hit; if none, choose fullest write/emptiest read subFIFO, search round-robin, starting with last FIFO accessed by current bank |
| 2 | look for page hit; if none, choose fullest write/emptiest read subFIFO that's at least ½ full/empty; if none, choose next access found search round-robin, starting with last FIFO accessed by current bank |
| 3 | look for page hit; if none, choose fullest write/emptiest read subFIFO that's at least ½ full/empty; if none, do nothing, search round-robin, starting with last FIFO accessed by current bank |
| 4 | look for page hit; if none, choose next access found, search round-robin, starting with last FIFO accessed by current bank |
| 5 | choose next access search round-robin, starting with last FIFO accessed by current bank |
| 6 | look for page hit; if none, choose fullest write/emptiest read subFIFO search round-robin, starting with last FIFO accessed by any bank |
| 7 | look for page hit; if none, choose fullest write/emptiest read FIFO search round-robin, starting with last FIFO accessed by current bank |
| 8 | look for page hit; if none, choose fullest write/emptiest read FIFO search round-robin, starting with last FIFO accessed by any bank |
| 9 | look for page hit; if none, choose next access found search round-robin, starting with last FIFO accessed by any bank |
| 10 | choose next access search round-robin, starting with last FIFO accessed by any bank |

Each pair-wise combination of bank-selection and FIFO-selection algorithms (P1 through T10) describes a particular bank-centric ordering scheme.

Access Ordering Schemes

In addition to the above bank and FIFO selection algorithms, two naive access-centric ordering schemes were simulated. Scheme A1 is exceedingly simple: the SMC looks at each FIFO in round-robin order, issuing accesses for the same FIFO stream while not all elements of the stream have been accessed, and there is room in the FIFO for another read operand, or another write operand is present in the FIFO.

Scheme A2 is similar, except it incorporates the notion of a threshold into the decision whether to continue servicing the same FIFO: accesses that incur page-misses will only be issued to the current FIFO if it is empty enough (for a read FIFO) or full enough (for a write FIFO), otherwise each FIFO in sequence is evaluated according to the same criteria. If none is found to meet the threshold, no access is initiated at that time.

Each of these fifteen access ordering schemes was run on a a single-bank system and interleaved systems of two, four, and eight banks. Simulation results for the remaining five FIFO-selection algorithms are extremely similar, therefore a brief summary of their comparative performance is provided.

Vector Length

These results are for the seven benchmark algorithms set forth heretofore, run on long (10,000-element), medium (100-element), and short (10-element) vectors. The hydro and tridiag benchmarks share the same access pattern, thus their results for these simulations are identical, and are presented together in each figure.

10,000 have been chosen elements as the "long" vectors, although much longer vectors (on the order of millions of elements) certainly exist in practice. These vectors are long enough that SMC startup transients become insignificant and therefore performance for million-element vectors is not expected to be materially different. An additional advantage in choosing a length of 10,000 as opposed to one million is the effects of context switches when using an SMC in a multiprogrammed environment. An example would be a hypothetical RISC system running at 50 MHz, executing an average of one instruction per 20 ns clock cycle. If such a system incurred a context switch about one hundred times a second, it could execute roughly 500,000 instructions between context switches. Therefore the system would reasonably be expected to perform on the order of 10,000 iterations of an inner loop (up to 50-instructions) between context switches. Thus the choice of "long" vector length is appropriate in that it is long enough that startup transients have essentially no effect on performance, and short enough that the vectors represent an amount of work that might reasonably be accomplished between context switches.

Table Parameters

Unless otherwise indicated, a negative entry indicates that the first (single bank) alignment yielded better performance. Values of magnitude greater than 1% are rounded to the nearest tenth. For entries of lesser magnitude, the Tables contain only the sign of the difference. Blank entries indicate that differences, if any, are less than one hundredth of one percent.

TESTING

FIGS. 6, 7, 8, 9 and 10 show SMC performance for long vectors as a function of FIFO depth and number of memory banks compared to the analogous nonSMC systems. For these simulations, all vectors are aligned to begin in the same bank.

FIGS. 11, 12, and 13 depict SMC performance for medium vectors compared to the analogous nonSMC memory systems, but here the vectors used for the nonSMC results have a better alignment: the ith vector begins in bank (i mod n), where n is the total number of banks.

FIGS. 14, 15 and 16 illustrate SMC performance on very short (10-element) vectors. NonSMC performance is as depicted in the long or medium vector graphs, depending on vector alignment. For clarity, the nonSMC lines have been omitted from these graphs.

Group 1—Algorithms P1, R1, and T1

Algorithm P1

As previously stated, this ordering algorithm attempts to initiates an access to each idle bank at every available bus cycle. For each memory bank "b", it examines the FIFOs in round-robin order, beginning with last FIFO for which an access to "b" was initiated. If it finds an access that hits the current DRAM page, it issues that access. If no accesses for the bank hit the current DRAM page, then an access is issued for the FIFO requiring the most service from b. The performance for the P1's algorithm is illustrated in FIGS. 6, 7, 11 and 14.

Figure 7:
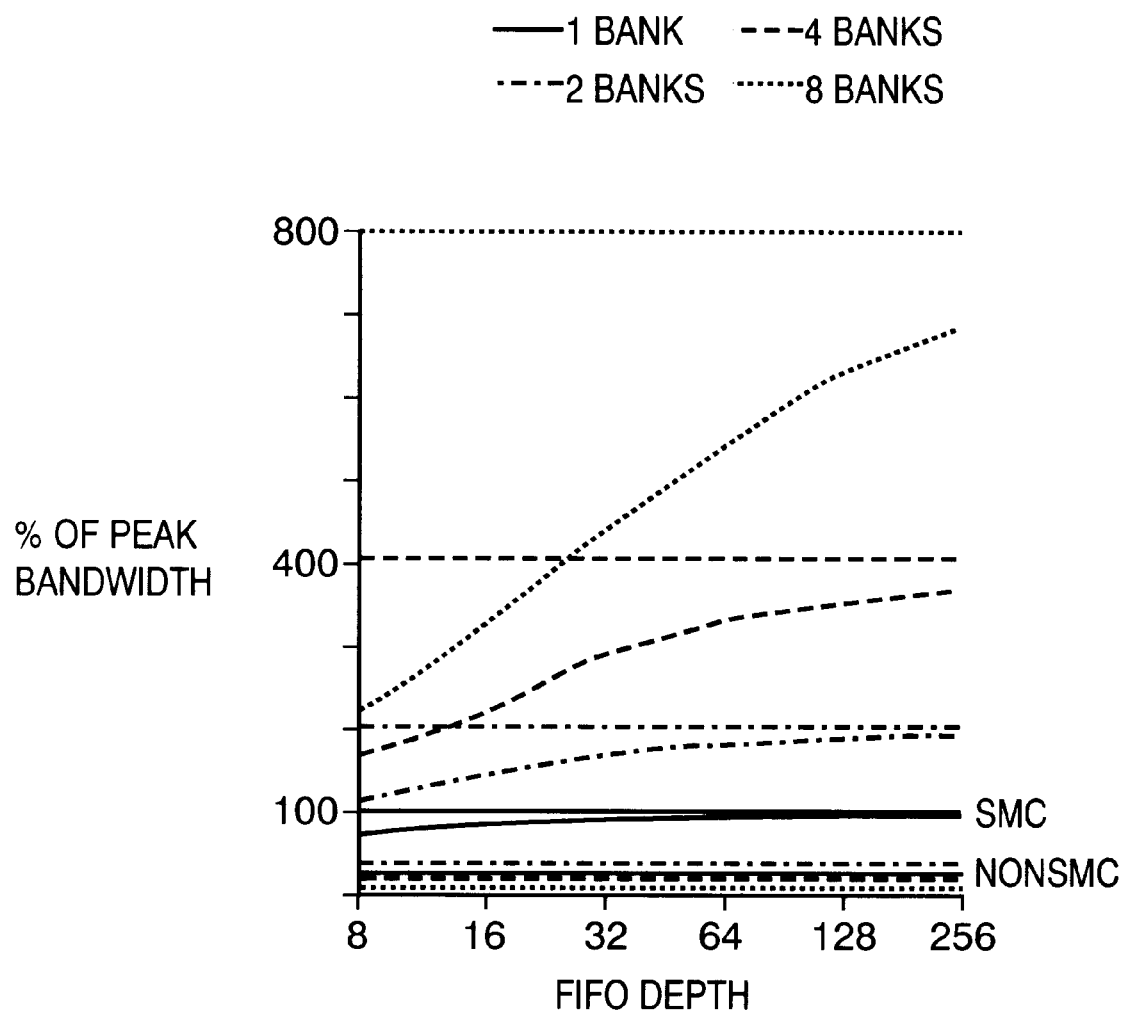
FIG. 7 is a graph representation of hydro Long Vector Performance When Bandwidth Scales With Interleaving.
Figure 8A:
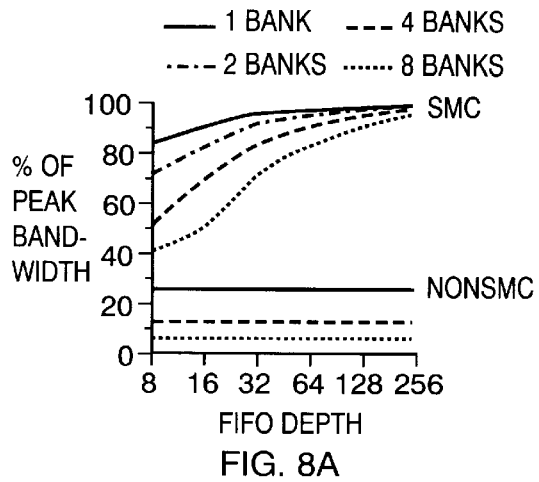
FIGS. 8a, 8b, 8c, 8d, 8e and 8f are graphical representations of R1—Long Vector Performance.
Figure 8B:
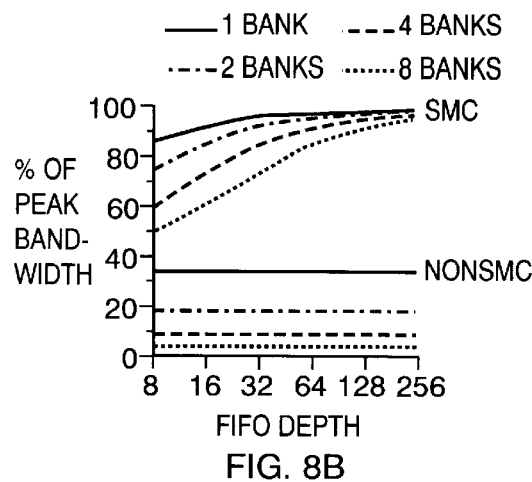
Figure 8C:
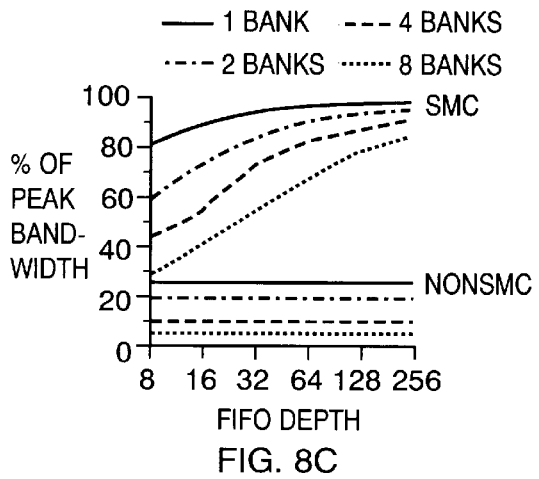
Figure 8D:
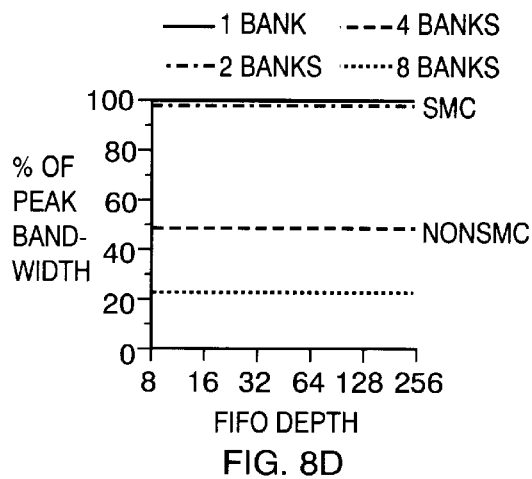
Figure 8E:
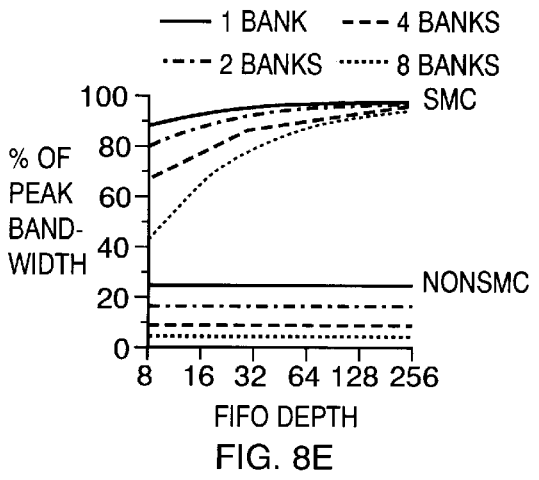
Figure 8F:
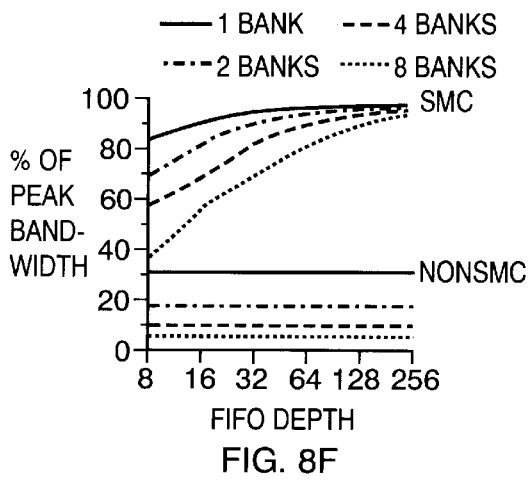

FIG. 6 and FIG. 7 show SMC performance for vectors of 10,000 elements as a function of FIFO depth and number of memory banks. Most of the results presented here will be as in FIG. 6, where performance is given as a percentage of normalized peak bandwidth. Results for memory systems with a greater number of modules represent a percentage of a larger bandwidth. The bottom curves in FIG. 6 depict the bandwidth attained by the analogous nonSMC systems. On the daxpy benchmark, for example, an SMC system with two memory banks achieves 97.8% of peak bandwidth, compared to 18.7% for a nonSMC system. In general, SMC systems with deep FIFOs achieve in excess of 94% of peak bandwidth for all benchmarks and memory configurations. The only exception is tridiag, which attains 91% of peak on the four-bank system, and 85% of peak with eight banks. Even with FIFOs that are only sixteen double-words deep, the SMC systems consistently deliver over 80% of the attainable bandwidth. Again, the tridiag benchmark is the exception, where SMC systems with sixteen-deep FIFOS achieve over 73% of peak.

The performance differences between tridiag and the other kernels stem from its access pattern: it uses three vectors, but accesses each only once per iteration. Vaxpy also involves three vectors, but it splits the "y" vector into two streams, read and write. This reuse gives it a lower percentage of page misses for the SMC to amortize. Similarly, copy and scale are distinguished by the presence in the latter of a vector that is both read and written.

Increasing the number of banks reduces relative performance, an unanticipated and unobvious effect. This is due in part to keeping both the peak memory system bandwidth and the DRAM page-miss/hit delay ratio constant. Thus, the eight-bank system has four times the DRAM page-miss latency of the two-bank system. Although the percentage of peak bandwidth delivered for the architectures with greater interleaving is smaller, the total bandwidth is much larger. If, alternatively, the page-miss cycle time of the memory components is held constant, the page-hit cycle time decreased, with a faster bus, the peak bandwidth of the total system increases proportionally to the number of banks.

FIG. 7 illustrates SMC performance on the hydro benchmark when the page-miss cycle time of the memory components is held constant. Performance is given as a percentage of the peak bandwidth of a single-bank memory system with corresponding horizontal lines indicating peak bandwidth for each architecture. The benchmark achieves a noticeably lower percentage of total bandwidth for the four- and eight-bank architectures. Increasing the number of banks decreases the total number of accesses to each bank, thus page-miss costs are amortized over fewer accesses.

Performance of nonSMC systems is independent of vector length. Since these systems employ no dynamic access ordering, the number of requests issued and the resulting percentage of total bandwidth obtained are constant for each loop iteration. This is true of any system in which access issue is determined at compile time, including those that use prefetching.

FIG. 11 depicts the results of simulating selection algorithm P1 on benchmarks using vectors of 100 elements. These SMC results depict the net effect of two competing performance factors. With deeper FIFOs, DRAM page misses are amortized over a larger number of total accesses, which can increase performance. At the same time, the processor has to wait longer to complete its first loop iteration while the SMC prefetches numerous operands to be used in the following loop iterations. This can decrease performance, as evidenced by the tail-off beyond depth-32 FIFOS. Optimum FIFO depth should be run-time selectable in the SMC, since it is so closely related to stream length.

Lack of dynamic ordering renders the performance of nonSMC systems particularly sensitive to vector placement. In the graphs depicting long-vector SMC performance, the vectors are aligned so that they all compete for the same bank on each iteration. This has little effect on SMC performance since it reorders requests, but it prevents the nonSMC systems from taking advantage of the potential concurrency. In order to illustrate the effects of alignment on bandwidth, the nonSMC results presented for medium-length vectors represent starting addresses with staggered alignment: the ith vector in the pattern begins in bank (i mod n), where n is the number of banks. In spite of the more favorable alignment, nonSMC daxpy performance is limited to 30.0% of total bandwidth for a two-bank memory; hydro, swap, and vaxpy are limited to 18.8%, 40.0%, and 25.0%, respectively. Since scale uses only one vector, its performance is unchanged.

For a memory system with eight banks, eight-deep FIFOs are inadequate. For a stride-one vector, each bank will be responsible for servicing only one FIFO position, which severely limits the SMC's ability to amortize DRAM page-miss costs. The SMC's memory access pattern for each bank in this case is almost the same as that generated by the processor, hence performance tends to sink towards that of a nonSMC system. Note that even when the SMC can't take advantage of page-mode accesses, it nonetheless prefetches reads and buffers writes, thus it still offers some performance advantages. In general, the greater the concurrency inherent in the memory system, the deeper the SMC's FIFOs need to be in order to amortize each bank's page-miss overhead.

FIG. 14 illustrates SMC performance on very short (10-element) vectors. Performance improvements are not as dramatic as for longer vectors, for there are very few accesses over which to amortize page-miss costs. Nonetheless, short vector computations benefit significantly from an SMC. As noted above, nonSMC performance is, as depicted in FIG. 6 or FIG. 12, dependent on vector alignment.

Algorithm R1

This greedy algorithm is identical to P1, except that only one access may be issued during any one bus cycle. The algorithm examines the banks in round-robin order, beginning with the bank following the one to which the most recent access was made. It attempts to initiate an access (according to the scheme described for P1, above) for the first idle bank it finds. FIGS. 8, 12 and 15 depict R1's performance.

All three bank-selection schemes perform identically for all benchmarks on a single-bank memory system. For this FIFO-selection scheme, R1's performance is extremely similar to that of algorithm P1—for systems with two and four banks, performance is identical. For SMC systems with eight banks, performance of the two schemes differs only for very shallow FIFOs, where the SMC is unable to take advantage of page hits.

In fact, performance of all the R algorithms is remarkably similar to that of the P algorithms. This stems from the design of the SBU. In the parallel scheme, there is a separate bus to each memory bank, allowing the SMC to initiate several accesses at a time. The SBU in the SMC described herein can only process one data value at a time, due to the fact that the FIFOs must be dual-ported in order to allow simultaneous access by both the CPU and the MSU. Implementing an efficient FIFO to allow more than two simultaneous accesses would be much more difficult, and would consume substantially more chip real estate. Thus, read accesses completing simultaneously are effectively serialized, since all but one of them is delayed until the next cycle. Likewise, the SMC can only write one value each bus cycle. This has the effect of staggering the initiation of accesses to the different banks, so that the parallel algorithms end up behaving much like the greedy round-robin approaches. In view of these limitations, a parallel access-initiation scheme would afford substantial performance benefit only if the SBU were able to process several data values at once, or if it processed them serially, but with a cycle time much faster than that of the memory buses.

Algorithm T1

Like P1, Algorithm T1 issues at most one access each bus cycle. Instead of considering each idle bank in turn when attempting to initiate an access, T1 only considers the next bank in round-robin order from the last bank considered. If that bank is busy, or if no ready access to it exists, then no access is initiated at the current time. FIGS. 10, 17 and 18 depict T1's performance.

Again, the performance curves are very similar to those for P1 and R1, with results for all but the shallowest FIFOs differing by less than 1% of attainable bandwidth. Results for FIFOs that are only eight double-words deep vary by more than 15% of attainable bandwidth, but only for the eight-bank memory system, where the SMC cannot take advantage of page hits. Algorithm T1 slightly out performs the other two for some benchmarks. For short vectors, as depicted in FIG. 18, Algorithm T1 delivers a higher percentage of peak bandwidth for the scale and vaxpy benchmarks run on a memory system with two banks, although the margin is only a few percent. For instance, on the scale computation, Algorithm T1 achieves 36.4% of the peak bandwidth on an eight-bank system, whereas Algorithm R1 reaches only 32.8%. The same benchmark on a two-bank architecture yields 69.0% of peak for Algorithm T1, as opposed to 64.5% for Algorithm R1.

The trends among the performances of the P, R, and T bank-selection schemes are present for all groups of algorithms simulated, but there is simply too much data to make meaningful comparisons between all ordering algorithms. Since Scheme T is the most reasonable from an implementation standpoint, testing was focused on ordering algorithms employing this strategy, and Algorithm T1 was as a basis of comparison for performance of the other algorithms.

All the SMC results presented thus far have been for vectors aligned such that corresponding elements of the vectors reside in the same memory bank. This placement degrades the memory performance of nonSMC systems, for it generates bank conflicts and can cause thrashing behavior with respect to DRAM pages. Since the SMC reorders accesses to take advantage of the memory system's available bandwidth, it is relatively insensitive to operand placement and alignment. To illustrate this, FIGS. 19 through 21 depict SMC performance for Algorithm T1 using the same vector alignment as for the nonSMC results in FIG. 11, FIG. 12, and FIG. 17. In this alignment, the ith vector in the pattern begins in bank (i mod n), where "n" is the number of banks. Non-SMC results in FIG. 19 are as in FIG. 10, where vectors are aligned to begin in the same bank. NonSMC results in FIG. 20 use the alignment just describe for this set of SMC experiments, are thus are the same as in FIG. 17. Since swap is unaffected by alignment, results for that benchmark are identical to the corresponding T1 results in FIG. 10, 17, and 18.

The differences in performance are summarized in Table 1. Table entries are obtained by subtracting the performance numbers from FIG. 10, FIG. 17, and FIG. 18 from the corresponding results in FIG. 19, FIG. 20, and FIG. 21. The largest differences occur for memory systems with many banks, especially with shallow FIFOs, where the lack of buffer space prevents the SMC from effectively amortizing page-miss costs. Differences for shorter vectors, although not included here, are smaller still.

TABLE 1

T1 Long Vector Performance Differences
for Two Vector Alignments
Differences in Attained Percentage of Peak Bandwidth
(staggered minus single-bank)

| | | FIFO depth | | | | | |
|---|---|---|---|---|---|---|---|
| benchmark | memory banks | 0 | 16 | 32 | 64 | 128 | 256 |
| copy | 1 | | | | | | |
| | 2 | | | | | | |
| | 4 | | | | | | |
| | 8 | | + | | | | |
| daxpy | 1 | | | − | + | − | + |
| | 2 | + | − | + | − | − | − |
| | 4 | −4.0 | + | − | − | + | − |
| | 8 | −12.0 | −4.0 | + | − | − | − |
| hydro | 1 | + | | | | | |
| | 2 | −1.9 | −1.5 | − | | | |
| | 4 | + | +4.4 | −1.6 | + | −2.4 | − |
| | 8 | − | +3.0 | −3.7 | −1.8 | +5.2 | − |
| swap | 1 | | + | − | | | + |
| | 2 | − | + | + | + | + | + |
| | 4 | − | − | − | | − | + |
| | 8 | | − | −1.2 | | | |
| vaxpy | 1 | + | − | + | + | + | + |
| | 2 | + | + | − | + | + | + |
| | 4 | − | + | + | − | + | + |
| | 8 | −4.0 | + | + | − | + | + |

Group 2—Algorithms P2, R2, and T2

Algorithms P2, R2 and T2 are similar to those described for Group 1—Algorithms P1, R1 and T1, except that they incorporate the notion of a threshold of required service. For each memory bank "b" selected by the access-initiation scheme (P, R, or T), the FIFO-selection algorithm examines the FIFOs in round-robin order, beginning with last FIFO for which an access to "b" was initiated. If it finds an access that hits the current DRAM page, it issues that access. If no accesses for the bank hit the current DRAM page, then it looks for an access from a FIFO containing at least n/2 ready accesses, where "n" is the number of FIFO positions that map to bank "b". If a FIFO requiring the appropriate amount of service is found, an access is initiated. If no such FIFO exists, the algorithm defaults to using the next FIFO (following the one for which the most recent access to bank "b" was initiated), attempting to initiate an access for it.

The performance of the Group 2 algorithms is depicted in FIG. 22 through FIG. 31. Performance is extremely similar to that of the corresponding algorithm from Group 1, generally differing by less than 1% of peak bandwidth. The only exception is the hydro benchmark. For medium-length vectors, FIFOs of depth sixty-four, and an eight-bank memory, Group 1 beats Group 2 by almost 4% of peak, yet for a two-bank system with FIFOs half that depth, the Group 2 algorithms represent a performance gain of over 2% of peak. For longer vectors, the differences are magnified, and the effect of the threshold is erratic. For the four- and eight-bank memories, Group 2 performance varies from 0.3% of peak worse to 6.7% better (most FIFO depths gain at least 4% of peak), and there is no clear trend in the variations in performance. For hydro on very short vectors, Group 1 beats Group 2 by 5.2% of peak for very shallow FIFOs on a two-bank memory system. The fact that the threshold has relatively little effect on the performance for most benchmarks suggests that when a DRAM page change is necessary, the FIFO requiring the most service either meets the threshold or happens to be the default selection.

TABLE 2

Performance of Scheme T2 with Respect to T1
Differences in Attained Percentage of Peak Bandwidth

| | | medium vectors FIFO depth | | | | | long vectors FIFO depth | | | | | |
|---|---|---|---|---|---|---|---|---|---|---|---|---|
| benchmark | banks | 8 | 10 | 32 | 64 | 120 | 8 | 16 | 32 | 61 | 128 | 256 |
| copy | 1 | | | | | | | | | | | |
| | 2 | | | | | | | | + | | + | + |
| | 4 | | | | | | | | + | | | + |
| | 8 | | | | | | | | | | | |
| daxpy | 1 | | | | | | | − | | | | |
| | 2 | + | − | −2.2 | | | + | − | + | + | +2.2 | +1.9 |
| | 4 | | +1.4 | | | | | +5.9 | +1.6 | +1.2 | +4.1 | +4.6 |
| | 8 | | | | −3.6 | | | +5.9 | +6.6 | +6.6 | +5.6 | +6.6 |
| hydro | 1 | | | | | | | | | | | |
| | 2 | | | | | | | + | + | + | + | + |
| | 4 | | | | | | | | + | + | + | + |
| | 8 | | | | | | | | | | | |
| scale | 1 | | | | | | | | | | | |
| | 2 | | | | | | + | − | + | + | + | + |
| | 4 | | | | | | | + | + | + | + | + |
| | 8 | | | | | | | | | | | |
| swap | 1 | | | | | | | | | | | + |
| | 2 | | | | | | + | + | + | + | + | + |
| | 4 | | | | | | | + | + | + | + | + |
| | 8 | | | | | | | | | | | |

TABLE 2-continued

Performance of Scheme T2 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| vaxpy | 1 | | | | | | | | | | − | + |
| | 2 | | | | | | + | + | + | + | + | + |
| | 4 | | | | | | | + | + | + | + | + |
| | 8 | | | | | | | | | | | |

Group 3—Algorithms P3, R3, and T3

Group 3 algorithms are almost identical to Group 2 algorithms, except that when there are no more ready accesses that hit the current page of the chosen bank and no FIFO meets the required threshold for service, no access is initiated. The intent is to amortize the cost of a DRAM page miss over as many page hits as possible. If it is necessary to switch pages but there are sufficiently few accesses that would hit the new page, delay paying the page-miss cost is delayed until there are more accesses to offset the overhead.

The performance of the Group 3 algorithms is depicted in FIG. 32 through FIG. 39. The fact that these algorithms occasionally choose to do nothing has little or no effect on long vector performance. The medium vector performance tends to be slightly lower than for the algorithms in Group 1 or Group 2, and short vector performance generally suffers a bit more.

For long vectors, the differences in performance between the Group 3 and Group 1 schemes is generally within 1% or 2% of peak bandwidth, plus or minus. Again, the hydro benchmark represents the exception. Here the mean performance gain for all FIFO depths and interleaving factors is 4.1% of peak, and the maximum is 10.6% for eight banks and depth-64 FIFOs. Performance is more erratic for medium vectors, ranging from a 5.8% gain in peak bandwidth to an 11.9% drop (as compared with the corresponding Group 1 algorithms). Performance for short vectors exhibits similar fluctuations, ranging from a 6.9% increase in attainable bandwidth for the daxpy and hydro benchmarks, to a 15.3% decrease for copy.

Again, there is no discernible pattern to the performance variations, but now scale is the only benchmark whose performance remains unchanged. For instance, Algorithm R3's performance on daxpy for 100-element vectors and a four-bank memory using sixteen-deep FIFOs is 67.0% of peak. R2 and R1 both deliver 69.3%, a difference of only a few percent. On the copy benchmark on a two-bank system with eight-deep FIFOs, however, the difference goes the other way—R3 attains 68.3% of peak, whereas R2 and R1 deliver 66.4%. For FIFOs of sixteen double-words and the same number of banks, R2 and R1 once again win out with 80.0% over 77.8%.

There seems to be little advantage in waiting for a certain number of accesses to a DRAM page to accumulate before paying the page-miss overhead. Although doing so occasionally improves bandwidth, it also frequently diminishes performance, and the drops seen are about twice as large as the gains. Indeed, performance may suffer appreciably under such a policy. This is advantageous from an implementation standpoint, since incorporating the threshold would require extra circuitry, and complicate the selection logic.

Table 3 summarizes T3's performance with respect to T1. Blank entries indicate that differences, if any, are less than 0.01%. Numerical values are given for differences of magnitude greater than 1%; entries of lesser magnitude are represented by the sign of the difference.

TABLE 3

Performance of Scheme T3 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | + | | | −11.9 | | − | | | + | |
| | 2 | +2.0 | −2.5 | | | −11.5 | | + | + | − | − | + |
| | 4 | | | | | −10.6 | | − | + | − | + | + |
| | 8 | | | | | −7.5 | | | | | − | |
| daxpy | 1 | | | − | | | − | − | − | − | − | − |
| | 2 | +1.8 | − | −1.9 | | | +1.4 | + | + | | − | − |
| | 4 | | | | | | | +1.7 | + | + | + | − |
| | 8 | | | −1.3 | | | | +1.7 | + | + | + |
| hydro | 1 | | | | | | | | | | | |
| | 2 | +5.0 | + | −3.2 | + | | +0.0 | +3.8 | +2.7 | +1.9 | +2.3 | +1.5 |
| | 4 | | +1.5 | −3.2 | − | | +8.3 | +4.4 | +3.0 | +5.2 | +4.4 | |
| | 8 | | | −1.5 | −3.2 | − | | | +6.0 | +10.8 | +6.2 | +8.8 |
| scale | 1 | | | | | | | | | | | |
| | 2 | | | | | | | + | + | + | + | + |
| | 4 | | | | | | | | + | + | + | + |
| | 8 | | | | | | | | | | | |

TABLE 3-continued

Performance of Scheme T3 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| swap | 1 | + | +1.0 | +1.0 | −2.2 | + | + | + | + | − | | − |
| | 2 | + | +1.6 | +2.3 | −1.6 | +1.8 | + | + | + | + | + | + |
| | 4 | | + | +1.2 | −1.2 | +3.8 | | | + | + | + | − |
| | 8 | | | + | +1.4 | +6.0 | | | + | + | + | − |
| vaxpy | 1 | | | −1.6 | | | − | | − | − | − | − |
| | 2 | − | −1.5 | − | | | + | + | + | + | + | + |
| | 4 | | −1.6 | − | | | | + | + | + | + | + |
| | 8 | | | +3.6 | | | | − | + | − | + | |

Group 4—Algorithms P4, R4, and T4

These algorithms simply look for accesses that hit the current page of the selected bank, and if they find none, they choose the next FIFO in sequence. Unlike the previous schemes, they do not try to choose the "best" FIFO to service in the event of a necessary page miss.

Intuitively, it would seem that these "less intelligent" algorithms would not perform as well as their more sophisticated counterparts in Groups 1 through 3. This turns out not to be the case. As depicted in FIG. 40 through FIG. 48, performance of these algorithms rivals that of the corresponding members of Group 1 and Group 2.

For long vectors, shown in FIG. 40, FIG. 43, and FIG. 46, percentages of peak bandwidth obtained by these algorithms are usually within a few tenths (plus or minus) of those obtained by the more sophisticated algorithms. For the hydro benchmark, these algorithms often beat the others by over 10% of the attainable bandwidth (up to 13.2%, in the case of depth-64 FIFOs on an eight-bank memory system).

For medium vectors, depicted in FIG. 41, FIG. 50, and FIG. 53, performance is virtually identical to that for Group 1 on most benchmarks (copy, daxpy, scale, and vaxpy). Hydro again benefits from this simpler FIFO-selection algorithm, although by a somewhat smaller margin than for long vectors. For eight- and sixteen-deep FIFOs, T4 delivers 62.3% and 76.5% of peak bandwidth on a two-bank system, whereas T1 reaches only 57.4% and 72.3%—a difference of over 4% of peak in both cases. On an eight-bank memory using a FIFO depth of sixty-four, however, T4 delivers only 65.2% of the attainable bandwidth, but T1 is able to deliver 68.8%. T1 again beats T4 by a few percent on the swap benchmark for very shallow FIFOs on two- and eight-bank systems. Performance for the P and R schemes is similar: hydro performance of the Group 4 schemes is several percent better than that of the corresponding Group 1 schemes in some cases, but swap performance tends to be a few percent worse in others.

The short vector performance shown in FIG. 42, FIG. 45, and FIG. 48 is precisely the same as for Group 1, except for hydro. Here the Group 4 schemes deliver slightly over 5% less of peak bandwidth than the Group 1 schemes for very shallow FIFOs and a two-bank memory, and they exhibit smaller performance fluctuations for memory systems with a higher interleaving factor. This set of algorithms both performs well (for deeper FIFOs, performance is very competitive with that of the corresponding Group 1 schemes) and would be easier to implement than the others described thus far. The combination of bank-selection and FIFO-selection algorithms represented by T4 would be particularly straightforward.

TABLE 4

Performance of Scheme T4 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | − | | − | | | |
| | 2 | | | | | | − | − | + | + | + | + |
| | 4 | | | | | | + | + | + | + | + | + |
| | 8 | | | | | | | | | | | |
| daxpy | 1 | | | | | | − | − | − | − | − | − |
| | 2 | | | | | | − | − | + | + | + | + |
| | 4 | | | | | | + | + | − | + | + | + |
| | 8 | | | | | | | | | | | |
| hydro | 1 | | | | | | − | − | − | − | − | + |
| | 2 | +4.9 | +4.2 | +1.4 | | | +7.1 | +6.5 | +6.3 | +3.3 | +3.0 | +2.2 |
| | 4 | +4.8 | +3.0 | +2.1 | | | +7.1 | +10.2 | +7.2 | +6.2 | +8.5 | +5.3 |
| | 8 | +2.2 | +2.9 | +2.4 | −3.6 | | +2.7 | +9.2 | +10.4 | +13.2 | +10.7 | +8.6 |
| scale | 1 | | | | | | | | | | | |
| | 2 | | | | | | + | + | + | + | + | + |
| | 4 | | | | | | + | + | + | + | + | + |
| | 8 | | | | | | | | | | | |

TABLE 4-continued

Performance of Scheme T4 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| swap | 1 | | | | | | − | − | − | − | − | − |
| | 2 | | | | | | + | − | + | + | + | + |
| | 4 | | | | | | + | + | + | + | + | + |
| | 8 | −2.3 | | | | | −3.8 | | | | | |
| vaxpy | 1 | | | | | | − | − | − | − | + | + |
| | 2 | | | | | | + | + | + | + | + | + |
| | 4 | | | | | | + | + | + | + | + | + |
| | 8 | | | | | | | | | | | |

Group 5—Algorithms P5, R5, and T5

Group 4 indicated that a simpler ordering algorithm may yield better performance. The problems arises, however, as to how simple can the scheme be and still achieve high bandwidth. To determine this, an ordering scheme that doesn't even look for accesses that hit a bank's current DRAM page was implemented. These algorithms merely issue accesses for the current FIFO until no more ready accesses remain, then they move on to the next FIFO in round-robin order. FIG. 49 through FIG. 57 illustrate the performance of this group of algorithms.

FIG. 49, FIG. 52, and FIG. 55 illustrate long vector SMC performance. The curves for copy and scale are virtually identical to those for Algorithm P1. On the hydro benchmark, performance is identical to that of the Group 4 schemes. For daxpy, swap, and vaxpy using shallower FIFOs, the performance for eightbank memory systems is worse than that for the Group 1 schemes—up to 17.1% of attainable bandwidth less for T5 on swap using eight-deep FIFOs and an eight-bank system, or a 13% of peak drop over T4's performance. When FIFO depth is scaled with the interleaving factor, performance differences are small.

Medium vector SMC performance is depicted in FIG. 50, FIG. 53, and FIG. 56. These performance curves exhibit similar trends as those for long vectors when compared with the corresponding curves for Group 1. Daxpy and vaxpy fare slightly worse for shallow FIFOs, and swap's performance is slightly lower overall. Again, these algorithms achieve a higher percentage of peak bandwidth on the hydro benchmark, but performance drops slightly (3.6% of peak) for depth-64 FIFOs and an eight-bank memory. For deep FIFOS, performance for all benchmarks converges to that achieved by the other selection algorithms.

Short vector performance is almost identical to that of the corresponding algorithms in Group 4, except for a slight drops for eight banks and shallow FIFOs.

TABLE 5

Performance of Scheme T5 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | − | | − | | | |
| | 2 | | | | | | − | − | + | + | + | + |
| | 4 | | | | | | + | + | + | + | + | + |
| | 8 | | | | | | | | | | | |
| daxpy | 1 | +1.2 | + | | | | − | − | − | + | + | + |
| | 2 | | +1.6 | +1.2 | | | + | − | + | + | + | + |
| | 4 | −2.9 | − | +2.4 | | | − | − | − | − | + | + |
| | 8 | 8.4 | − | − | | | −12.8 | + | − | − | | + |
| hydro | 1 | | | | | | − | − | − | − | − | + |
| | 2 | +4.9 | +4.2 | +1.4 | | | +7.1 | +6.5 | +5.3 | +3.3 | +3.0 | +2.2 |
| | 4 | +4.8 | +3.0 | +2.1 | | | +7.1 | +10.2 | +7.2 | +6.2 | +6.5 | +5.3 |
| | 8 | +2.2 | +2.9 | +2.4 | −3.6 | | +2.7 | +9.2 | +10.4 | +13.2 | +10.7 | +8.8 |
| scale | 1 | | | | | | | | | | | |
| | 2 | | | | | | + | | + | | | |
| | 4 | | | | | | + | + | + | + | + | + |
| | 8 | | | | | | | | | | | |
| swap | 1 | − | | | | | − | − | − | − | − | + |
| | 2 | −3.4 | −1.0 | | | | −3.0 | − | − | − | + | + |
| | 4 | −3.3 | −3.0 | | | | −4.2 | −3.1 | −1.1 | − | − | + |
| | 8 | −12.1 | −3.7 | −2.5 | | | −17.1 | −4.2 | −3.1 | −1.1 | − | − |
| vaxpy | 1 | + | + | | | | − | − | − | | + | + |
| | 2 | + | + | | | | + | + | + | + | + | + |
| | 4 | −2.0 | − | | | | −3.0 | + | − | + | + | + |
| | 8 | −2.4 | −2.0 | | | | −4.0 | −4.6 | | − | − | + |

Group 6—Algorithms A1 and A2

The algorithms discussed thus far generate memory accesses by first choosing a bank (or banks) to access, and then choosing the appropriate FIFO (or FIFOS) for which to initiate accesses. The algorithms in Group 6 perform their duties in the opposite order: first they choose a FIFO to service, and then they choose the bank to access.

Algorithm A1 goes round-robin through the FIFOs, initiating accesses for the current FIFO until it contains no ready accesses. At that point, the SMC advances to the next FIFO and proceeds to initiate accesses for it. While servicing a particular FIFO, if the next ready access from that FIFO is to a busy bank, the SMC waits until the bank is idle, it does not try to find an access to a currently idle bank. Results for this ordering scheme are depicted in FIG. 58 through FIG. 60.

Figure 9:
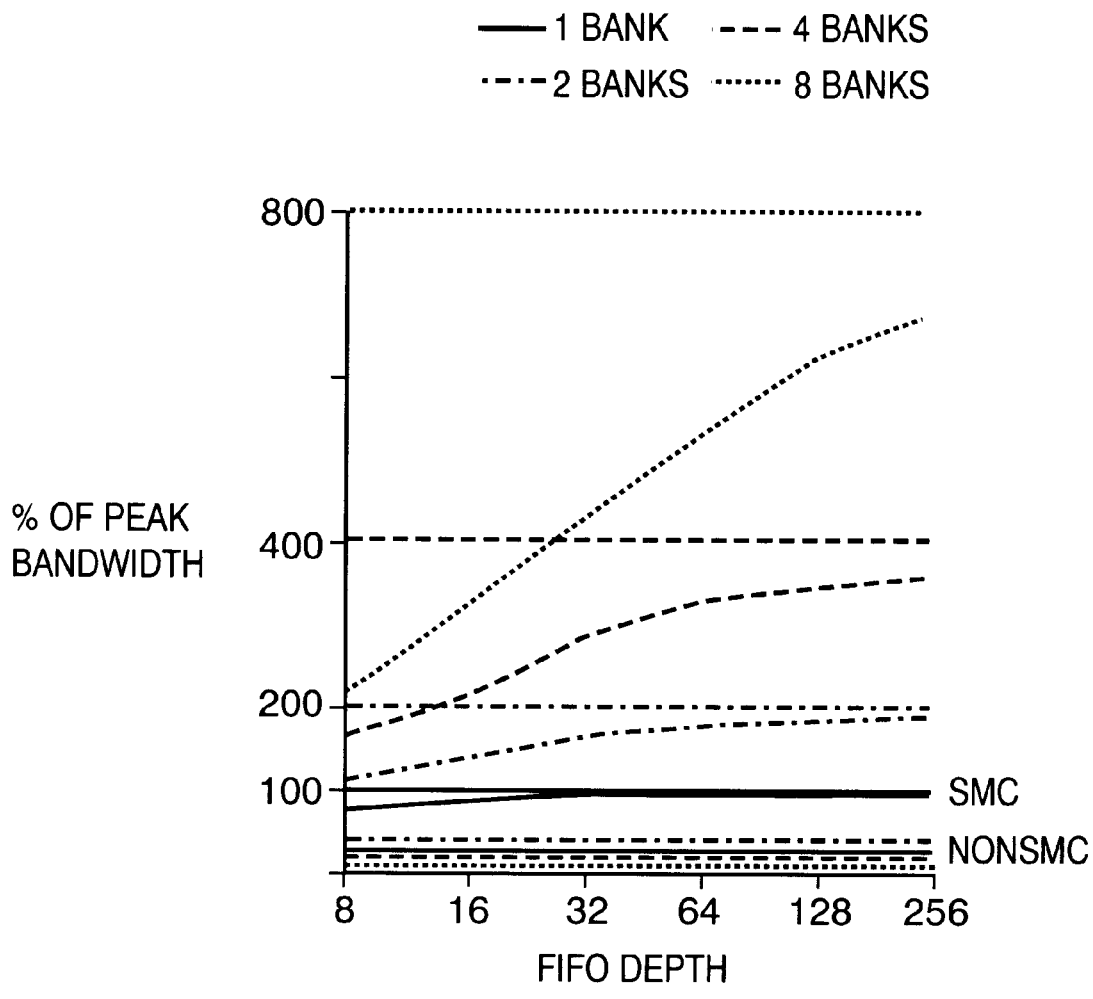
FIG. 9 is a graph representation of A2—Long Vector Performance
Figure 10A:
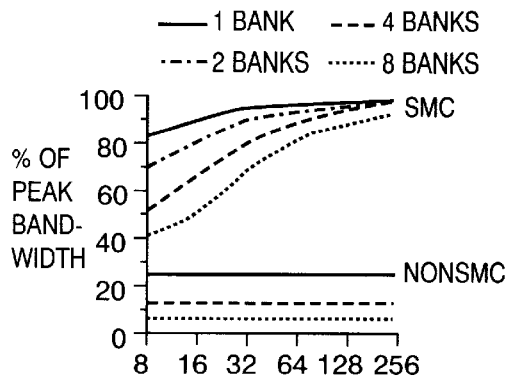
FIGS. 10a, 10b, 10c, 10d, 10e and 10f are graphical representations of T1—Long Vector Performance.
Figure 10B:
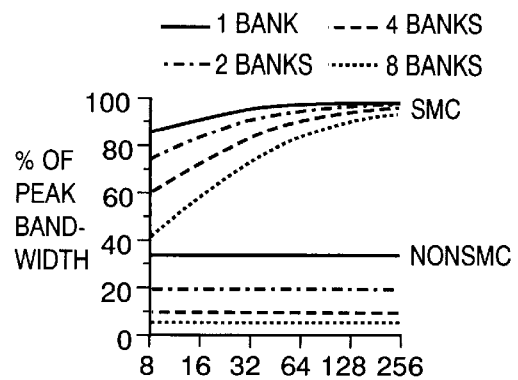
Figure 10C:
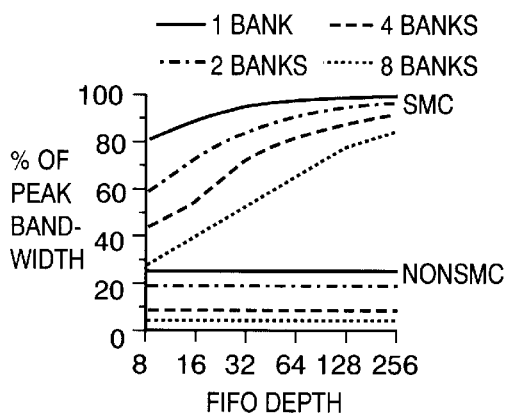
Figure 10D:
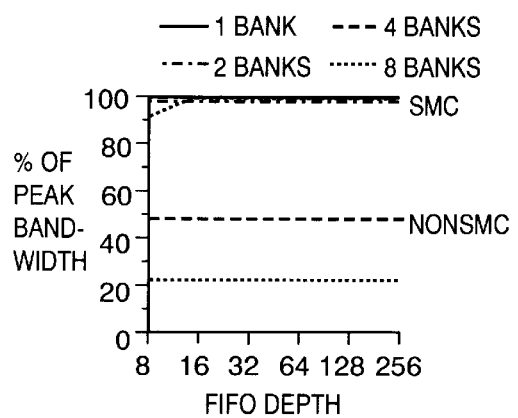
Figure 10E:
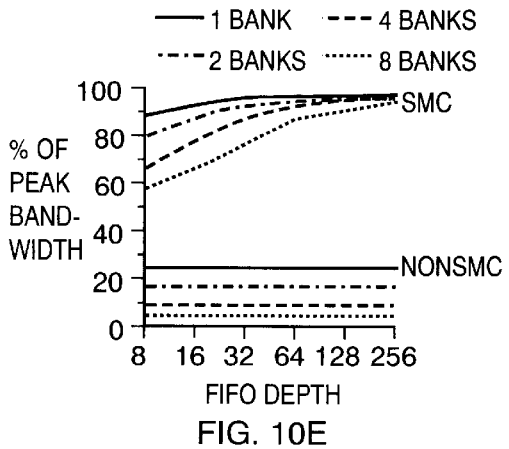
Figure 10F:
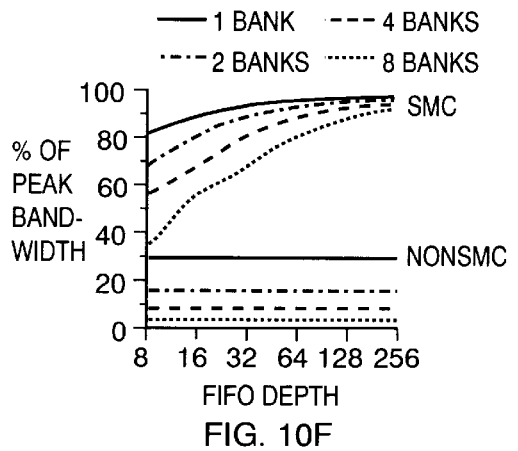
Figure 11A:
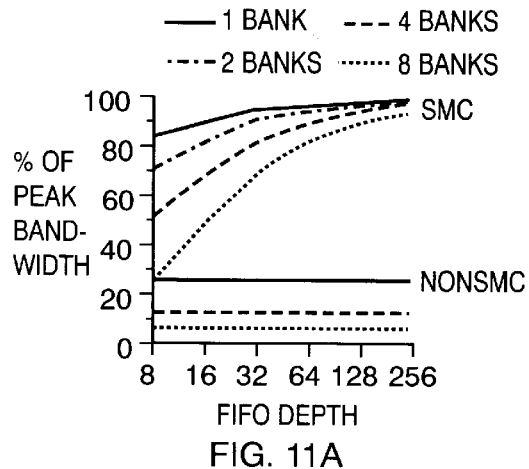
FIGS. 11a, 11b, 11c, 11d, 11e and 11f are graphical representations of P1—Medium Vector Performance (for better nonSMC alignment)
Figure 11B:
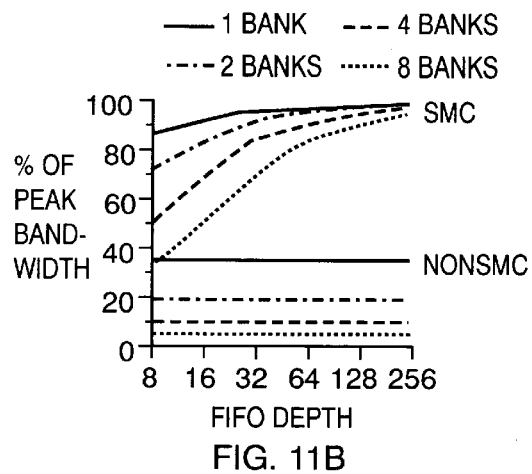
Figure 11C:
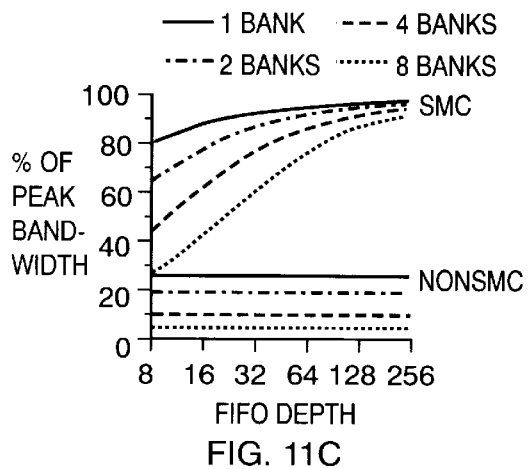
Figure 11D:
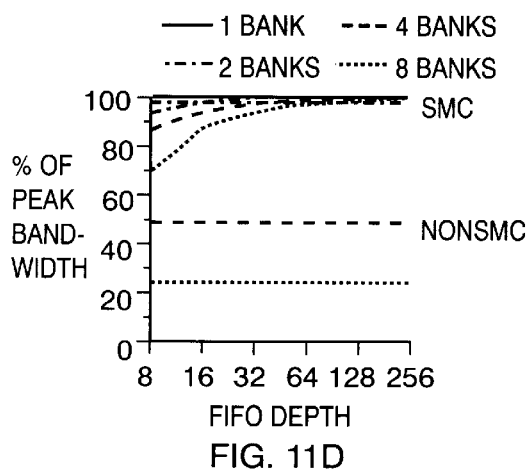
Figure 11E:
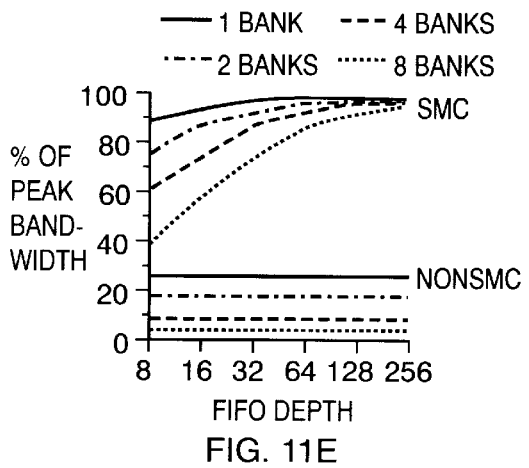
Figure 11F:
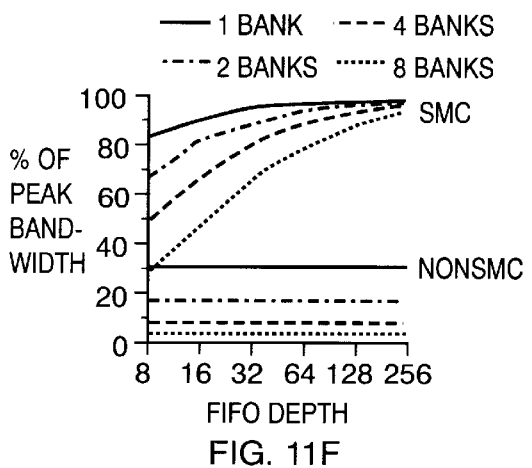
Figure 12A:
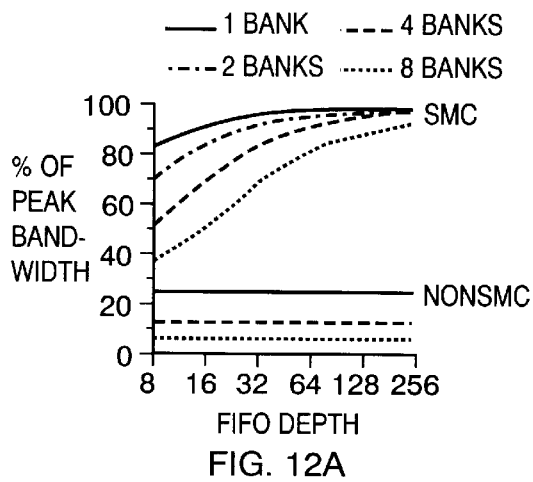
FIGS. 12a, 12b, 12c, 12d, 12e and 12f are graphical representations of R1—Medium Vector Performance (for better nonSMC alignment)
Figure 12B:
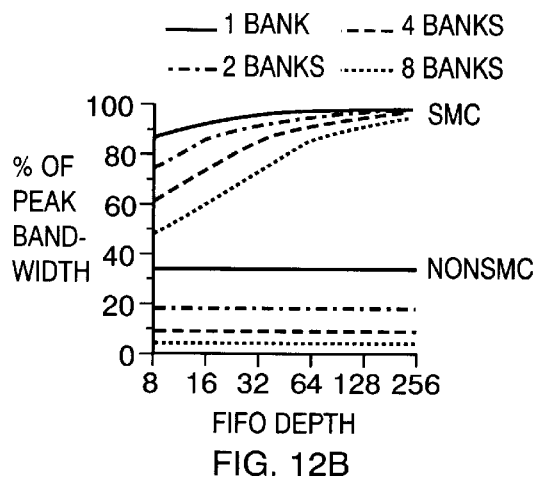
Figure 12C:
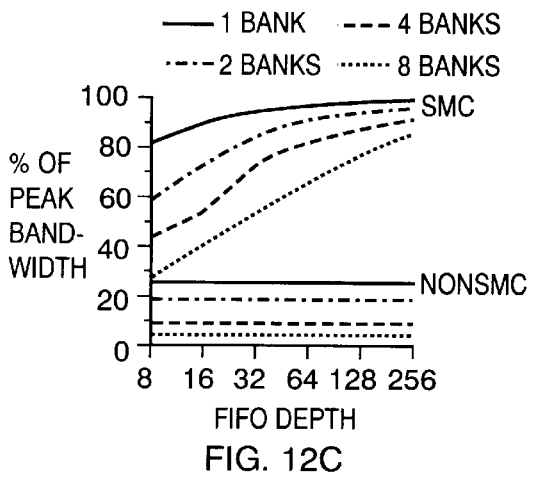
Figure 12D:
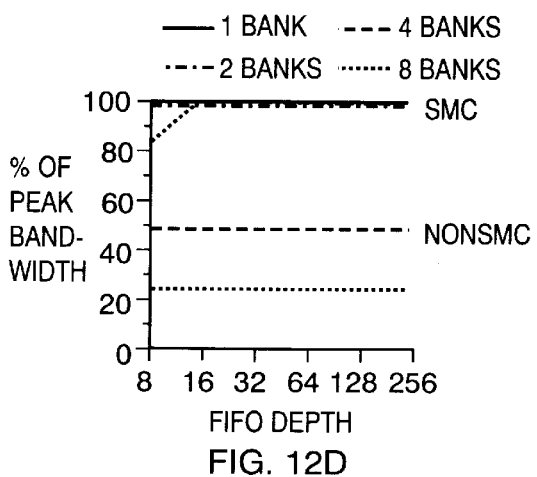
Figure 12E:
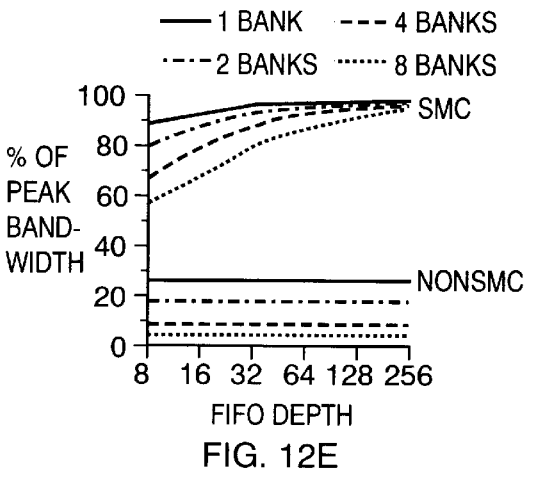
Figure 12F:
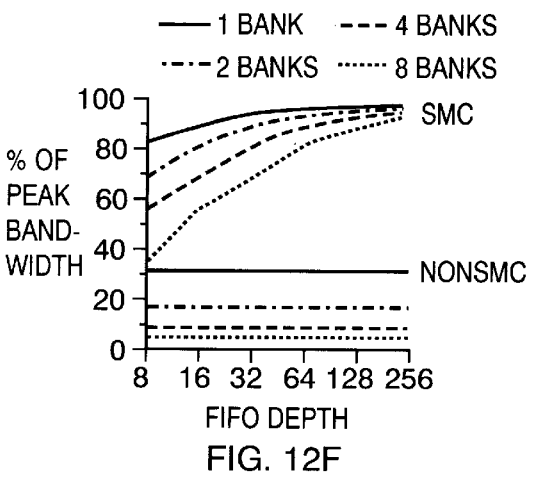
Figure 13A:
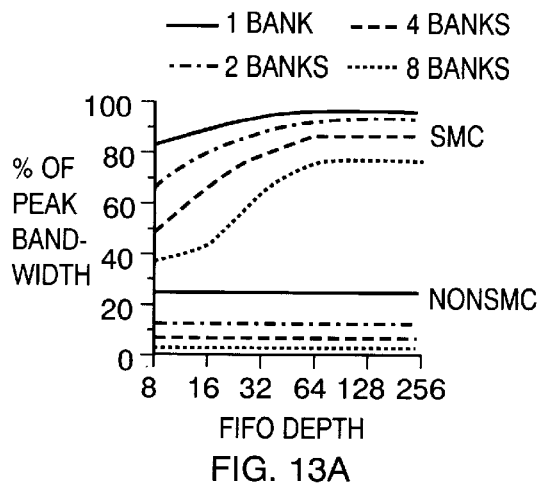
FIGS. 13a, 13b, 13c, 13d, 13e and 13f are graphical representations of A2—Medium Vector Performance.
Figure 13B:
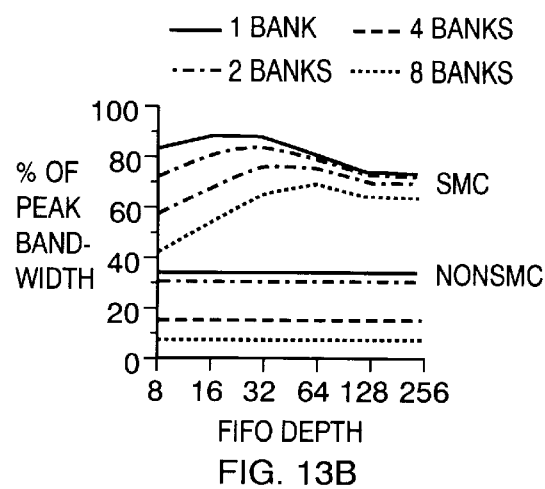
Figure 13C:
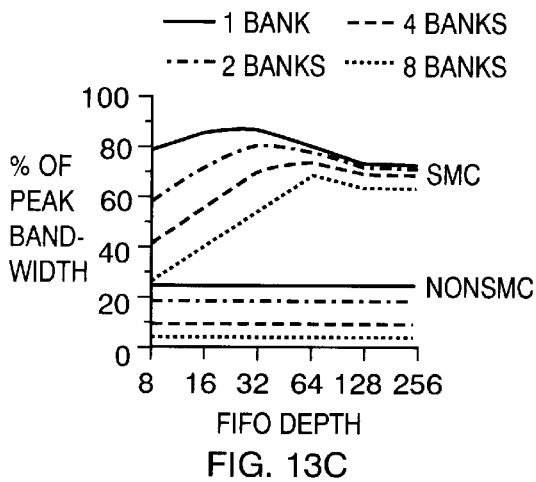
Figure 13D:
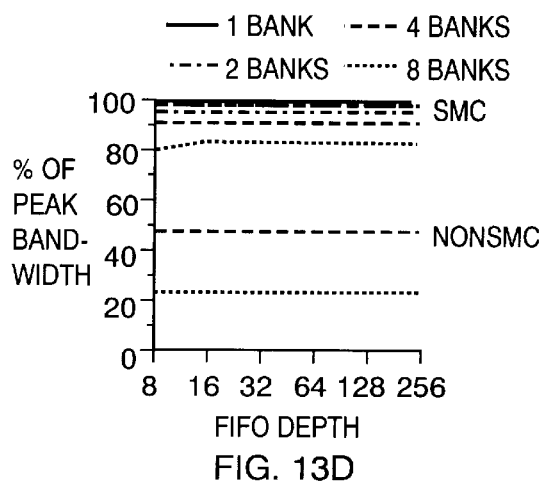
Figure 13E:
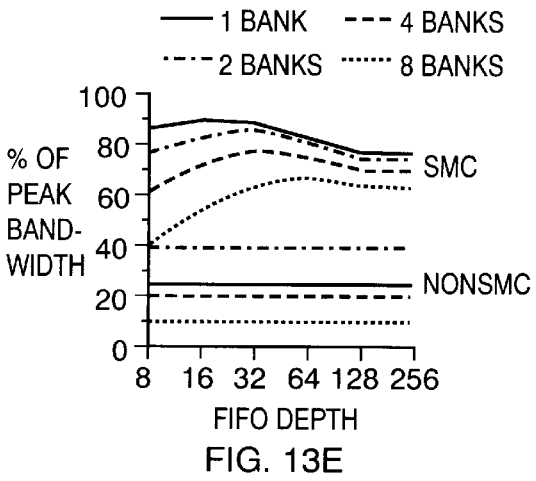
Figure 13F:
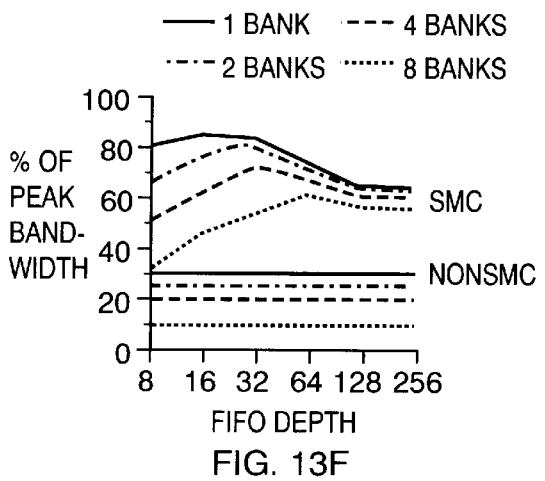
Figure 14A:
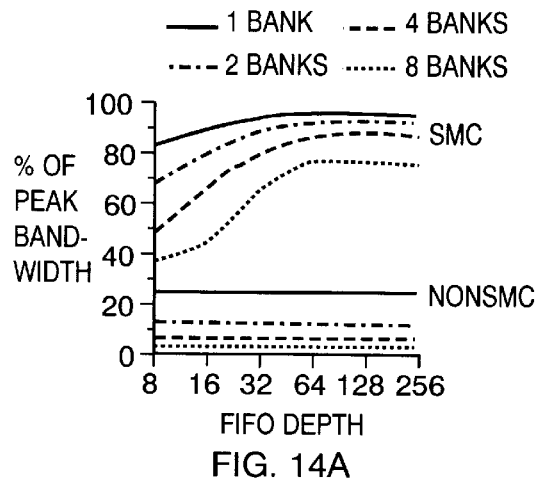
FIGS. 14a, 14b, 14c, 14d, 14e and 14f are graphical representations of P1—Short Vector Performance.
Figure 14B:
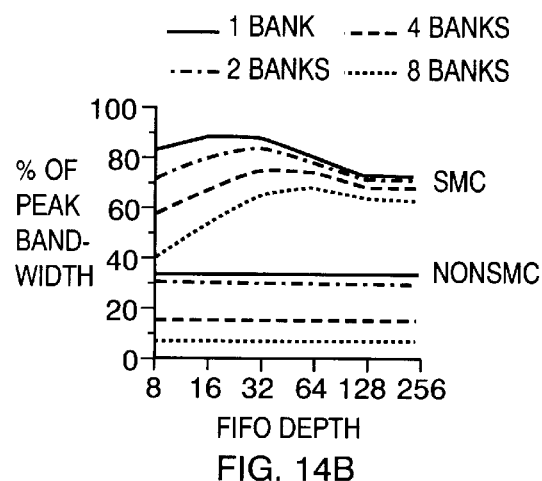
Figure 14C:
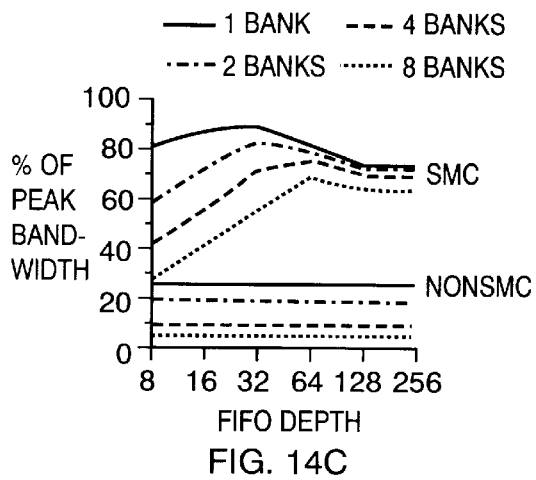
Figure 14D:
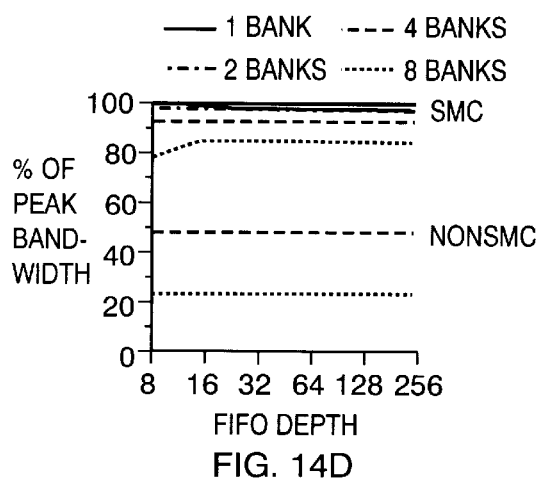
Figure 14E:
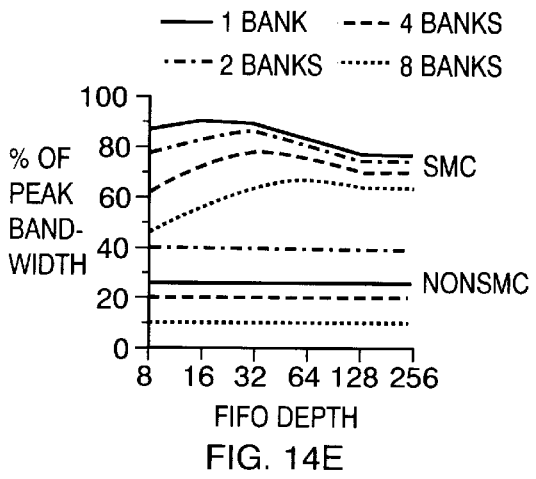
Figure 14F:
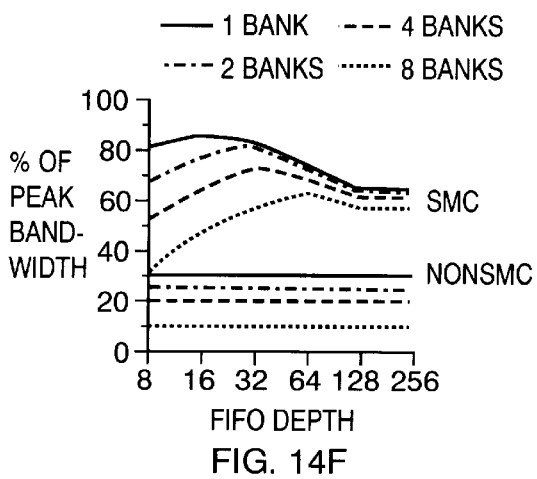
Figure 15A:
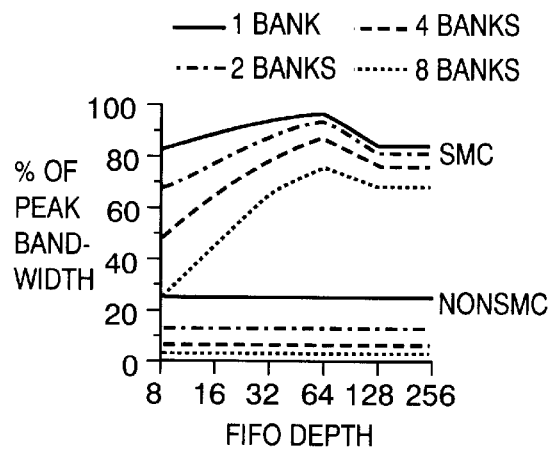
FIGS. 15a, 15b, 15c, 15d, 15e and 15f are graphical representations of R1—Short Vector Performance.
Figure 15B:
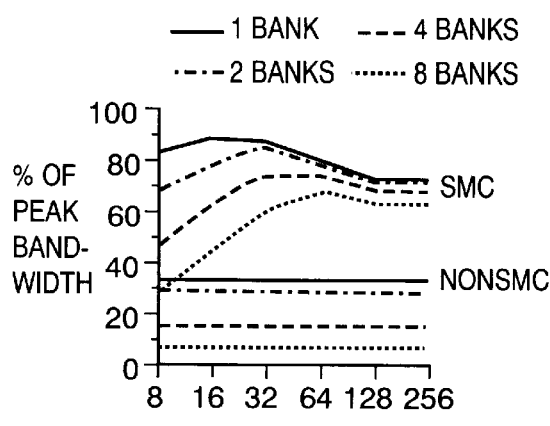
Figure 15C:
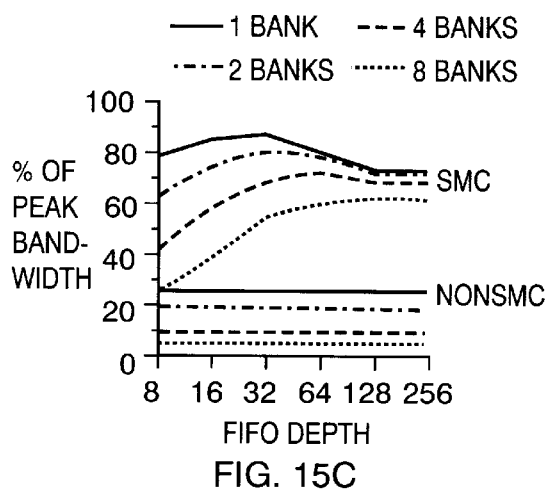
Figure 15D:
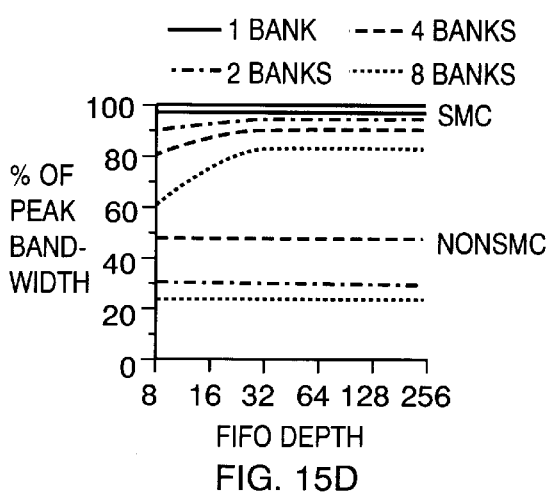
Figure 15E:
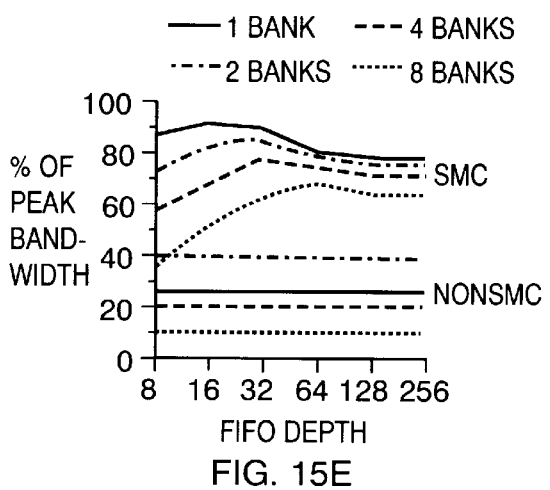
Figure 15F:
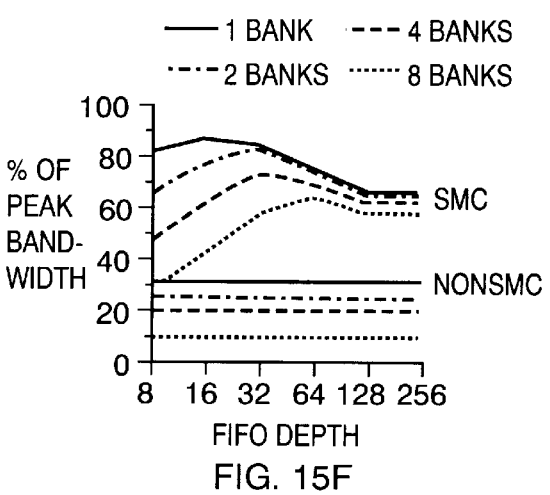
Figure 16A:
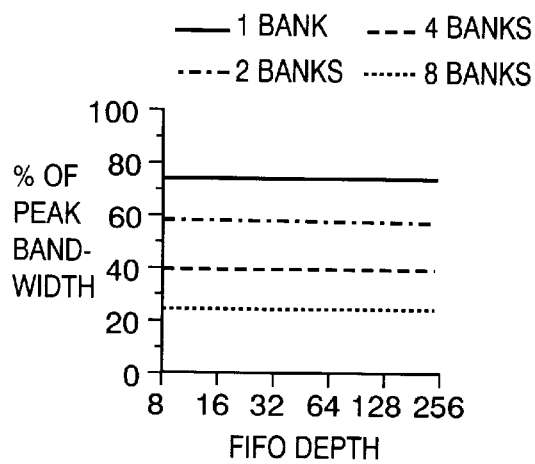
FIGS. 16a, 16b, 16c, 16d, 16e and 16f are graphical representations of A2—Short Vector Performance.
Figure 16B:
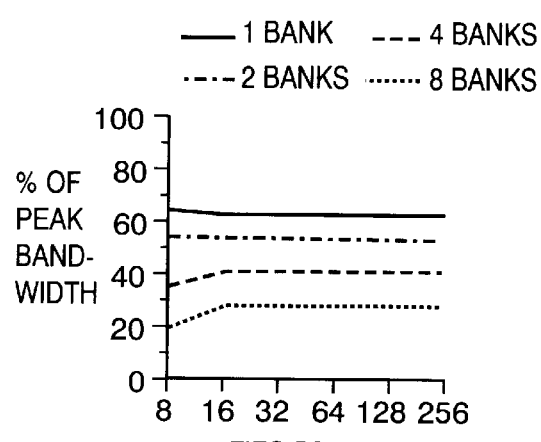
Figure 16C:
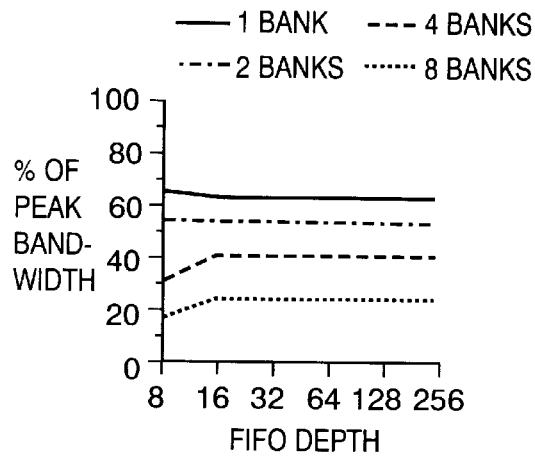
Figure 16D:
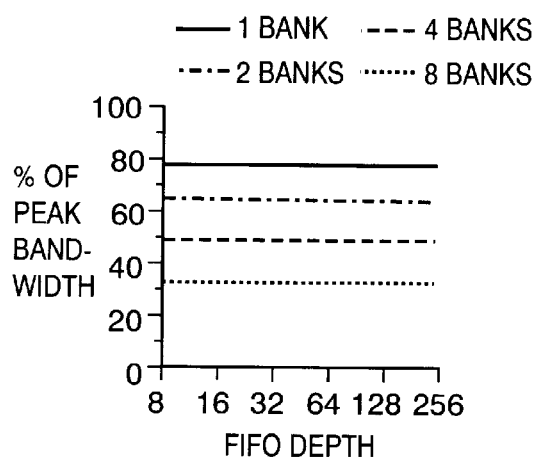
Figure 16E:
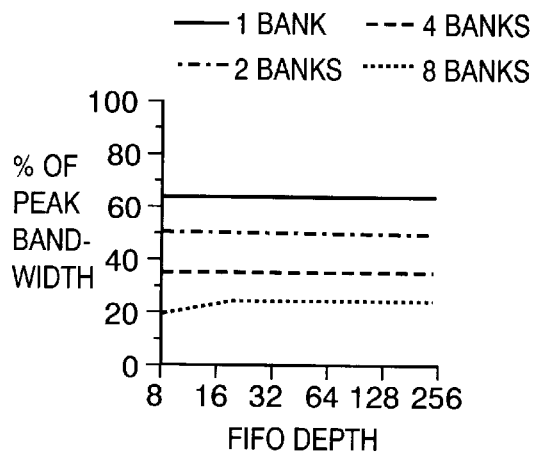
Figure 16F:
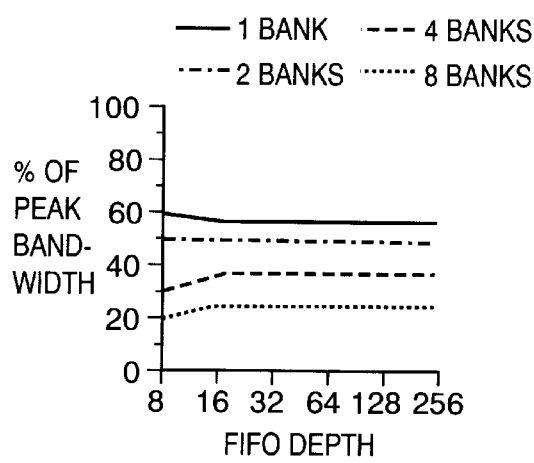
Figure 17A:
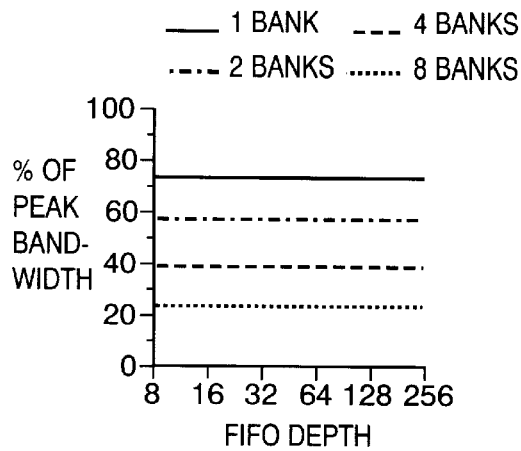
FIGS. 17a, 17b, 17c, 17d, 17e and 17f are graphical representations of T1—Medium Vector Performance (for better nonSMC alignment)
Figure 17B:
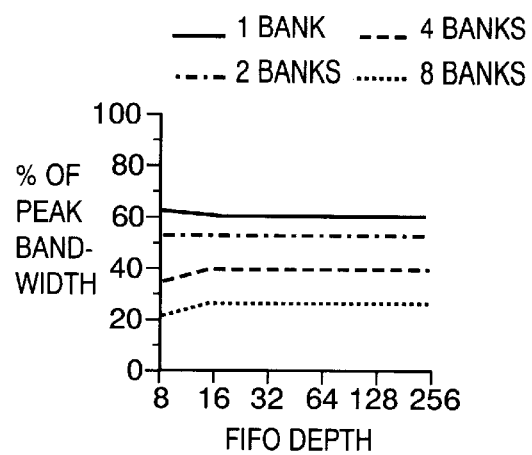
Figure 17C:
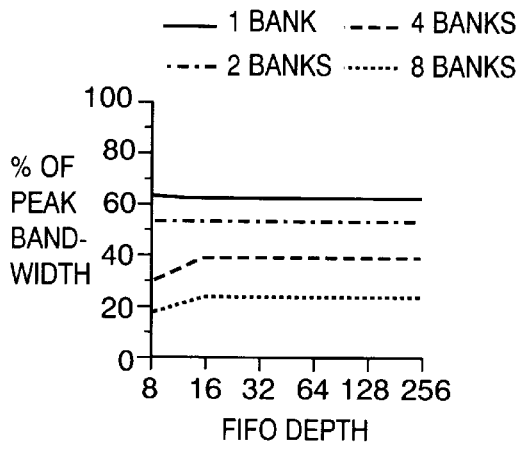
Figure 17D:
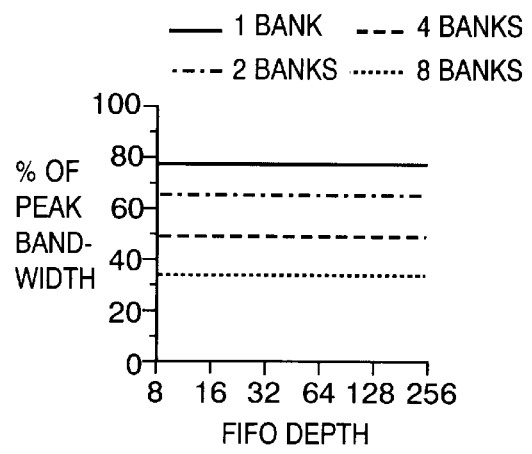
Figure 17E:
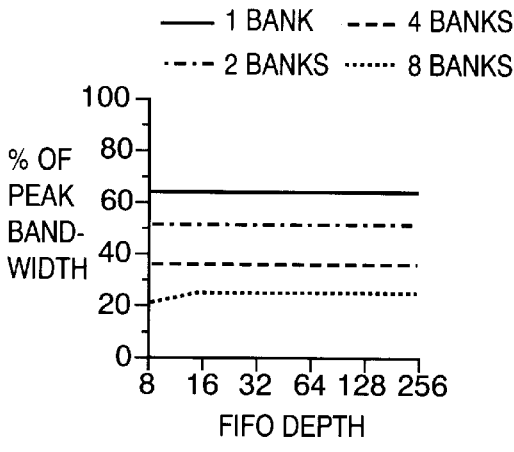
Figure 17F:
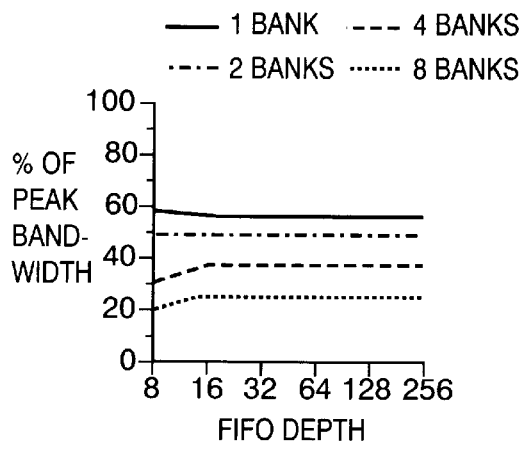
Figure 18A:
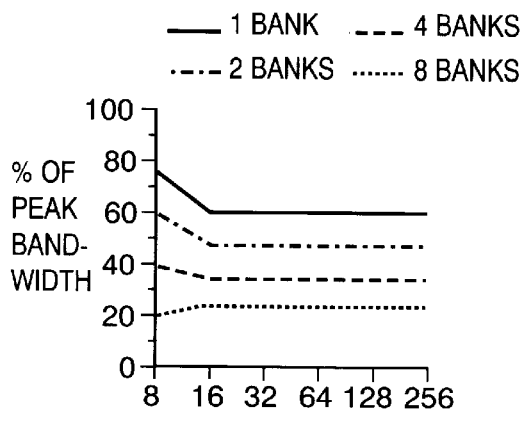
FIGS. 18a, 18b, 18c, 18d, 18e and 18f are graphical representations of T1—Short Vector Performance.
Figure 18B:
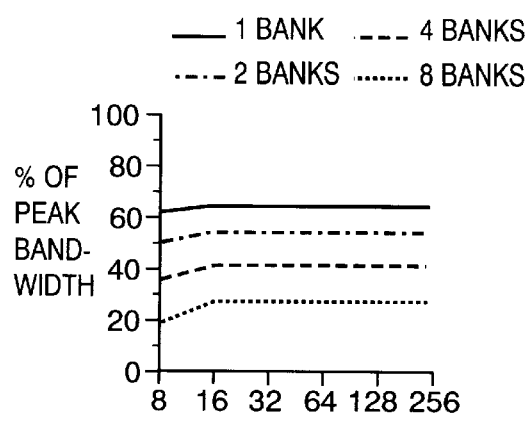
Figure 18C:
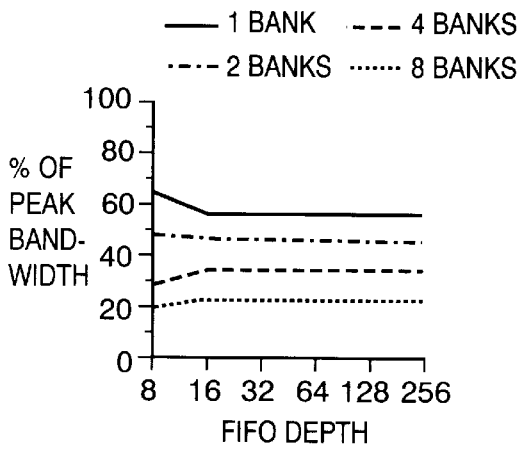
Figure 18D:
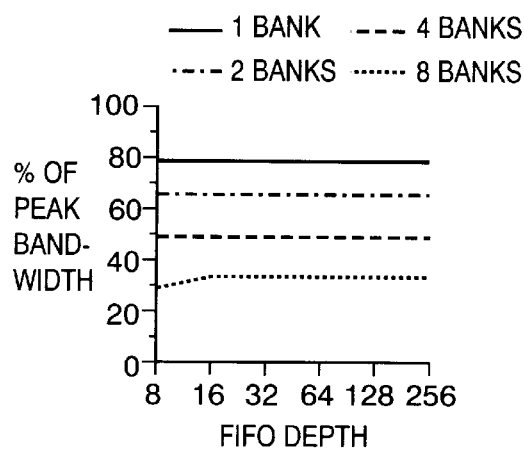
Figure 18E:
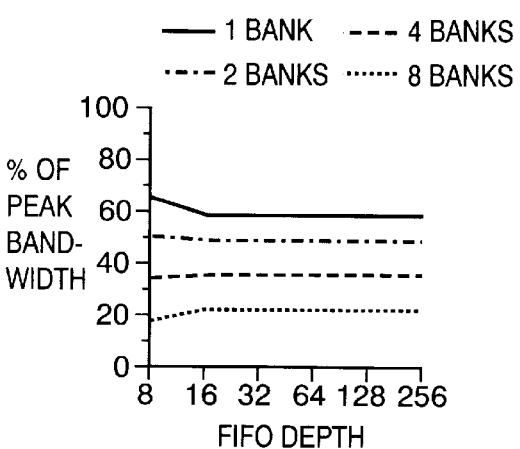
Figure 18F:
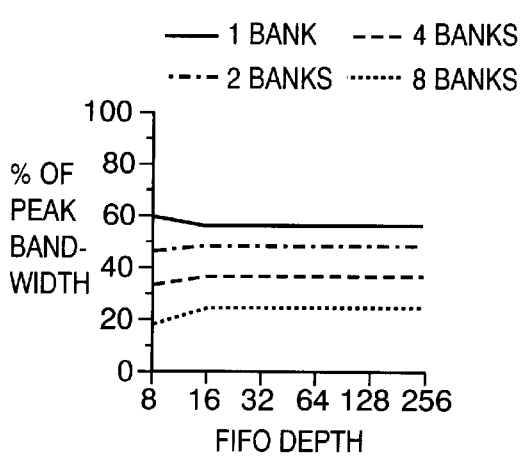
Figure 19A:
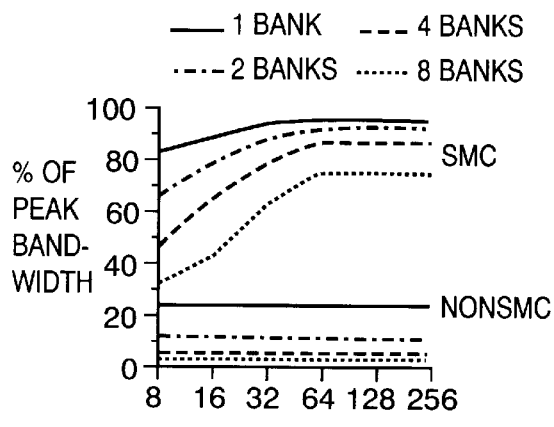
FIGS. 19a, 19b, 19c, 19d, 19e and 19f are graphical representations of T1—Long Vector Performance for a Different SMC Vector Alignment.
Figure 19B:
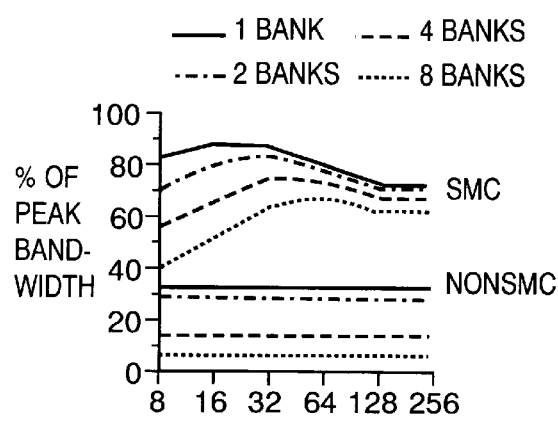
Figure 19C:
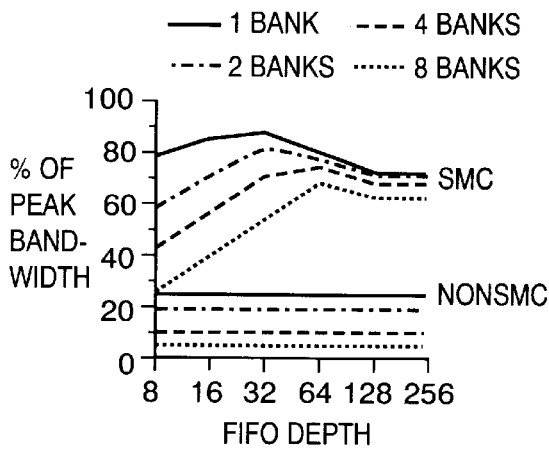
Figure 19D:
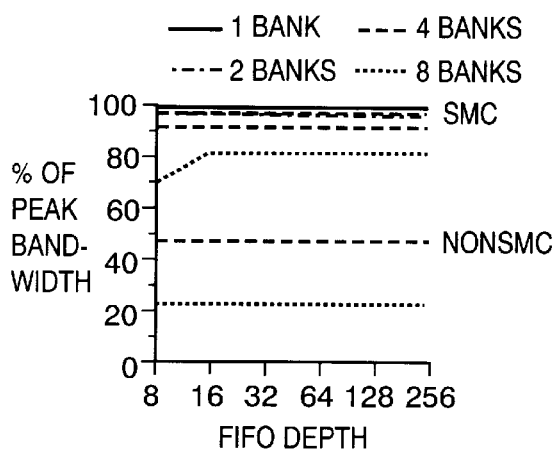
Figure 19E:
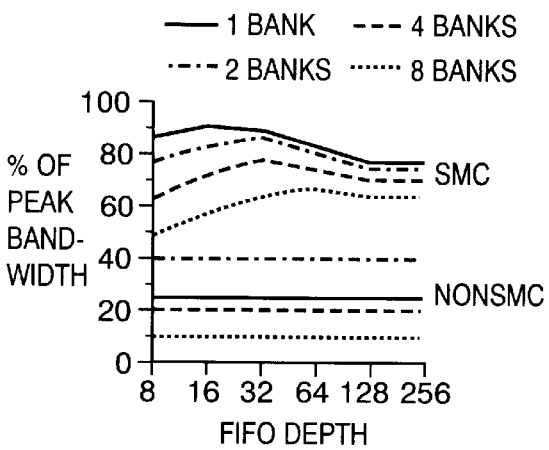
Figure 19F:
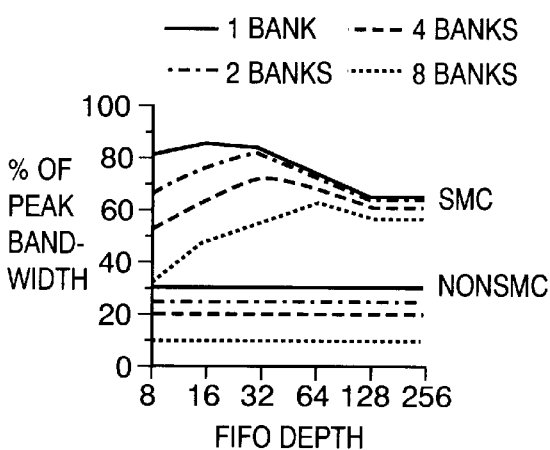
Figure 20A:
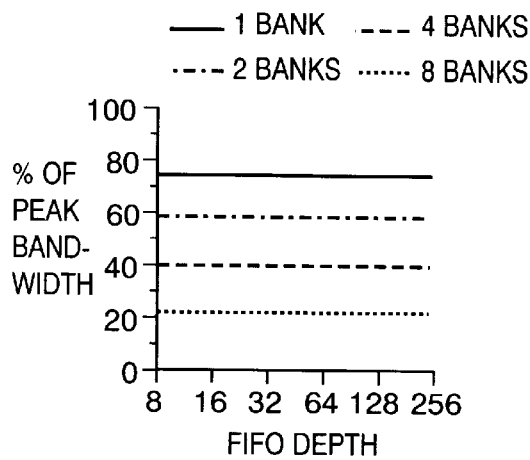
FIGS. 20a, 20b, 20c, 20d, 20e and 20f are graphical representations of T1—Medium Vector Performance for a Different SMC Vector Alignment.
Figure 20B:
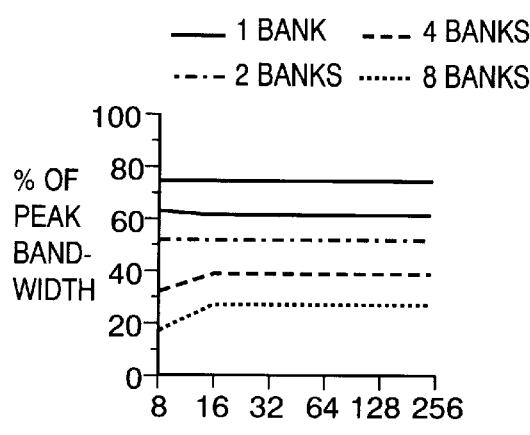
Figure 20C:
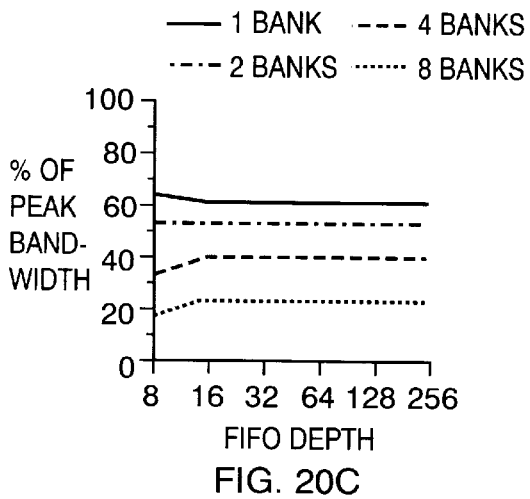
Figure 20D:
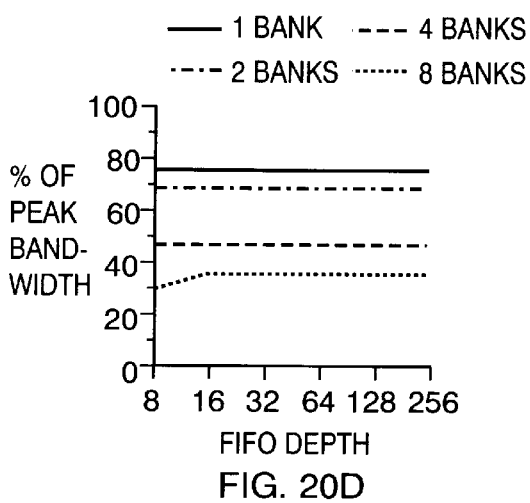
Figure 20E:
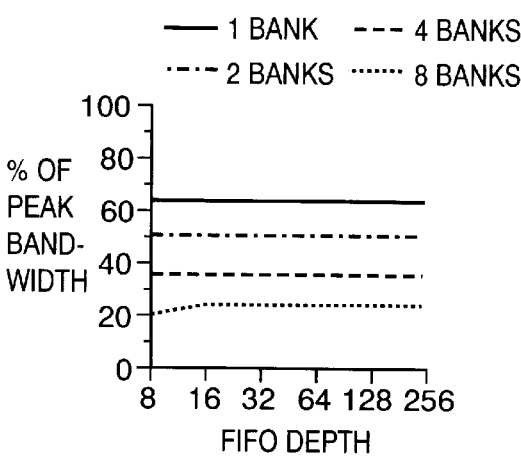
Figure 20F:
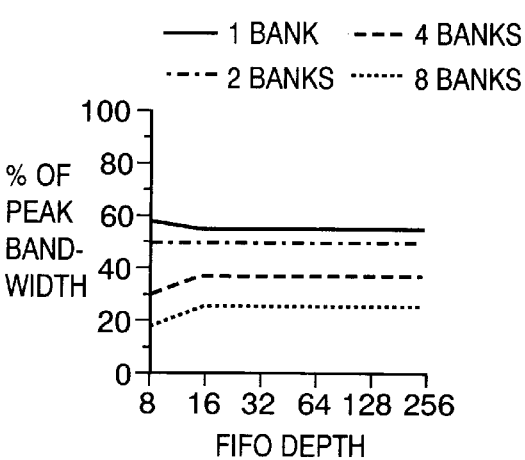
Figure 21A:
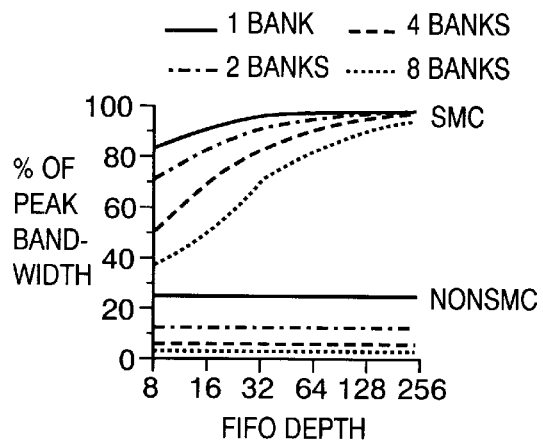
FIGS. 21a, 21b, 21c, 21d, 21e and 21f are graphical representations of T1—Short Vector Performance for a Different Vector Alignment.
Figure 21B:
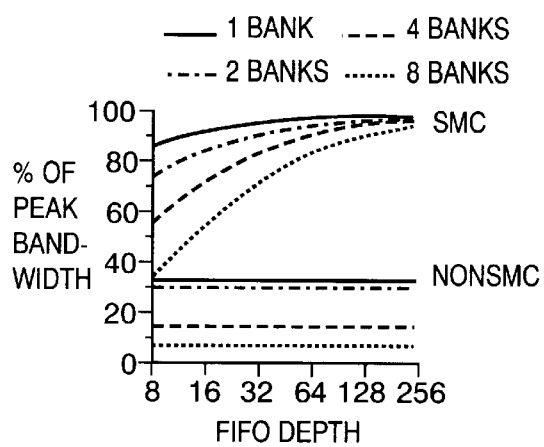
Figure 21C:
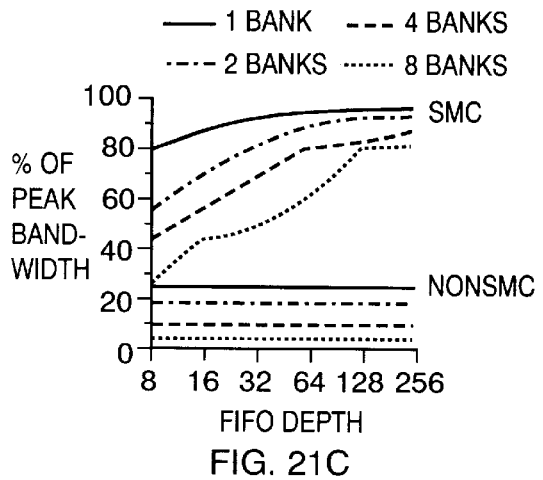
Figure 21D:
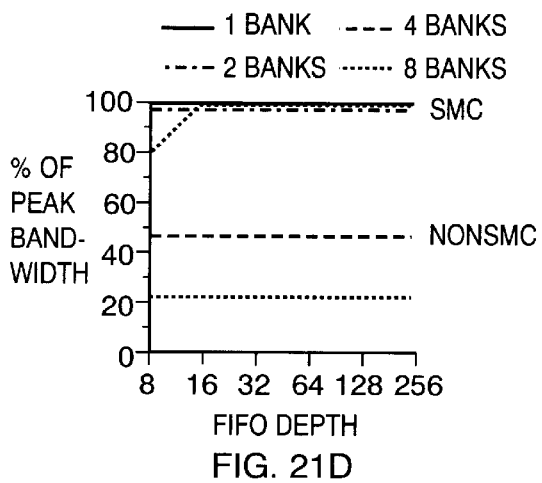
Figure 21E:
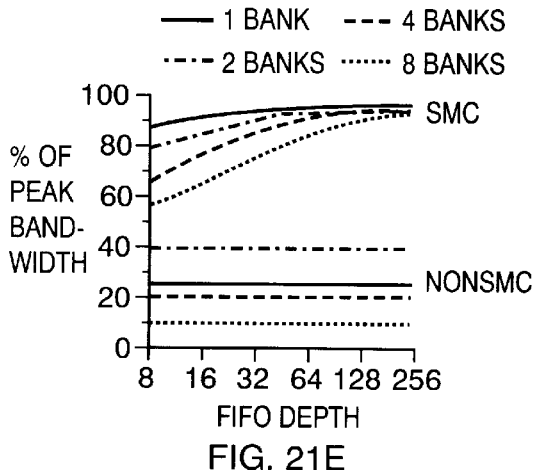
Figure 21F:
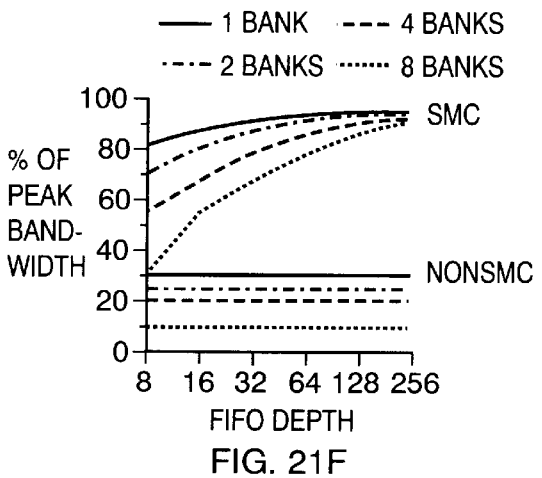
Figure 22A:
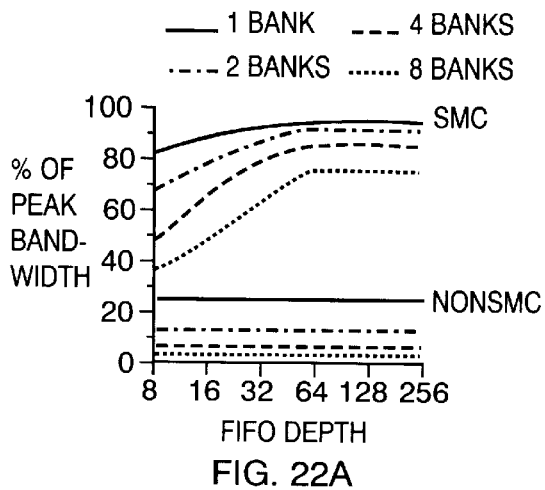
FIGS. 22a, 22b, 22c, 22d, 22e and 22f are graphical representations of P2—Long Vector Performance.
Figure 22B:
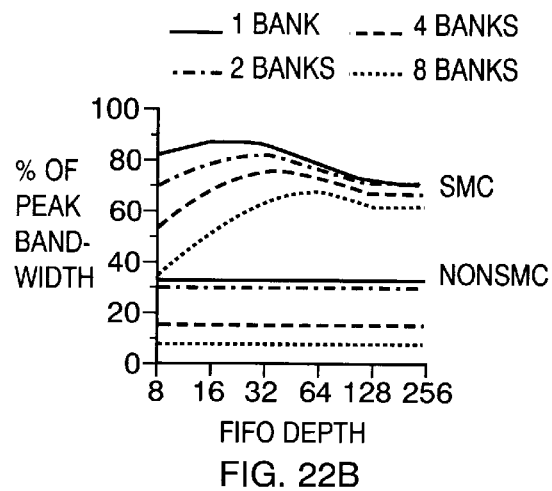
Figure 22C:
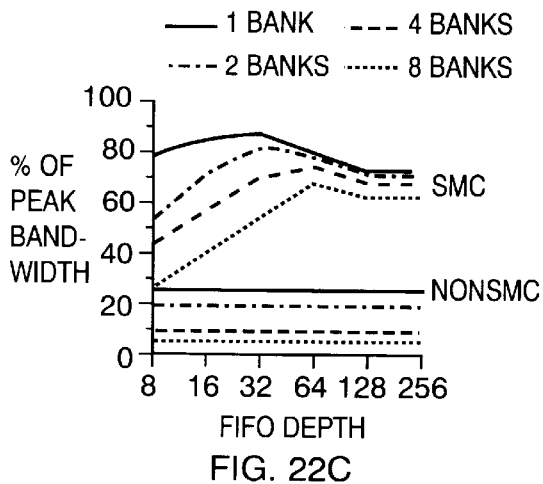
Figure 22D:
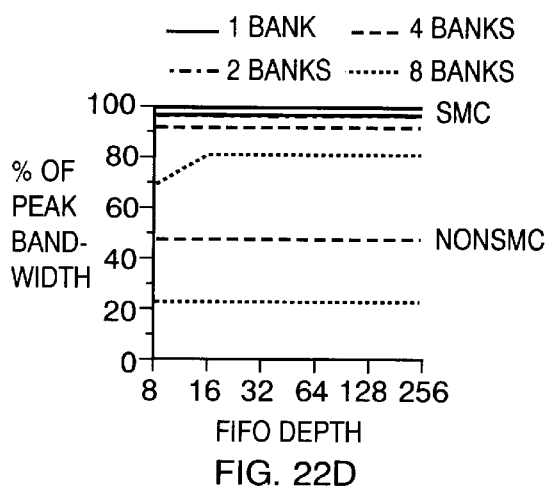
Figure 22E:
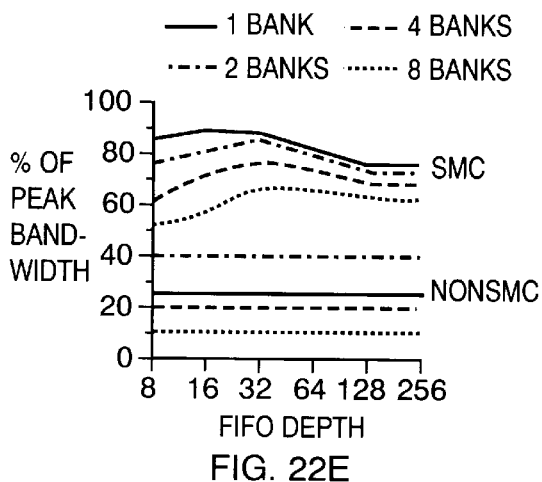
Figure 22F:
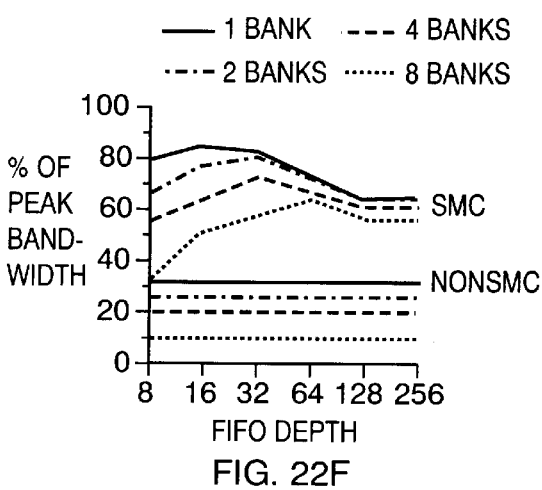
Figure 23A:
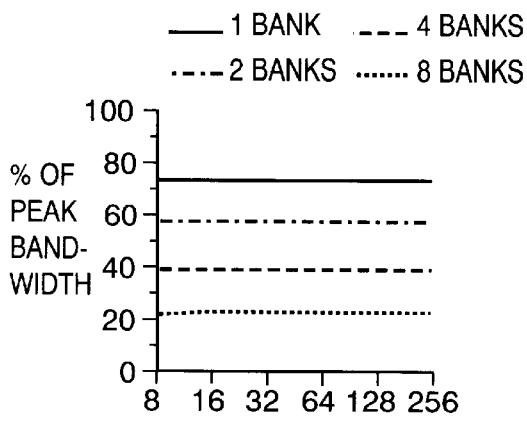
FIGS. 23a, 23b, 23c, 23d, 23e and 23f are graphical representations of P2—Medium Vector Performance (for better nonSMC alignment)
Figure 23B:
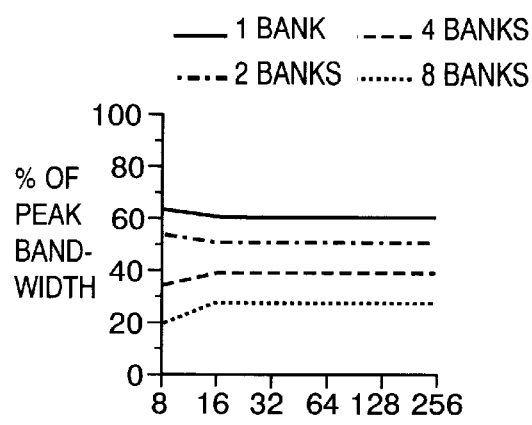
Figure 23C:
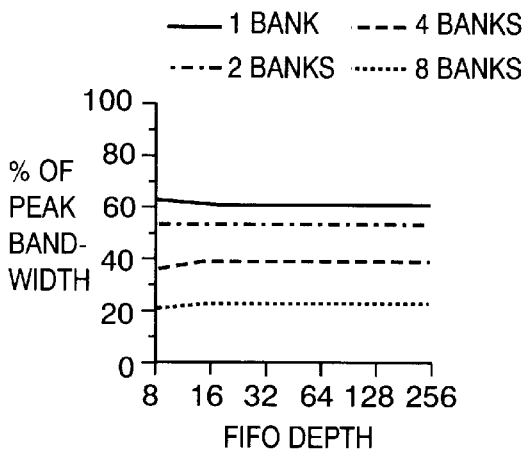
Figure 23D:
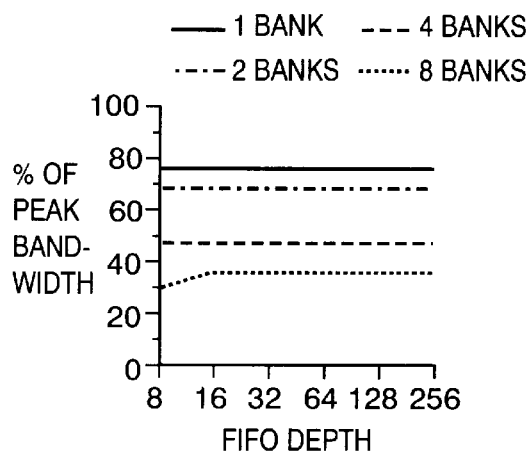
Figure 23E:
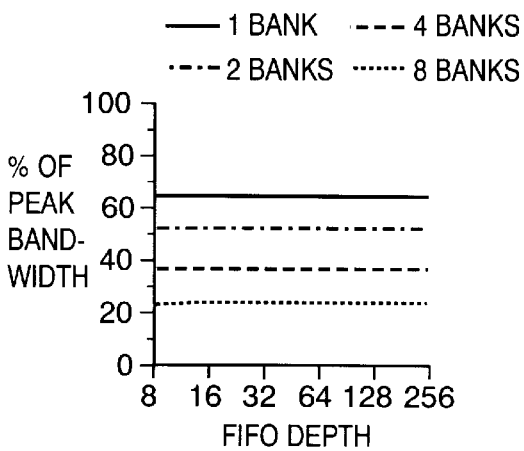
Figure 23F:
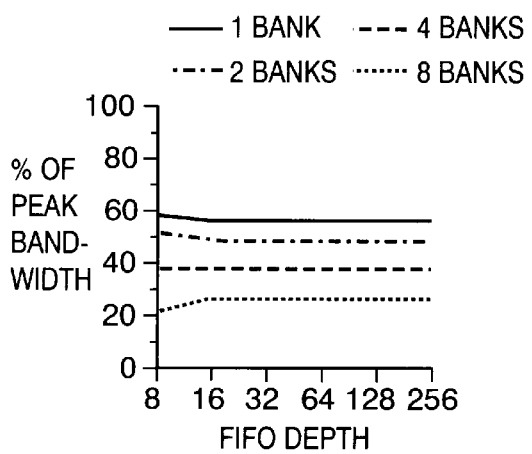
Figure 24A:
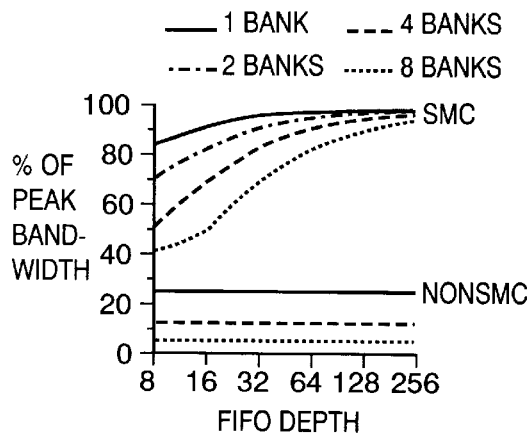
FIGS. 24a, 24b, 24c, 24d, 24e and 24f are graphical representations of P2—Short Vector Performance.
Figure 24B:
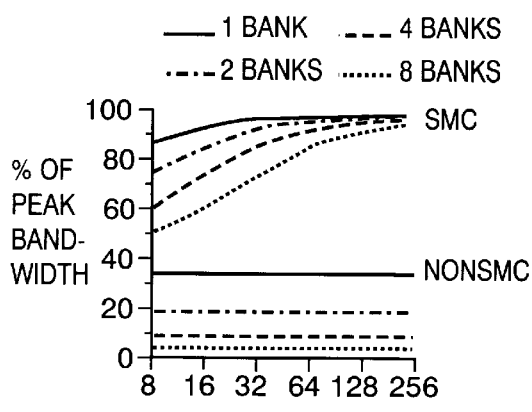
Figure 24C:
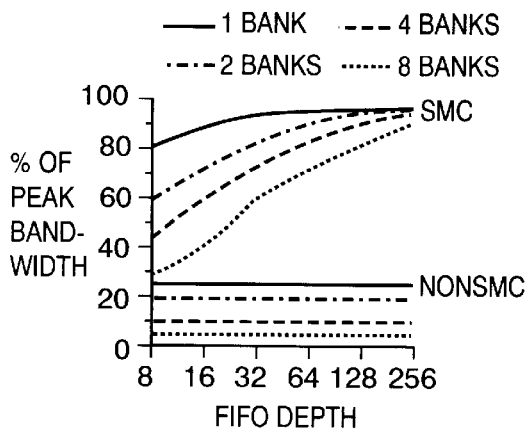
Figure 24D:
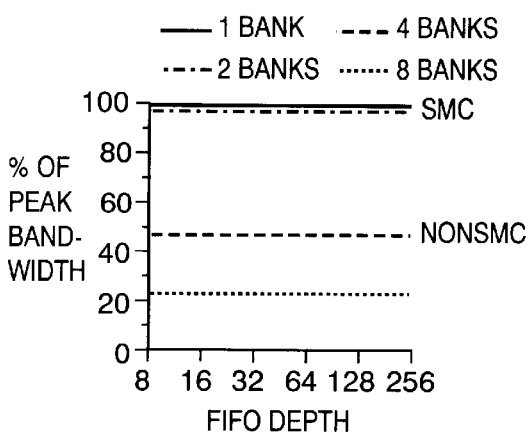
Figure 24E:
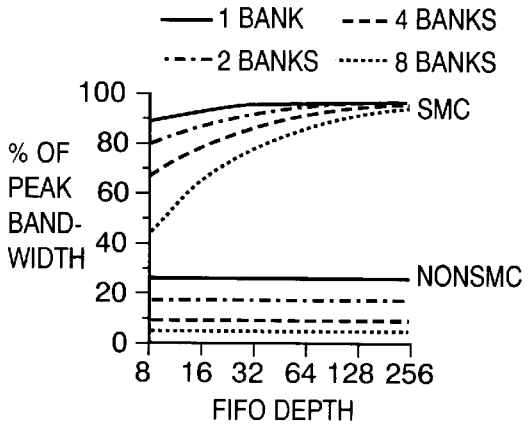
Figure 24F:
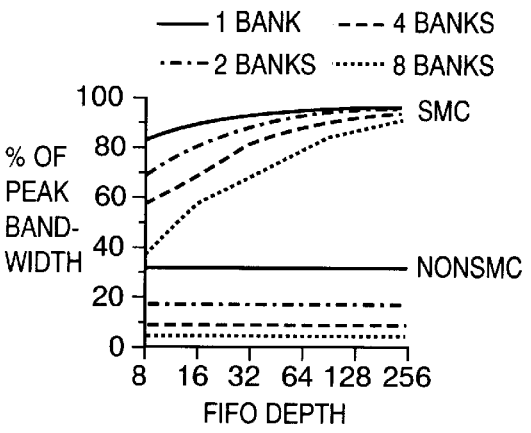
Figure 25A:
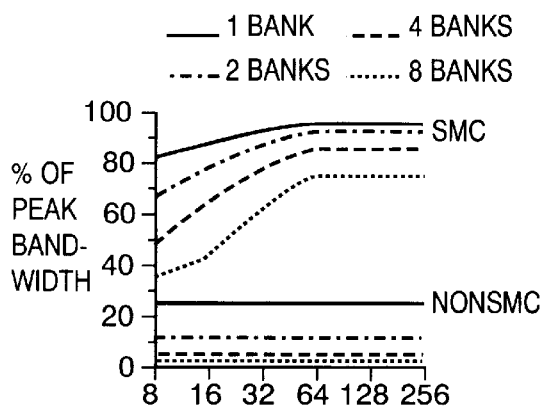
FIGS. 25a, 25b, 25c, 25d, 25e and 25f are graphical representations of R2—Long Vector Performance.
Figure 25B:
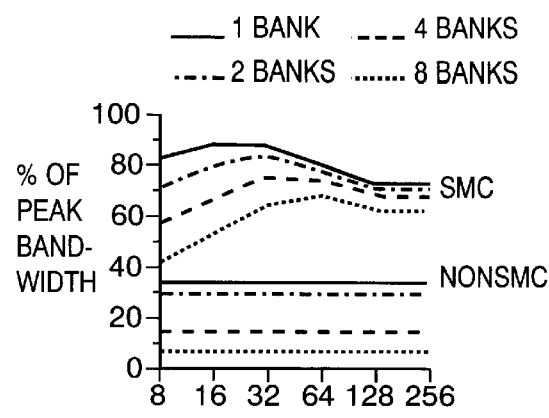
Figure 25C:
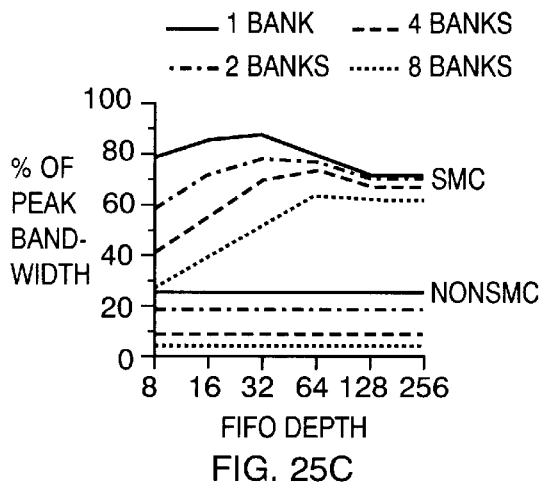
Figure 25D:
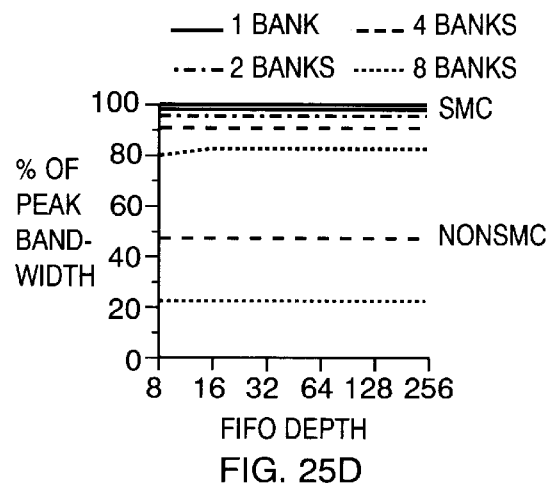
Figure 25E:
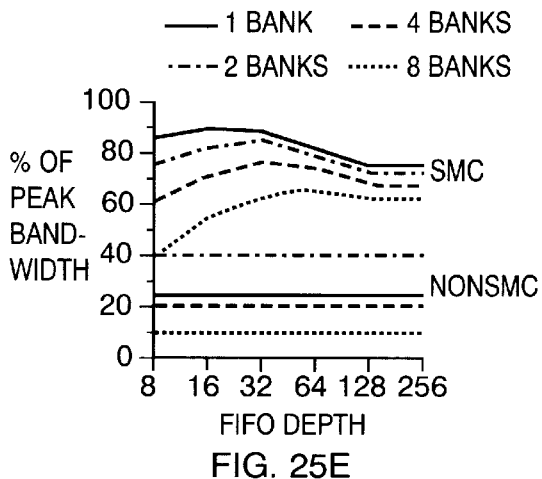
Figure 25F:
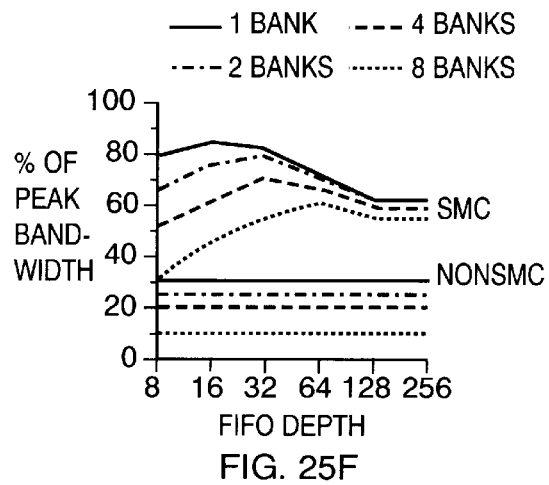
Figure 26A:
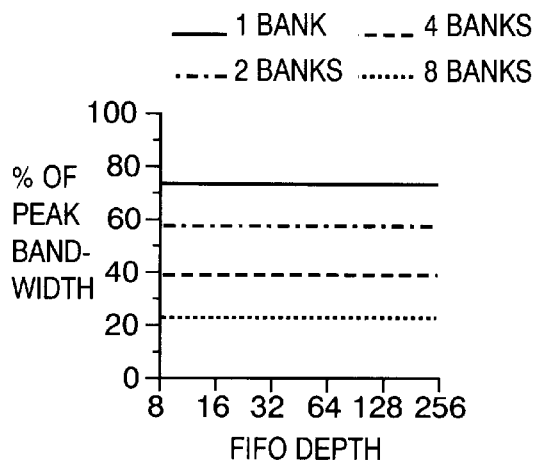
FIGS. 26a, 26b, 26c, 26d, 26e and 26f are graphical representations of R2—Medium Vector Performance (for better nonSMC alignment)
Figure 26B:
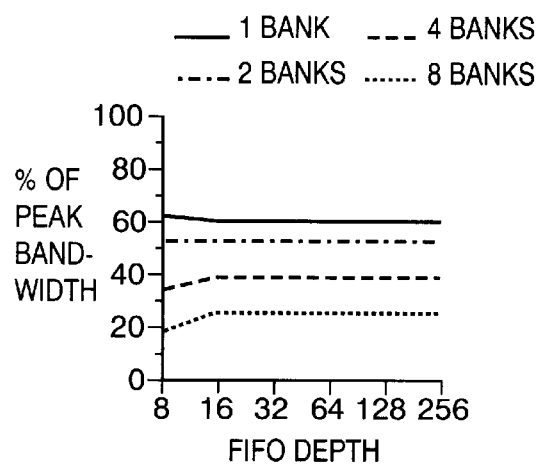
Figure 26C:
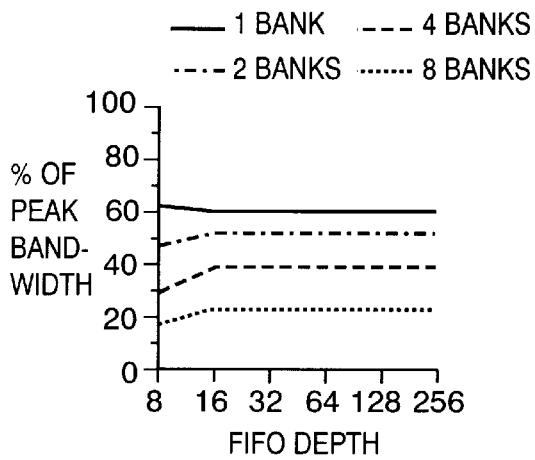
Figure 26D:
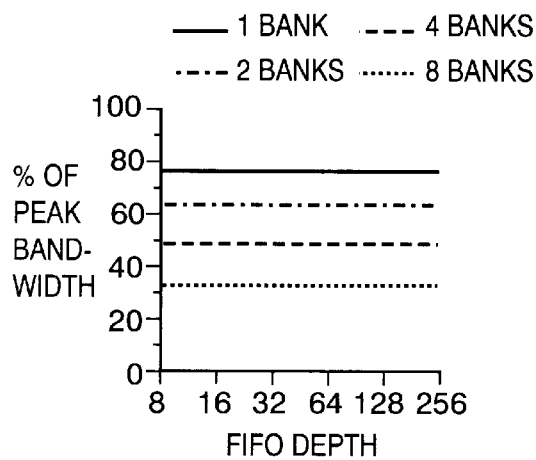
Figure 26E:
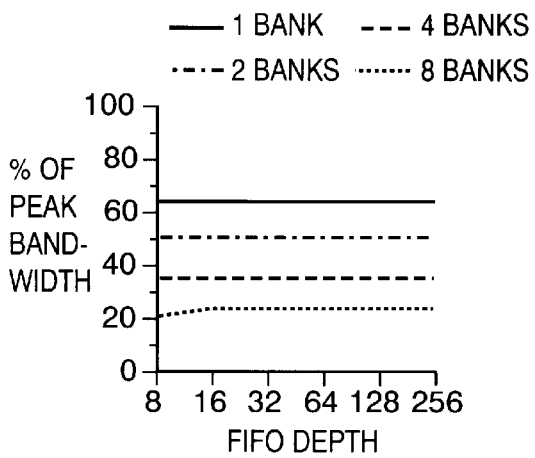
Figure 26F:
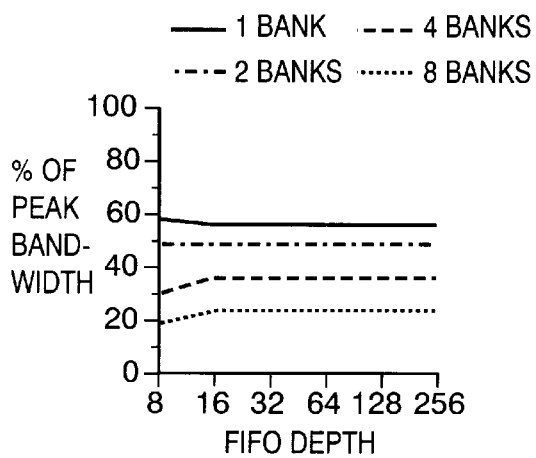
Figure 27A:
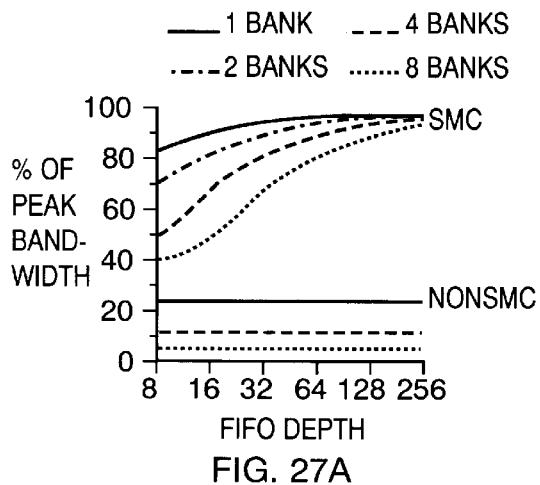
FIGS. 27a, 27b, 27c, 27d, 27e and 27f are graphical representations of R2—Short Vector Performance.
Figure 27B:
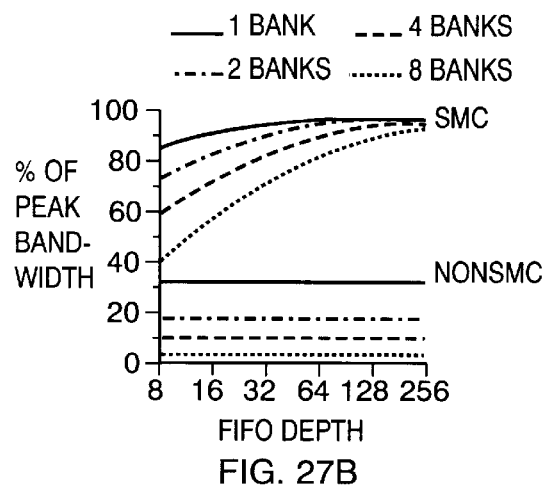
Figure 27C:
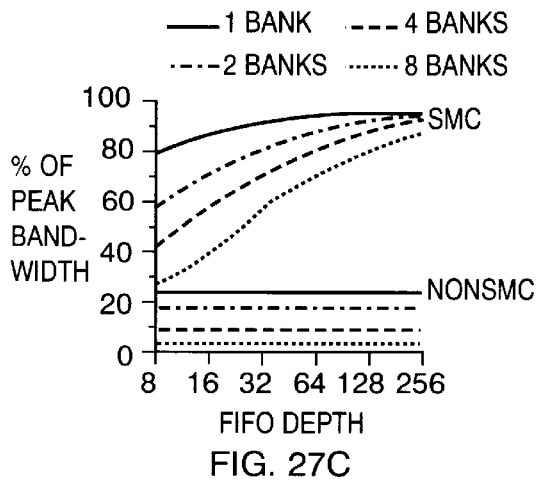
Figure 27D:
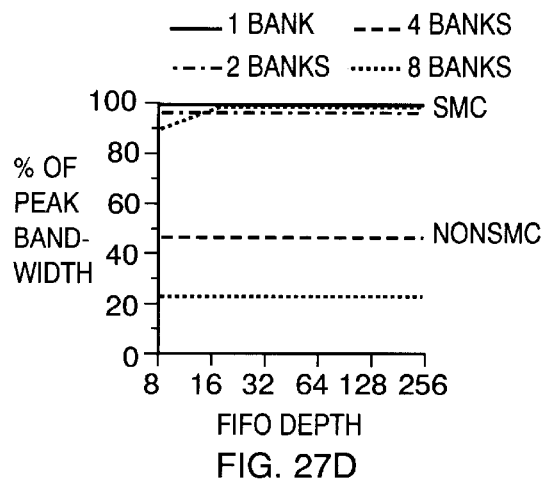
Figure 27E:
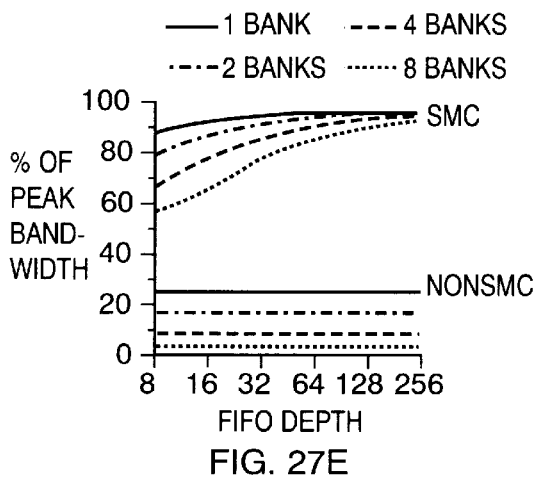
Figure 27F:
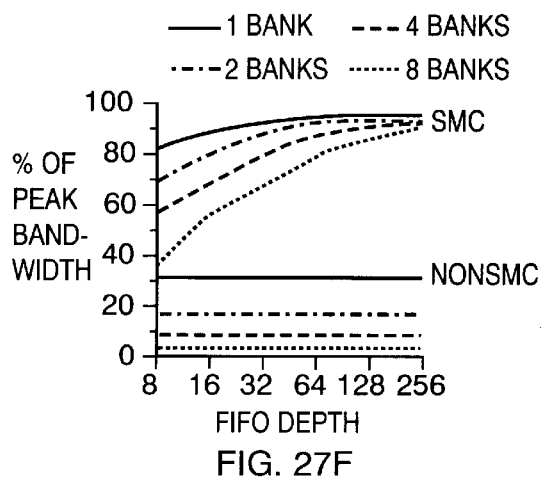
Figure 28A:
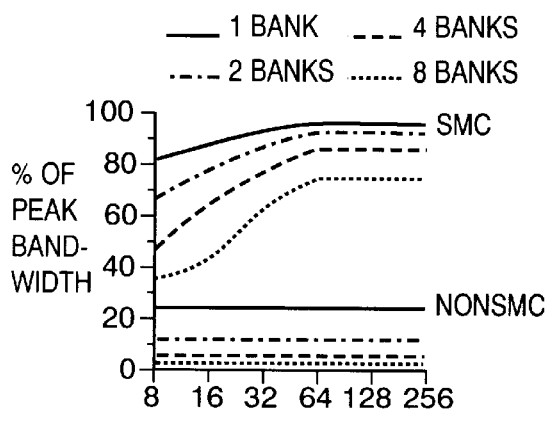
FIGS. 28a, 28b, 28c, 28d, 28e and 28f are graphical representations of T2—Long Vector Performance.
Figure 28B:
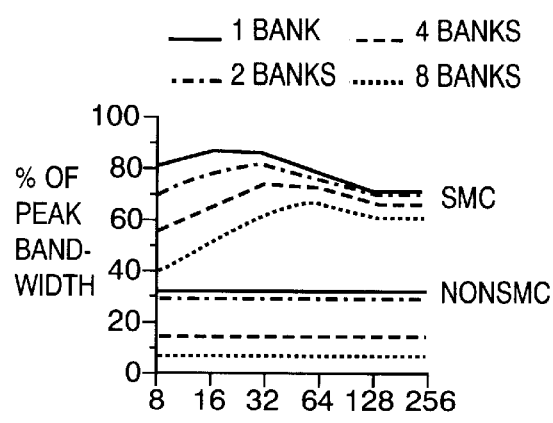
Figure 28C:
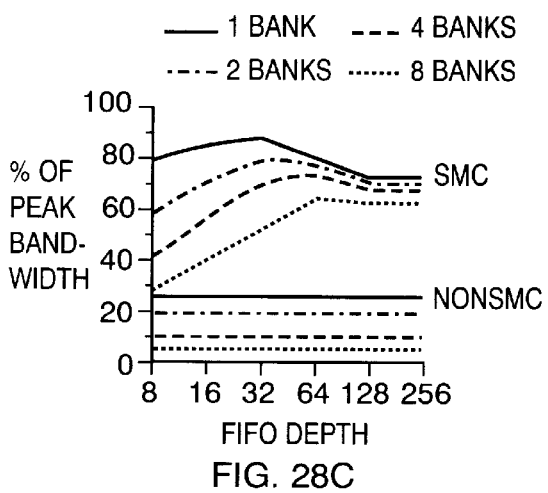
Figure 28D:
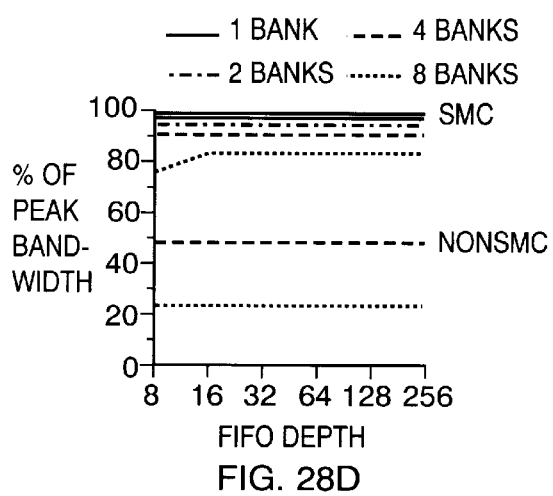
Figure 28E:
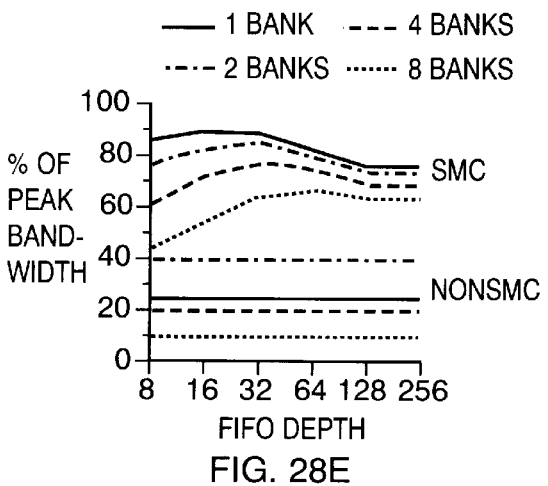
Figure 28F:
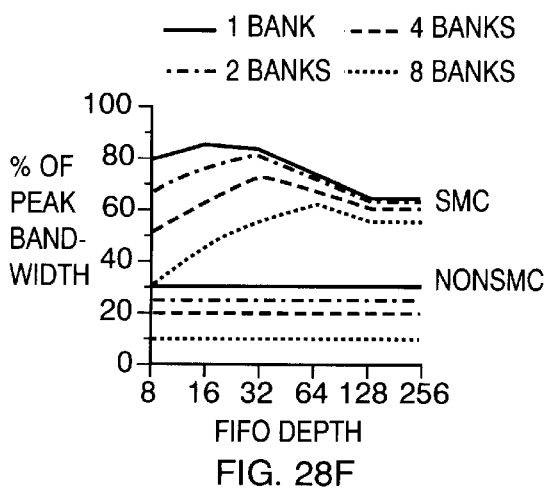
Figure 29A:
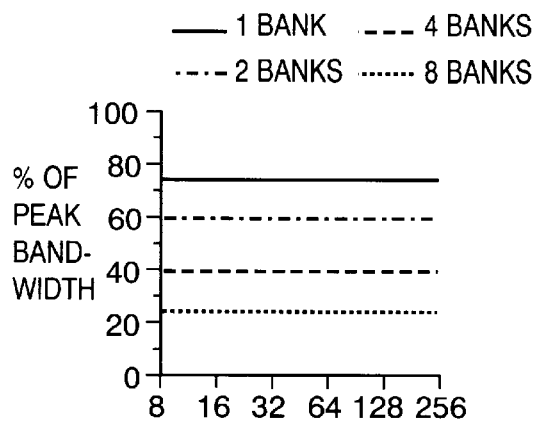
FIGS. 29a, 29b, 29c, 29d, 29e and 29f are graphical representations of T2—Medium Vector Performance (for better nonSMC alignment)
Figure 29B:
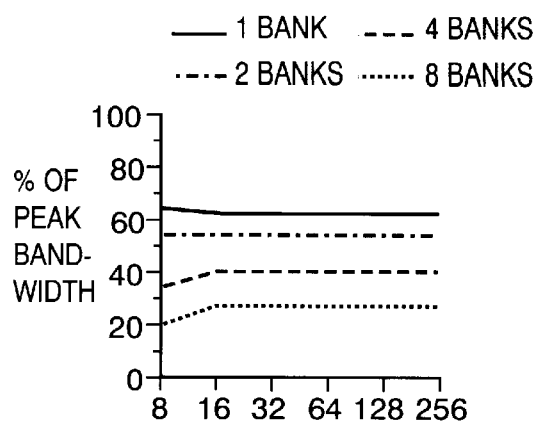
Figure 29C:
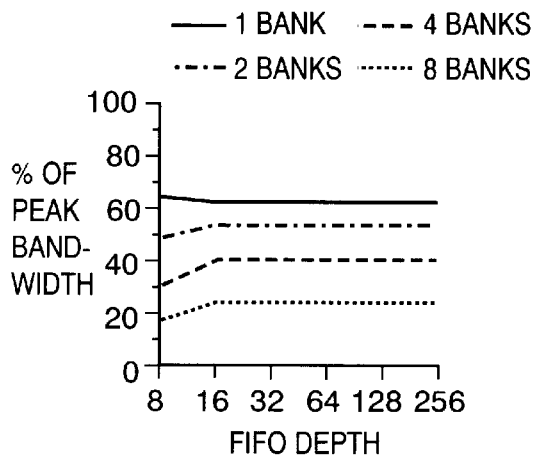
Figure 29D:
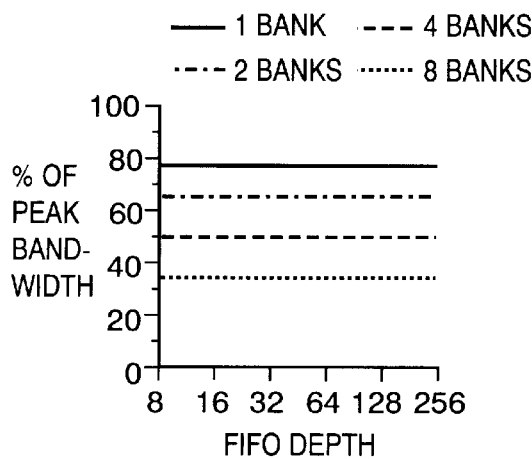
Figure 29E:
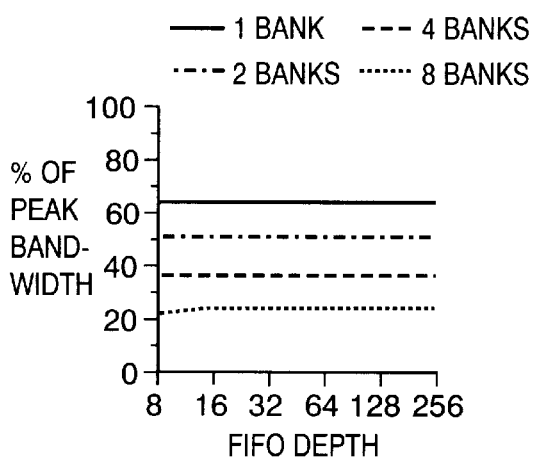
Figure 29F:
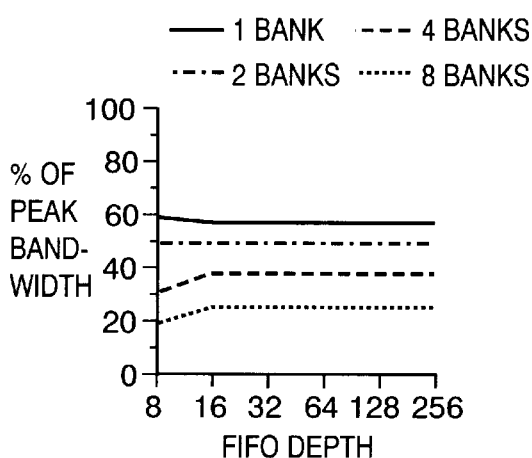
Figure 30A:
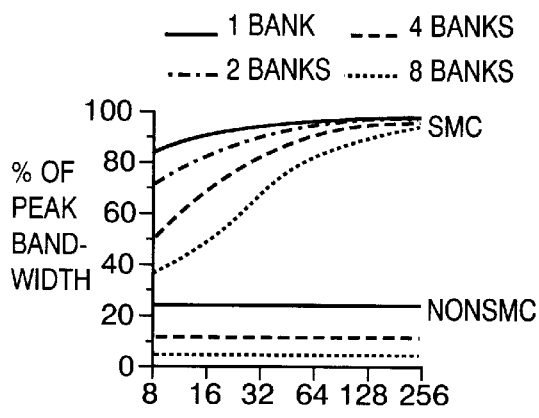
FIGS. 30a, 30b, 30c, 30d, 30e and 30f are graphical representations of T2—Short Vector Performance.
Figure 30B:
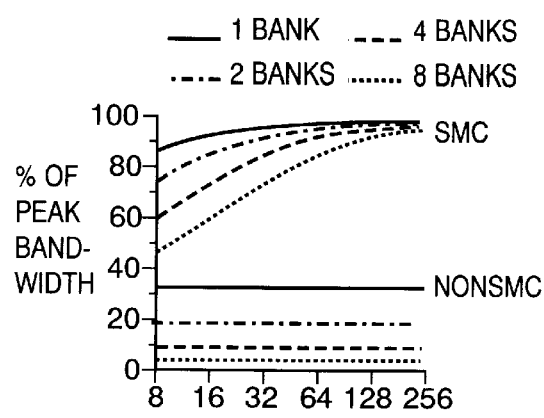
Figure 30C:
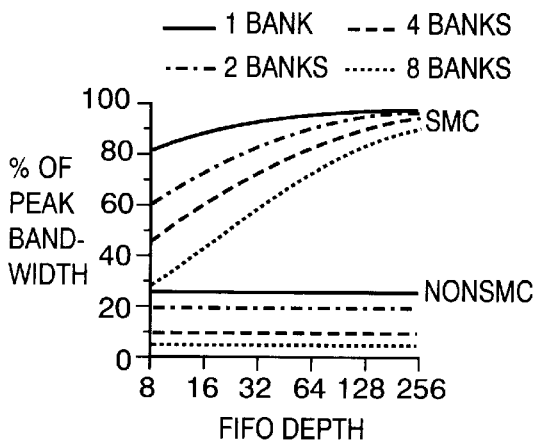
Figure 30D:
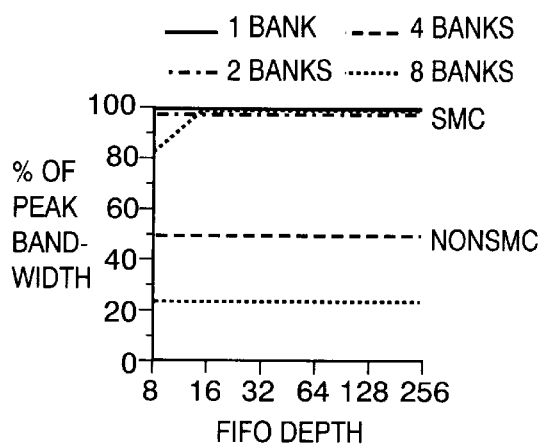
Figure 30E:
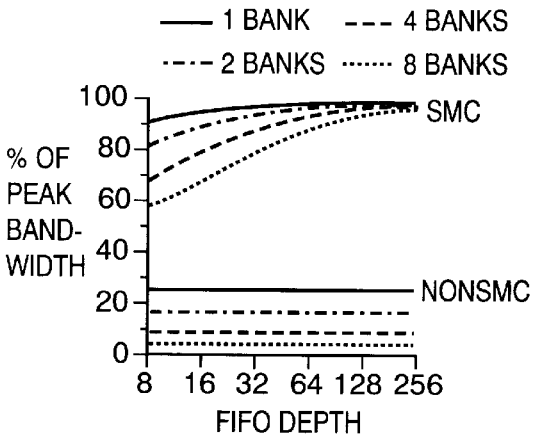
Figure 30F:
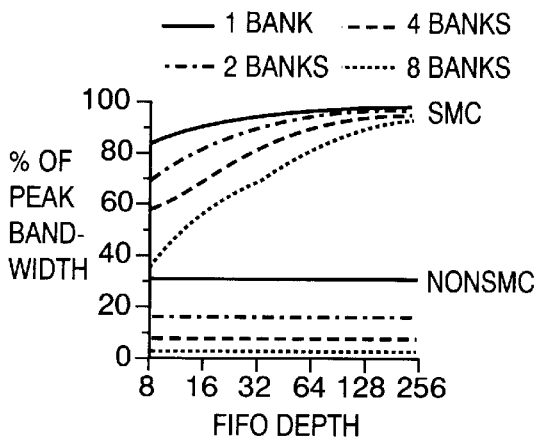
Figure 31A:
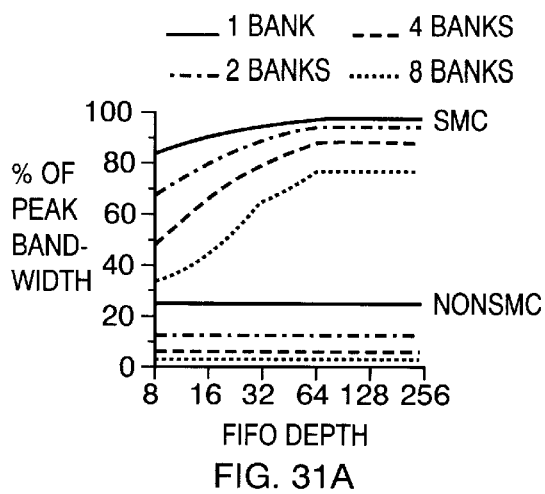
FIGS. 31a, 31b, 31c, 31d, 31e and 31f are graphical representations of P3—Long Vector Performance.
Figure 31B:
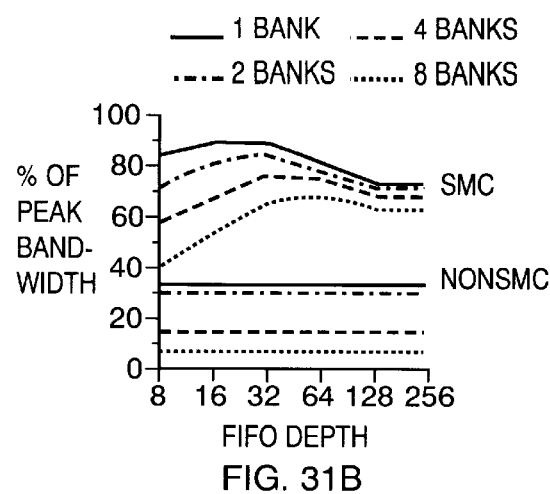
Figure 31C:
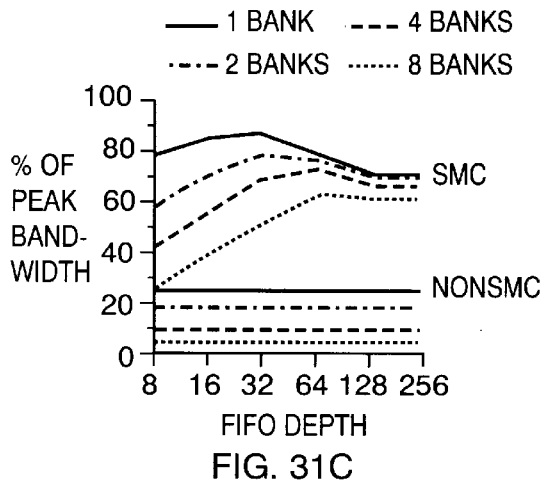
Figure 31D:
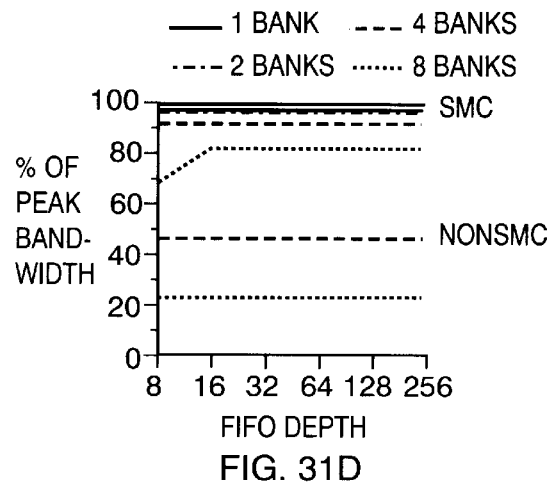
Figure 31E:
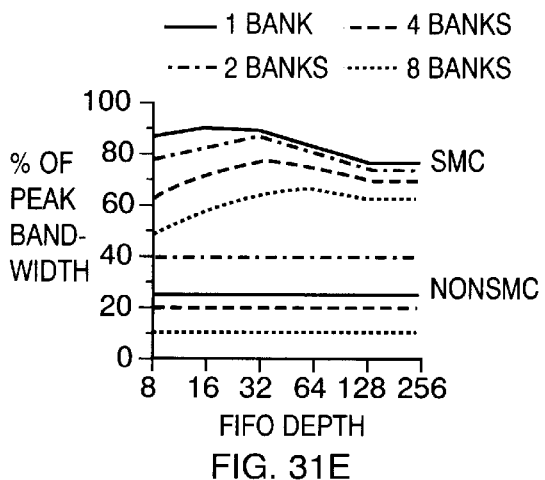
Figure 31F:
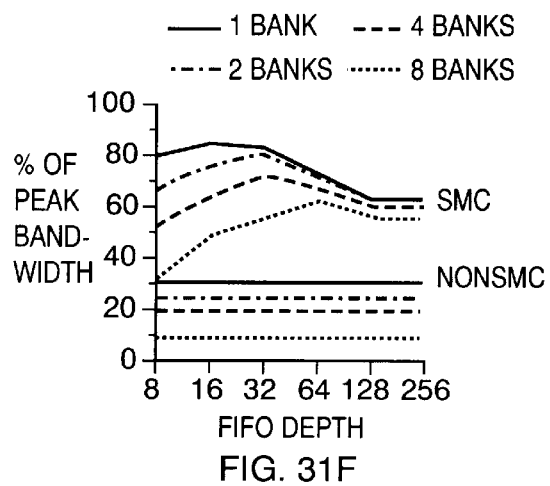
Figure 32A:
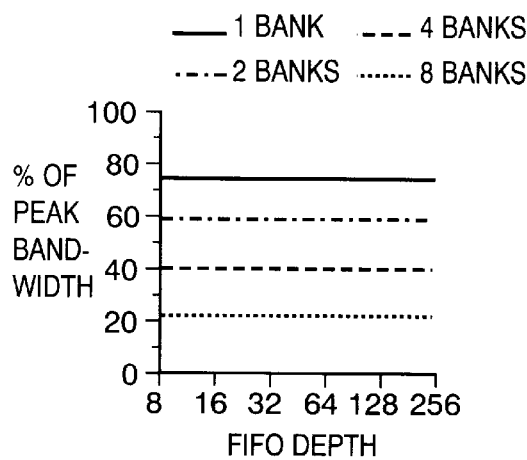
FIGS. 32a, 32b, 32c, 32d, 32e and 32f are graphical representations of P3—Medium Vector Performance (for better nonSMC alignment)
Figure 32B:
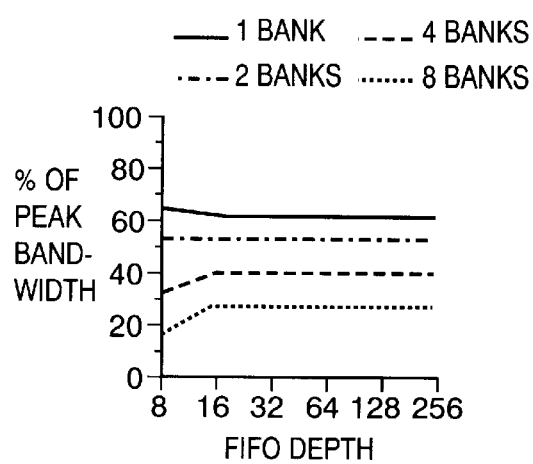
Figure 32C:
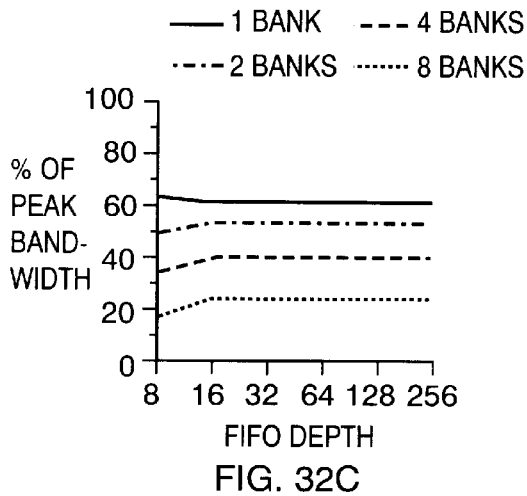
Figure 32D:
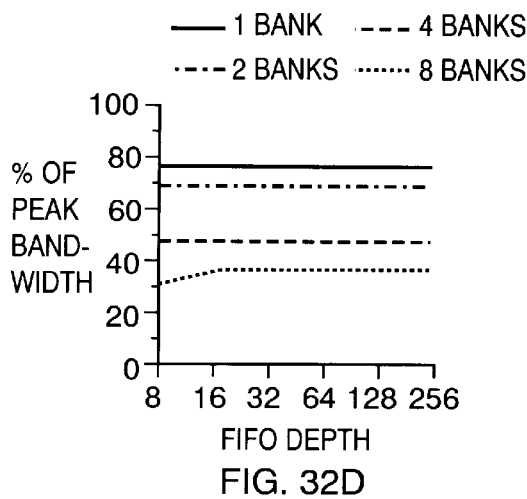
Figure 32E:
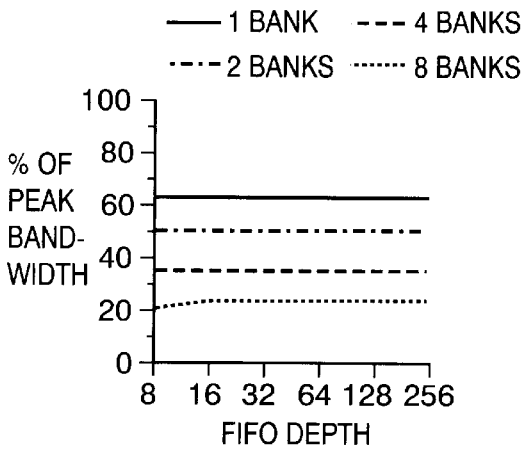
Figure 32F:
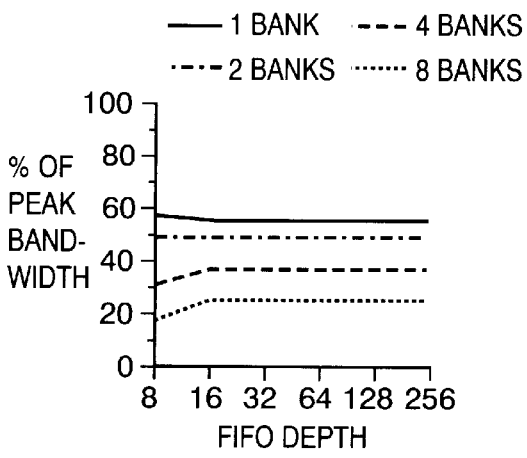
Figure 33A:
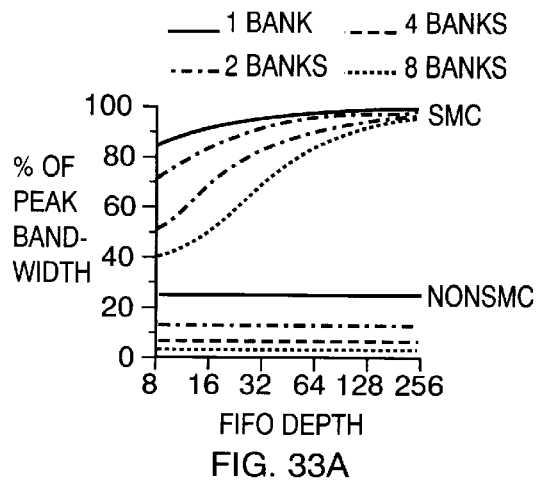
FIGS. 33a, 33b, 33c, 33d, 33e and 33f are graphical representations of P3—Short Vector Performance.
Figure 33B:
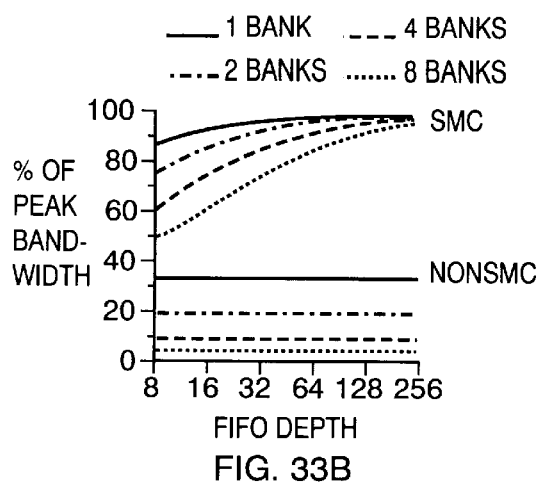
Figure 33C:
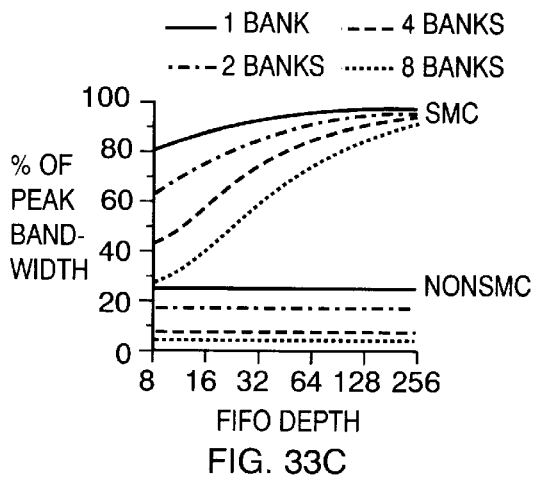
Figure 33D:
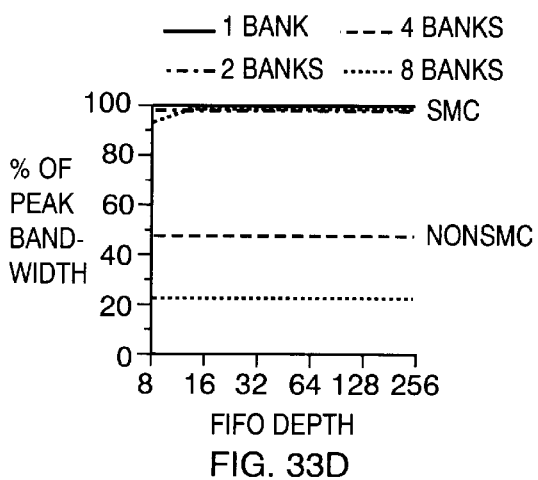
Figure 33E:
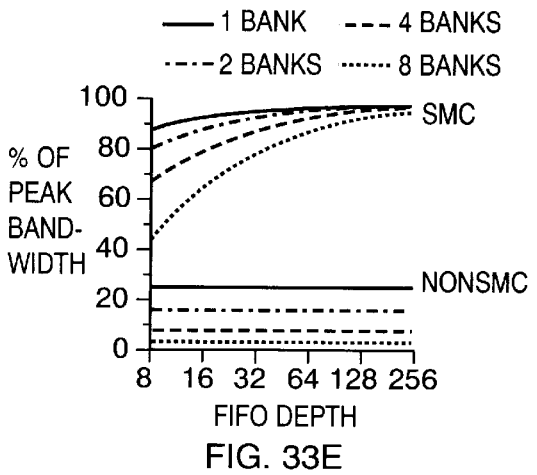
Figure 33F:
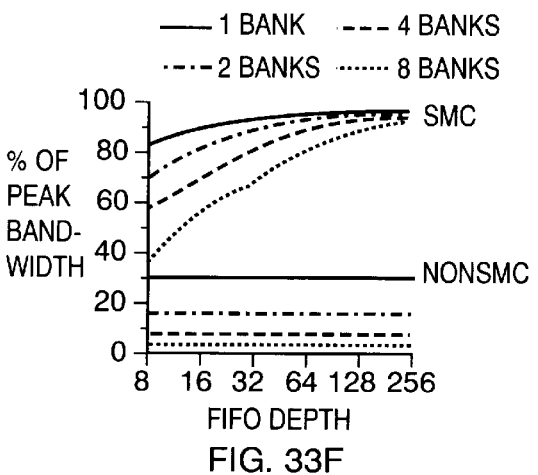
Figure 34A:
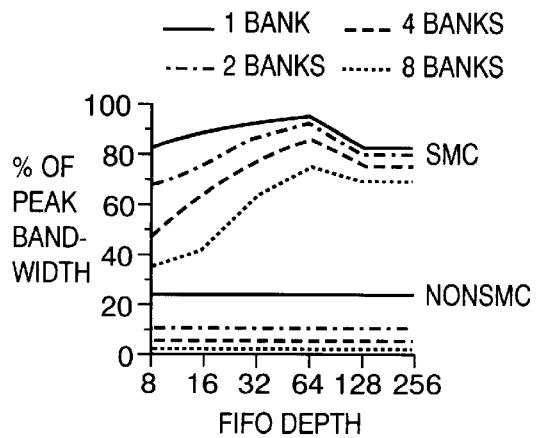
FIGS. 34a, 34b, 34c, 34d, 34e and 34f are graphical representations of R3—Long Vector Performance.
Figure 34B:
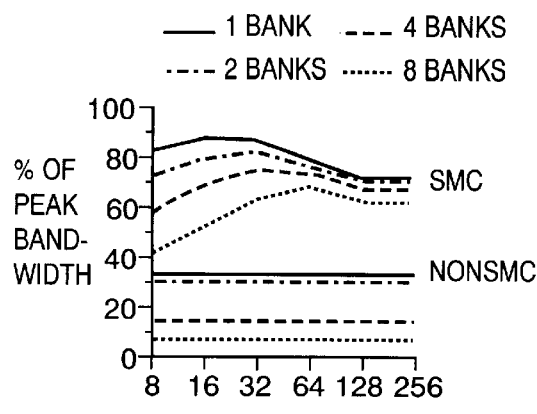
Figure 34C:
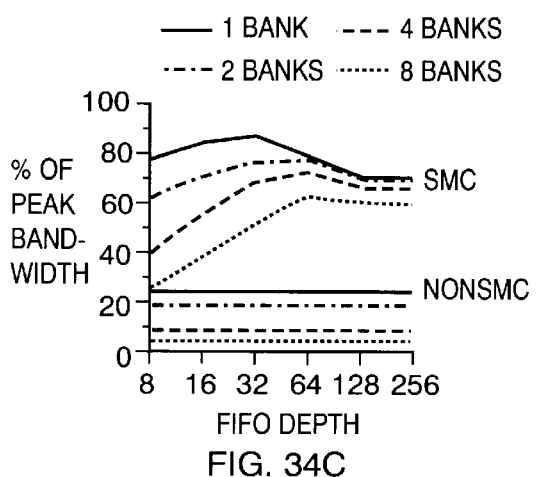
Figure 34D:
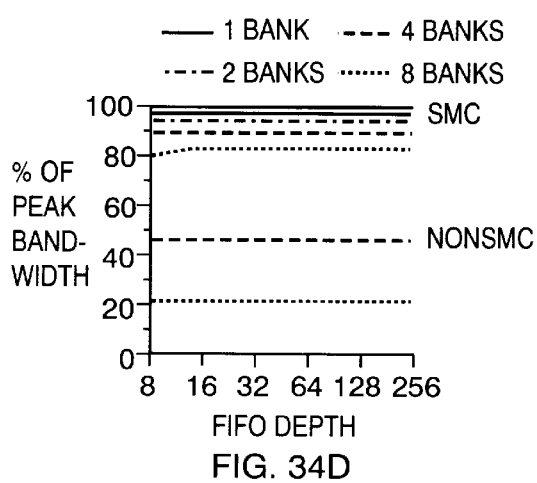
Figure 34E:
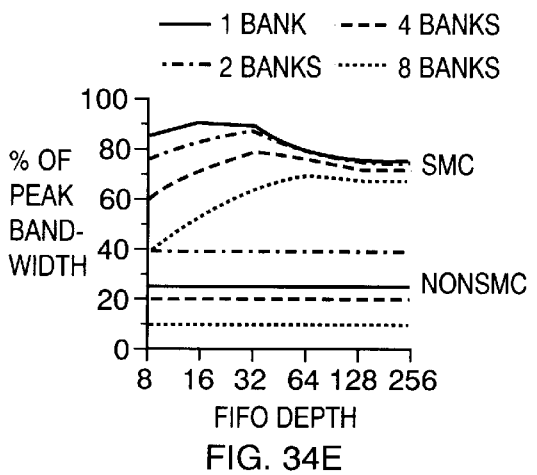
Figure 34F:
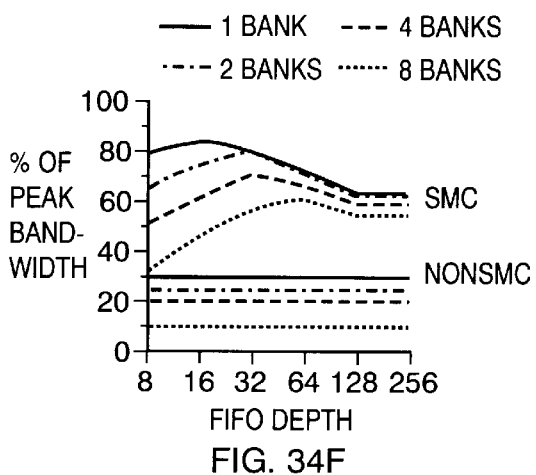
Figure 35A:
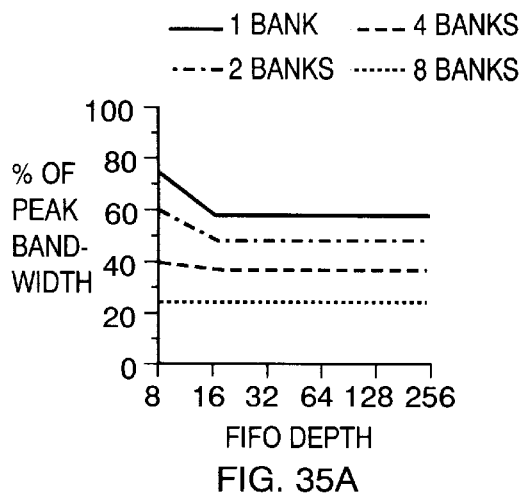
FIGS. 35a, 35b, 35c, 35d, 35e and 35f are graphical representations of R3—Medium Vector Performance (for better nonSMC alignment)
Figure 35B:
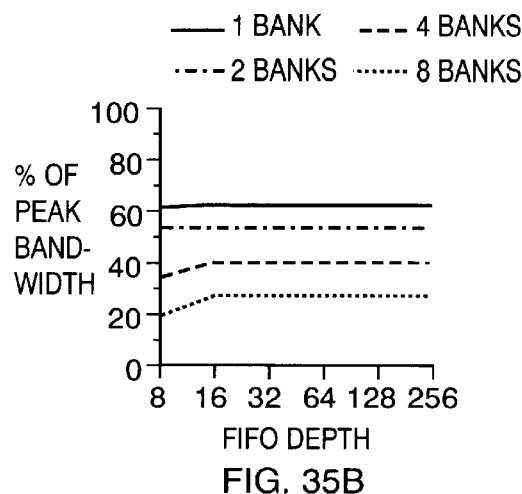
Figure 35C:
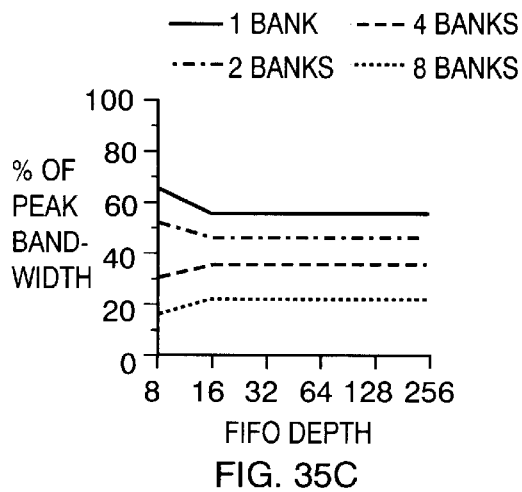
Figure 35D:
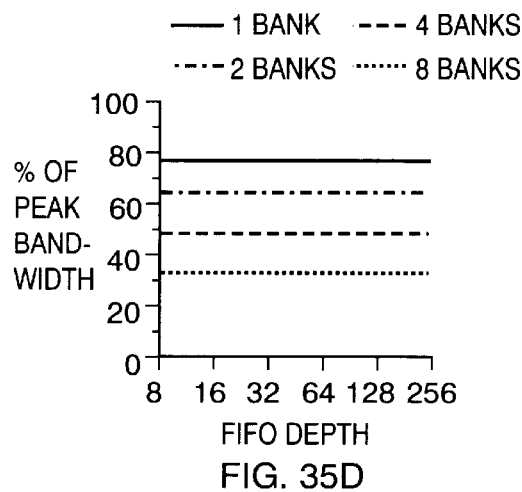
Figure 35E:
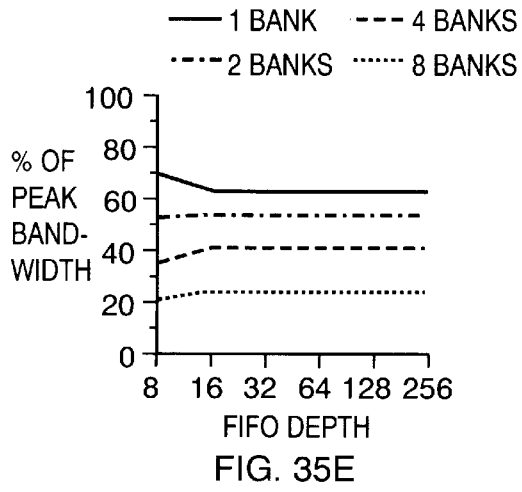
Figure 35F:
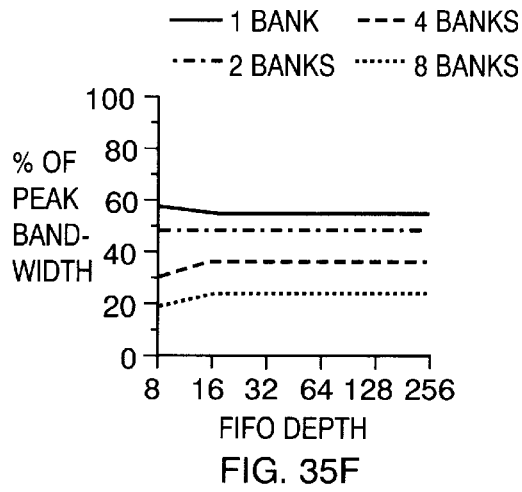
Figure 36A:
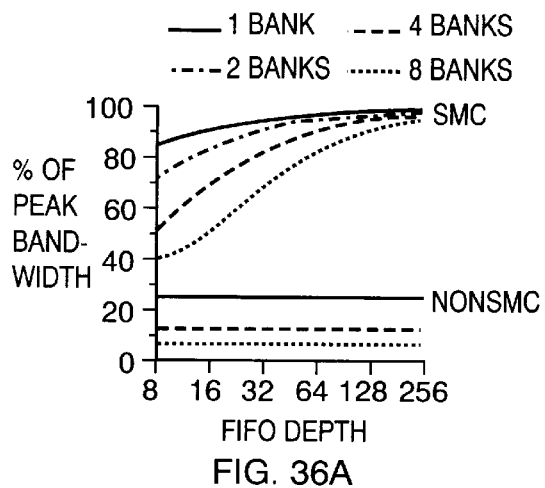
FIGS. 36a, 36b, 36c, 36d, 36e and 36f are graphical representations of R3—Short Vector Performance.
Figure 36B:
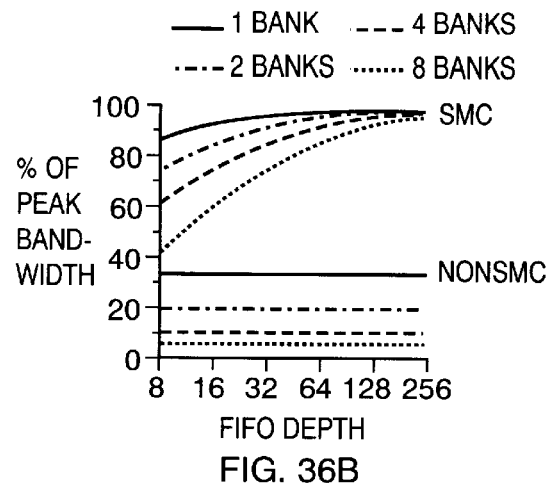
Figure 36C:
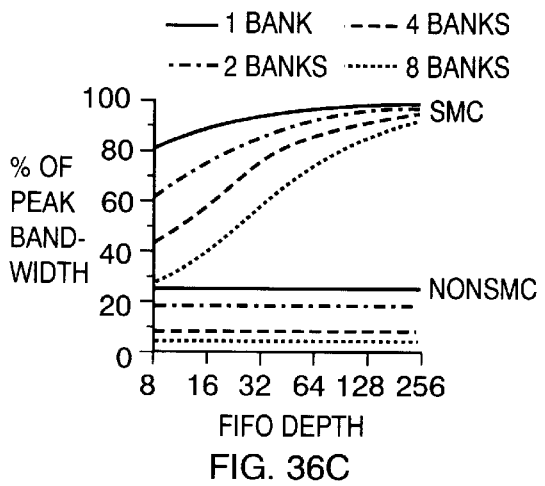
Figure 36D:
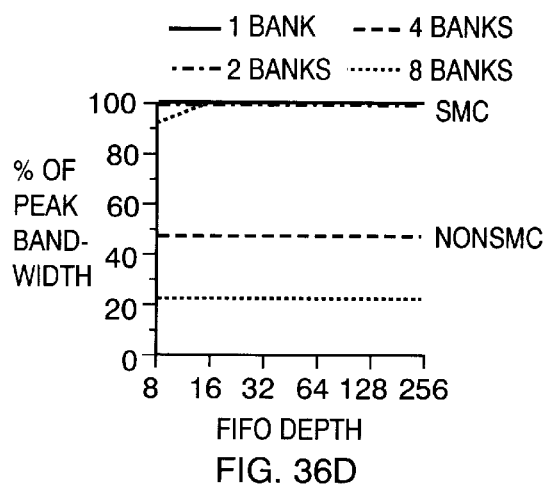
Figure 36E:
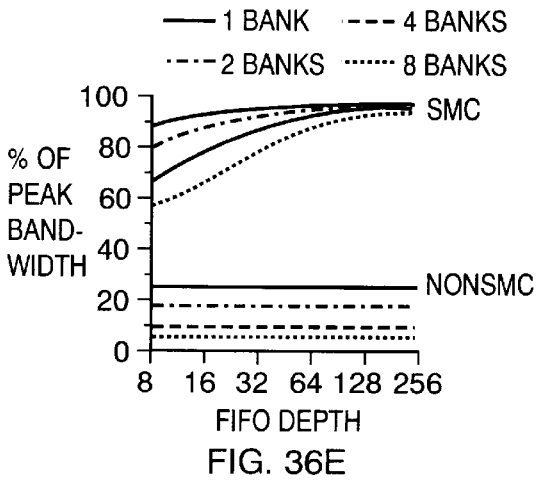
Figure 36F:
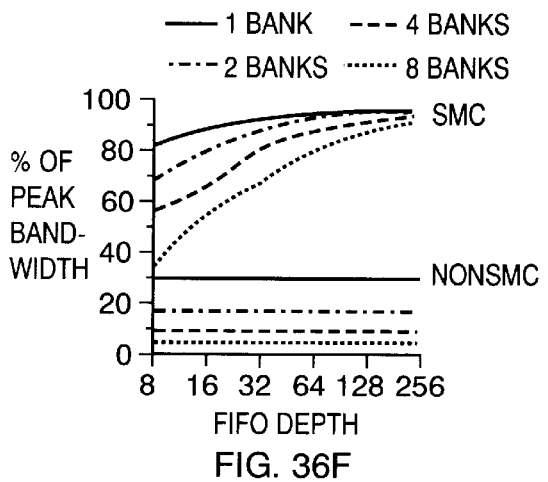
Figure 37A:
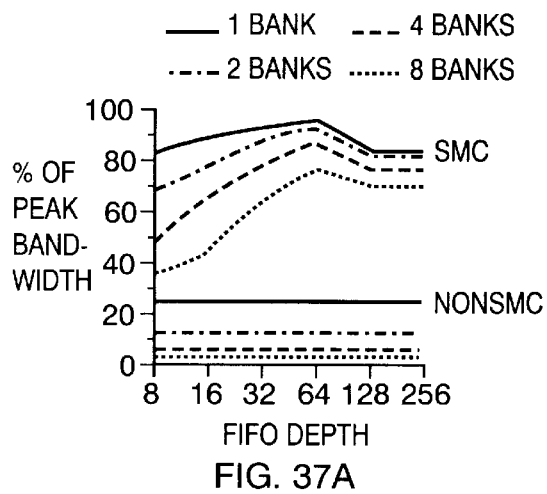
FIGS. 37a, 37b, 37c, 37d, 37e and 37f are graphical representations of T3—Long Vector Performance.
Figure 37B:
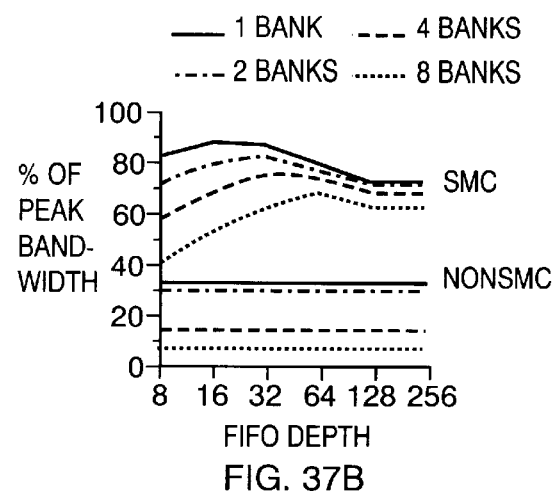
Figure 37C:
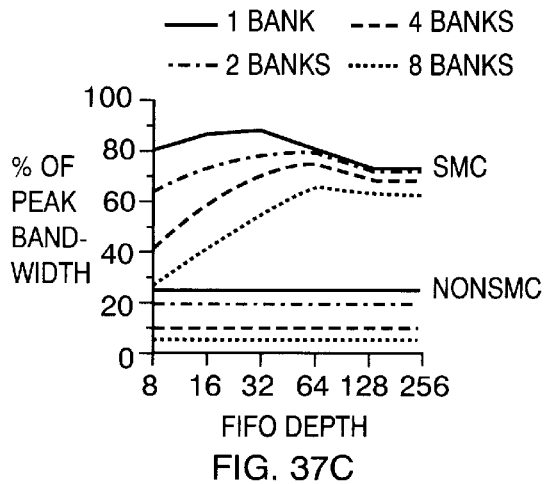
Figure 37D:
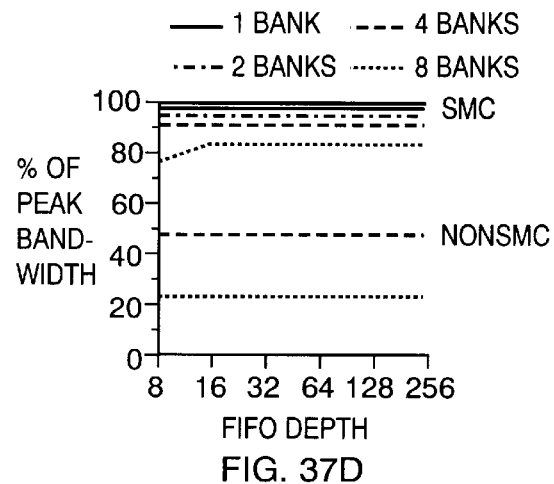
Figure 37E:
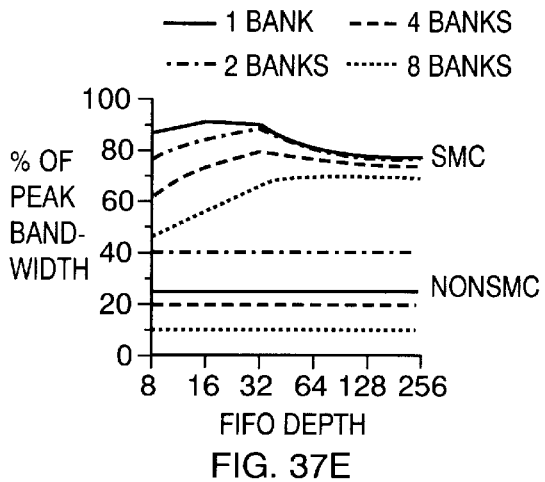
Figure 37F:
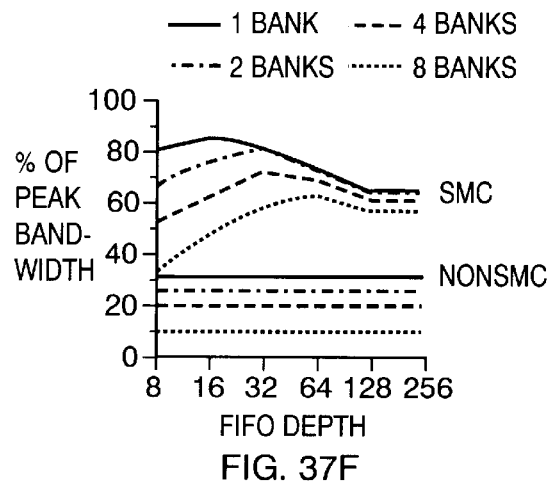
Figure 38A:
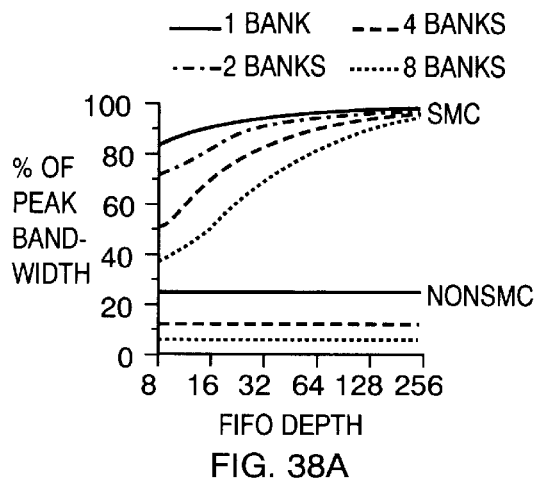
FIGS. 38a, 38b, 38c, 38d, 38e and 38f are graphical representations of T3—Medium Vector Performance (for better nonSMC alignment)
Figure 38B:
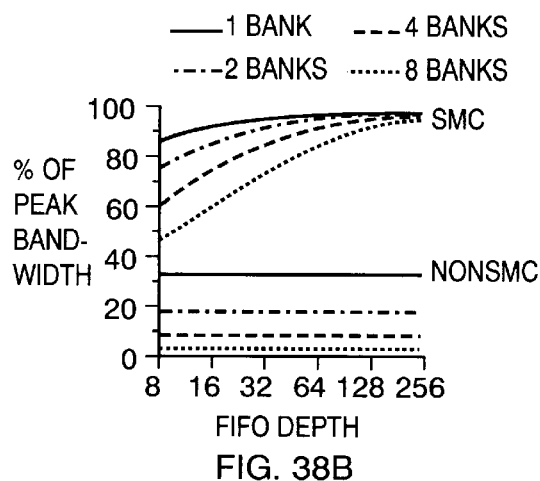
Figure 38C:
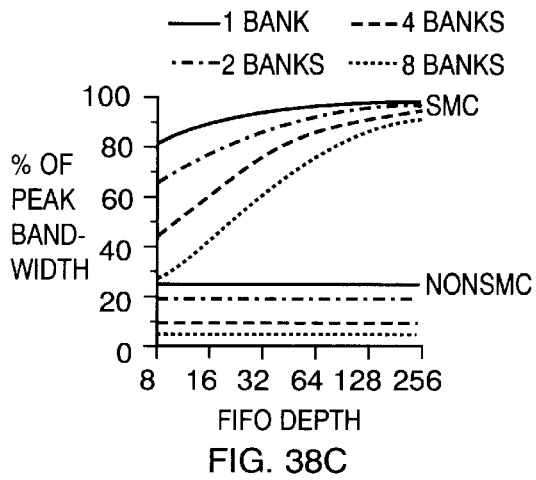
Figure 38D:
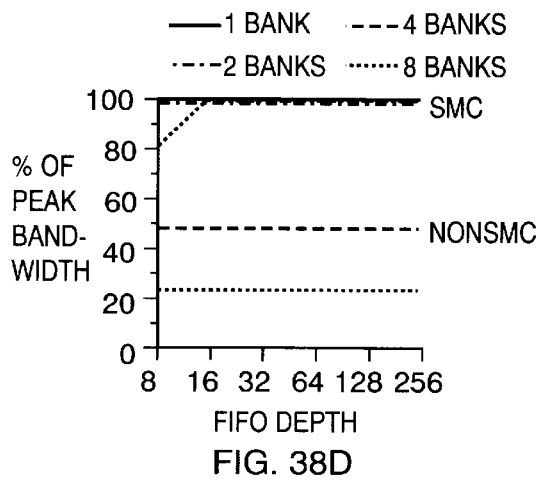
Figure 38E:
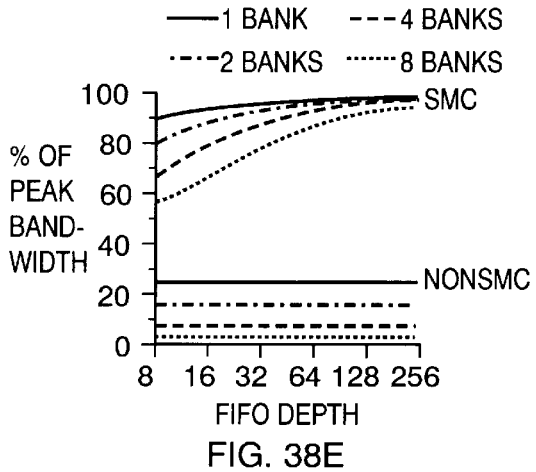
Figure 38F:
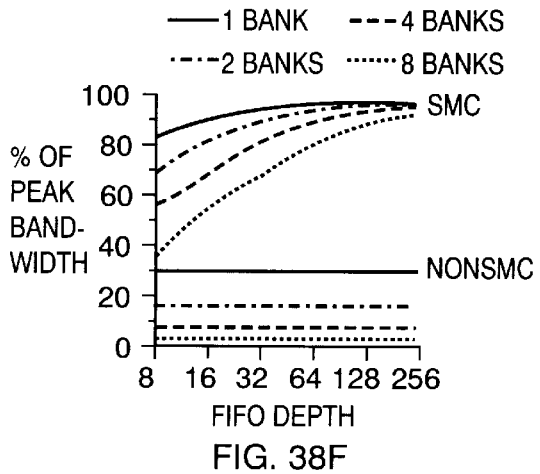
Figure 39A:
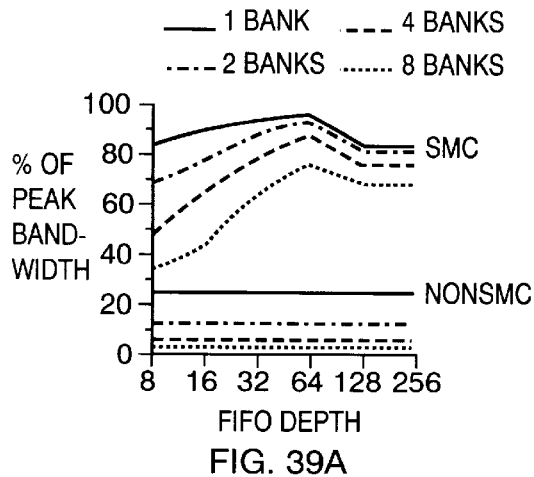
FIGS. 39a, 39b, 39c, 39d, 39e and 39f are graphical representations of T3—Short Vector Performance.
Figure 39B:
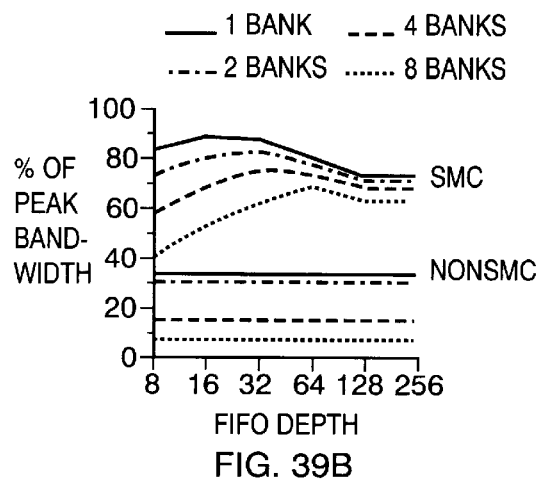
Figure 39C:
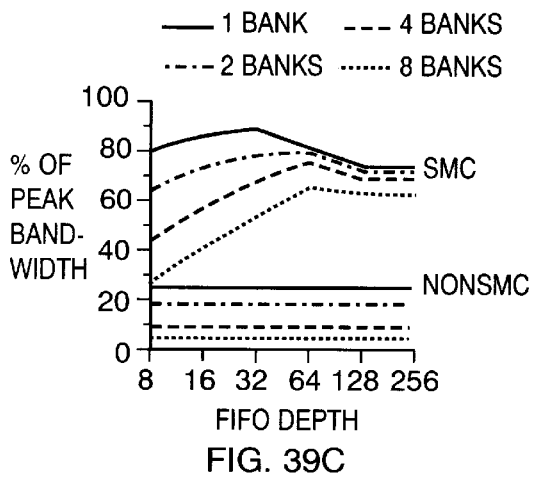
Figure 39D:
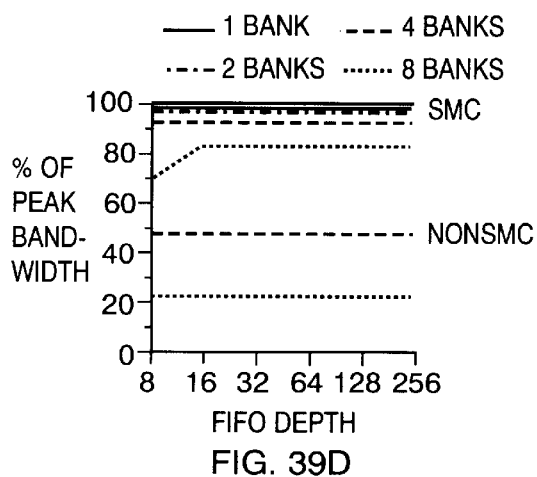
Figure 39E:
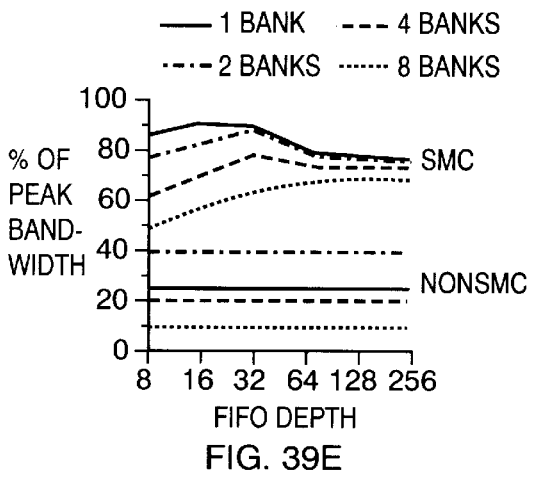
Figure 39F:
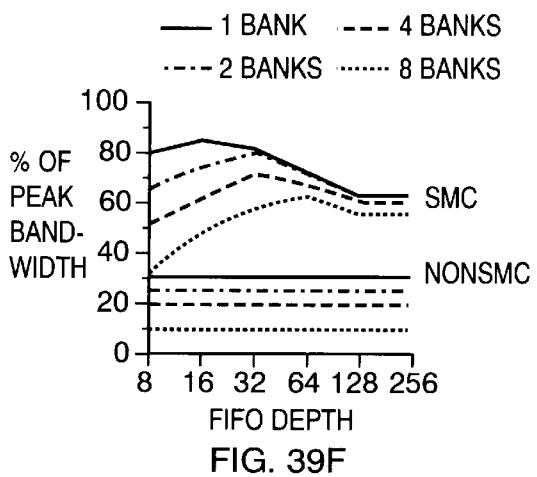
Figure 40A:
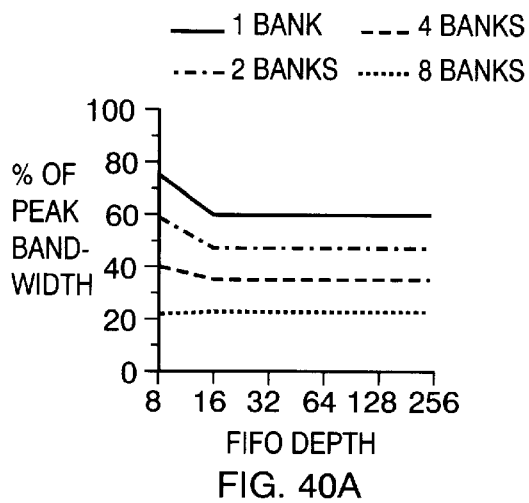
FIGS. 40a, 40b, 40c, 40d, 40e and 40f are graphical representations of P4—Long Vector Performance.
Figure 40B:
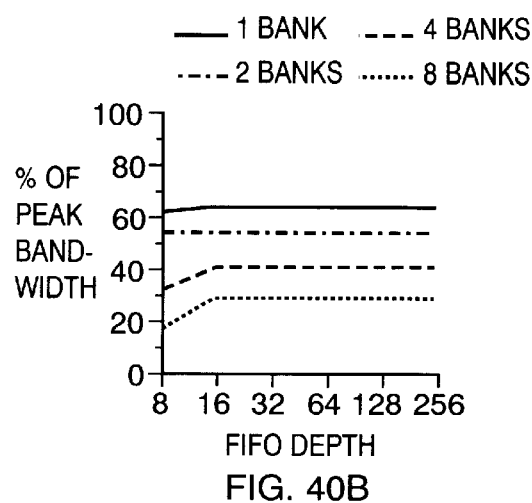
Figure 40C:
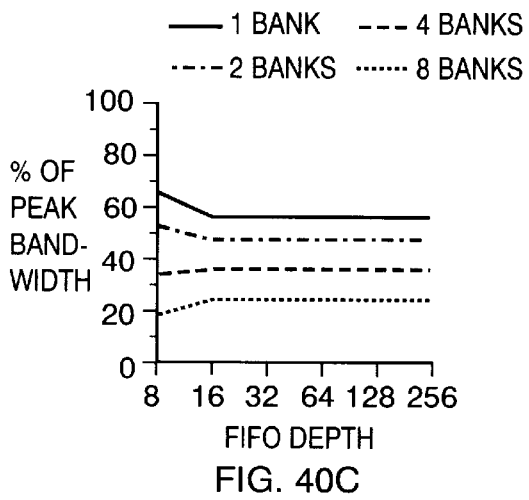
Figure 40D:
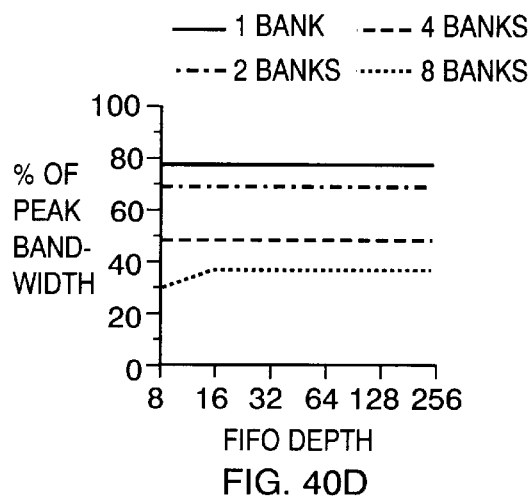
Figure 40E:
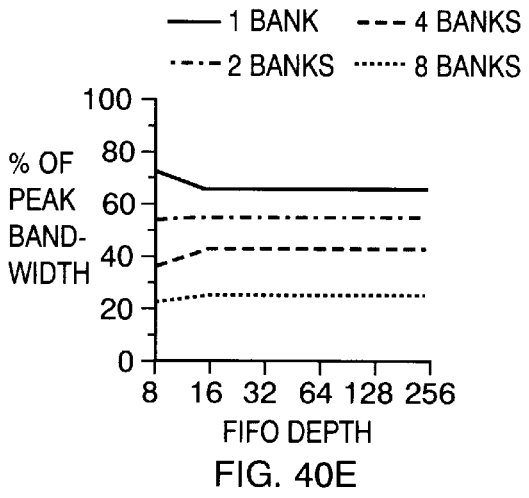
Figure 40F:
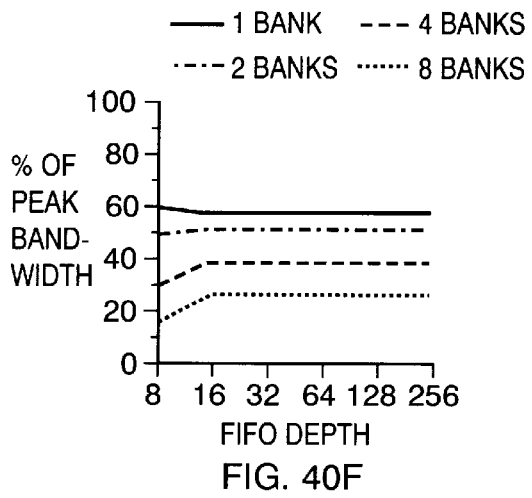
Figure 41A:
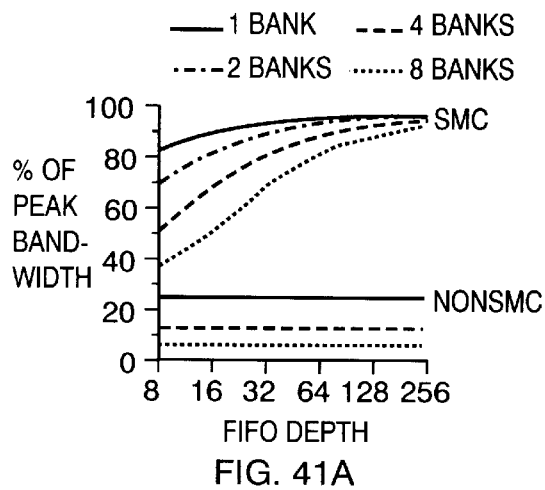
FIGS. 41a, 41b, 41c, 41d, 41e and 41f are graphical representations of P4—Medium Vector Performance (for better nonSMC alignment)
Figure 41B:
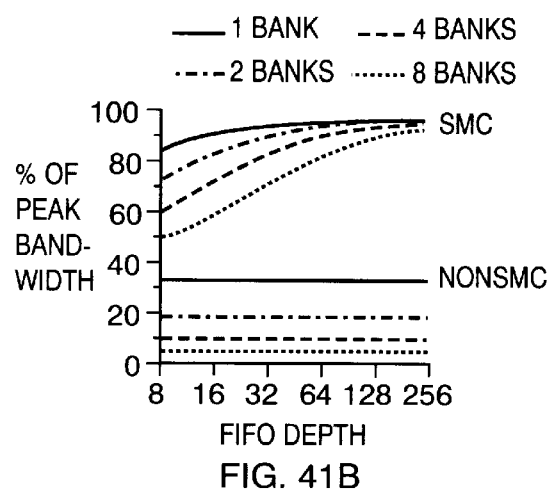
Figure 41C:
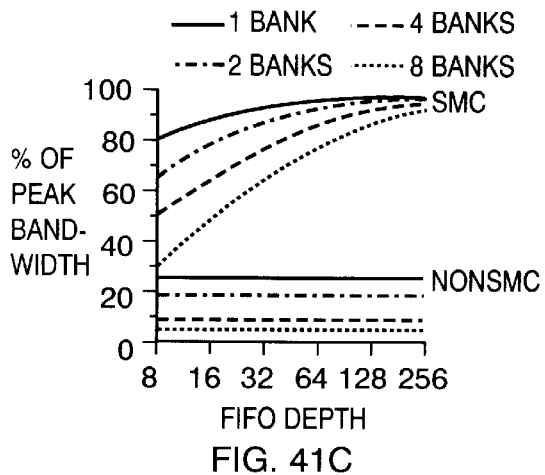
Figure 41D:
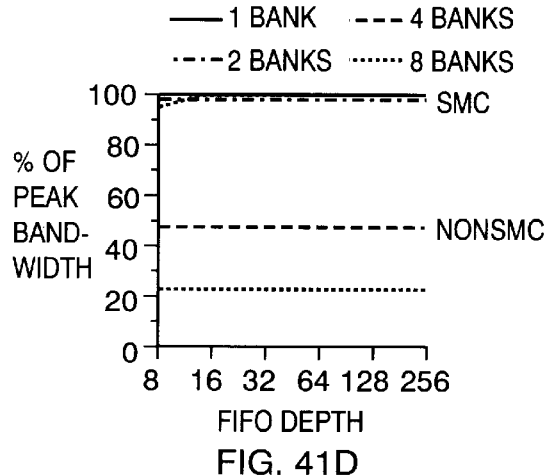
Figure 41E:
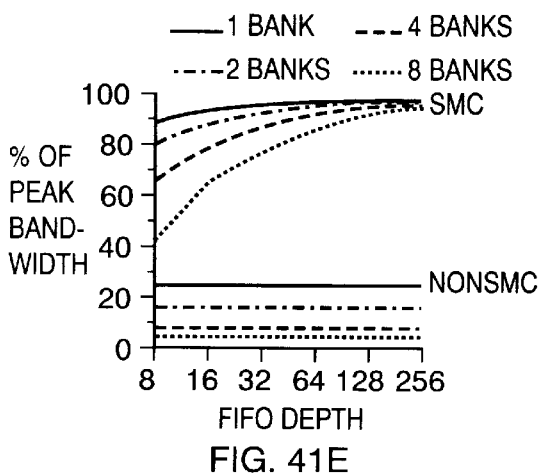
Figure 41F:
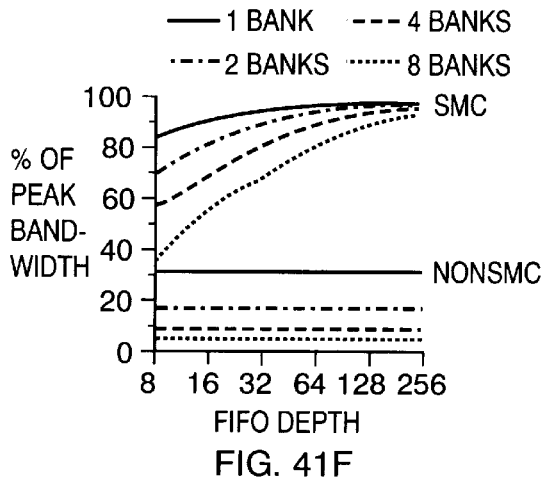
Figure 42A:
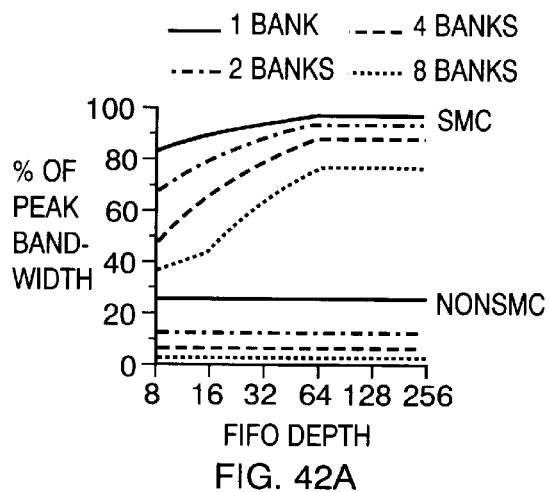
FIGS. 42a, 42b, 42c, 42d, 42e and 42f are graphical representations of P4—Short Vector Performance.
Figure 42B:
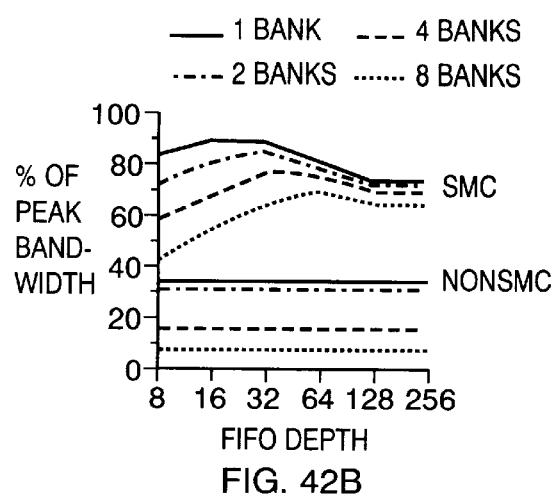
Figure 42C:
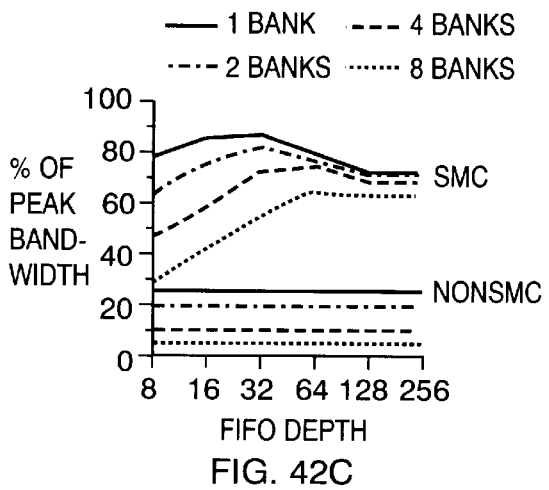
Figure 42D:
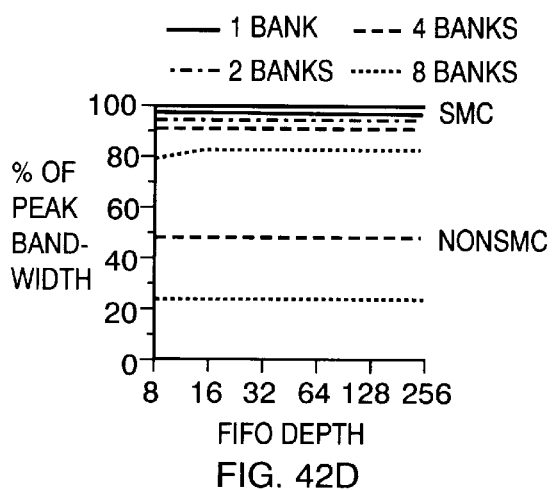
Figure 42E:
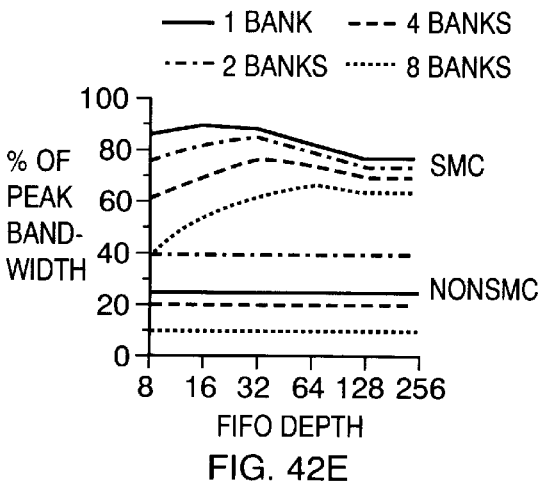
Figure 42F:
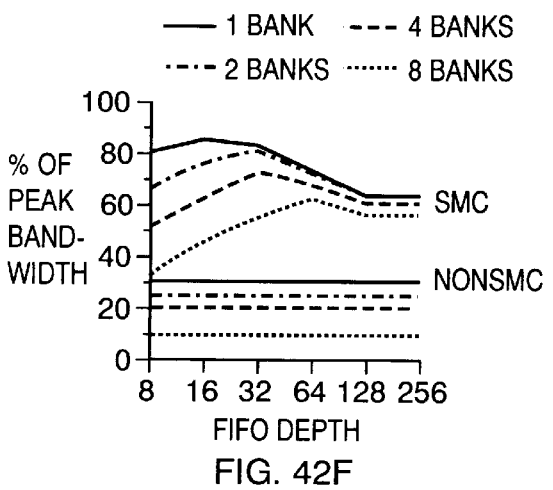
Figure 43A:
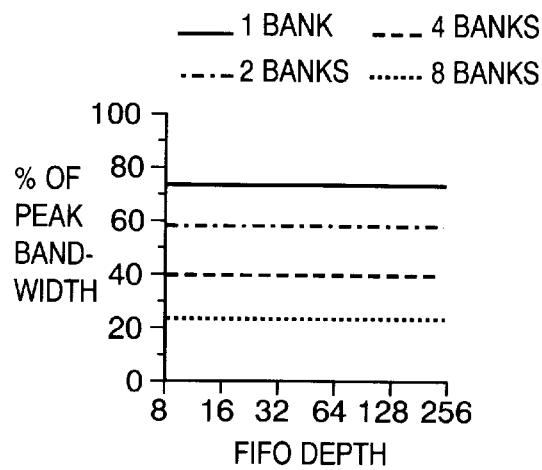
FIGS. 43a, 43b, 43c, 43d, 43e and 43f are graphical representations of R4—Long Vector Performance.
Figure 43B:
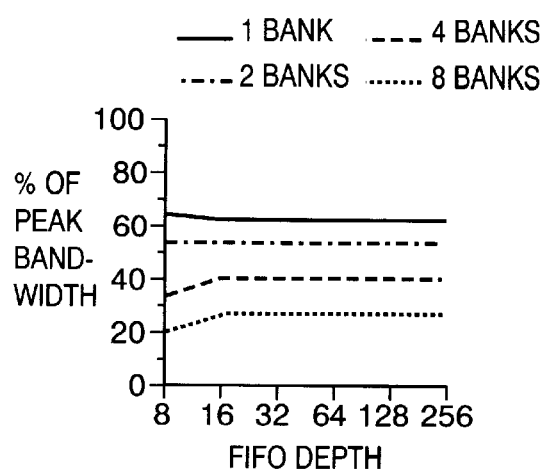
Figure 43C:
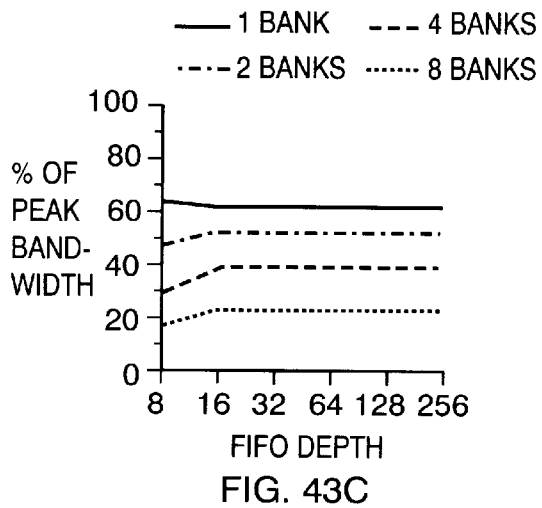
Figure 43D:
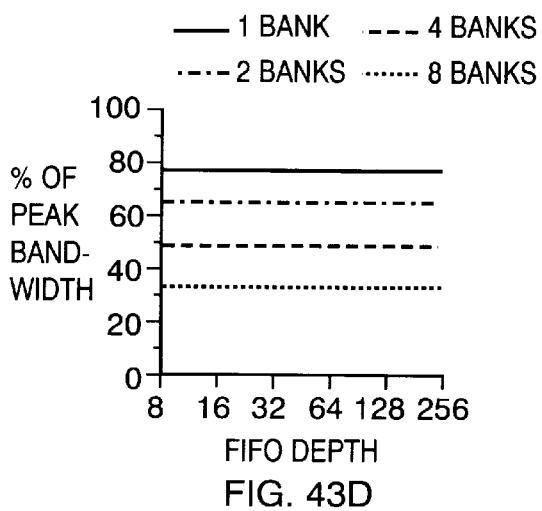
Figure 43E:
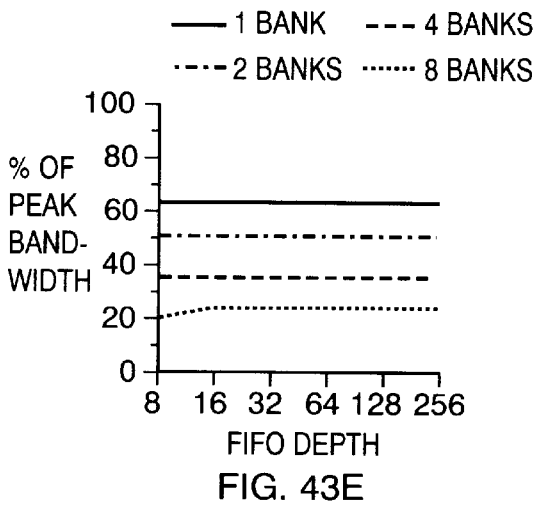
Figure 43F:
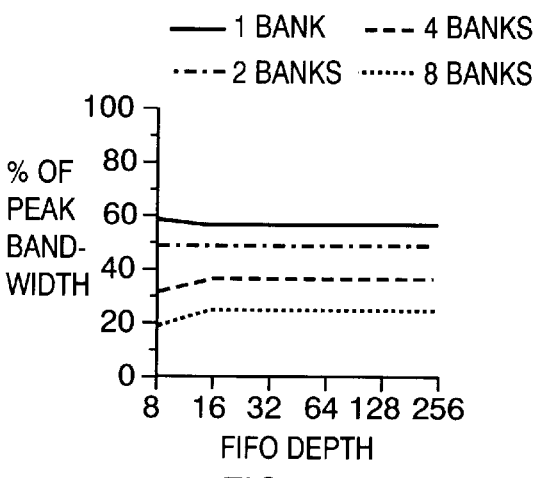
Figure 44A:
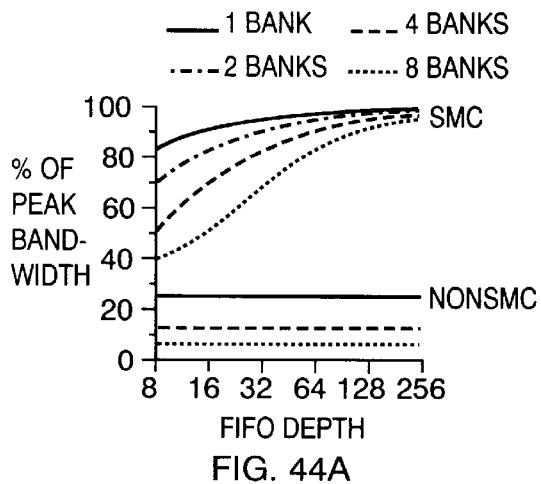
FIGS. 44a, 44b, 44c, 44d, 44e and 44f are graphical representations of R4—Medium Vector Performance (for better nonSMC alignment)
Figure 44B:
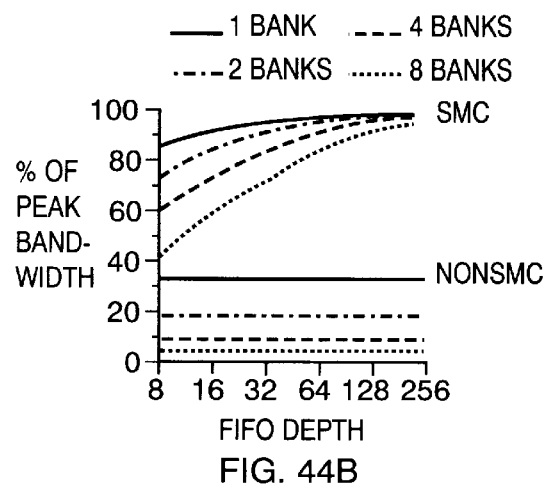
Figure 44C:
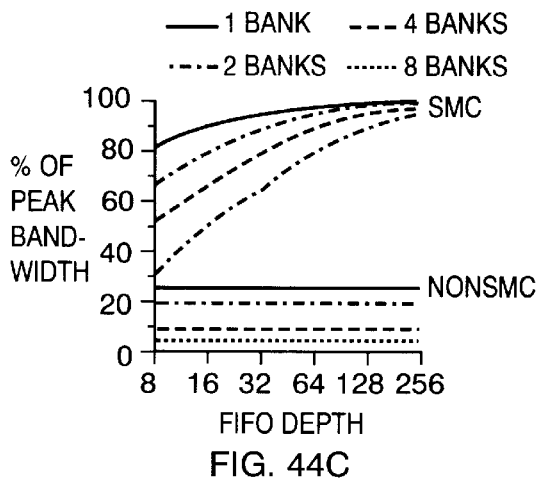
Figure 44D:
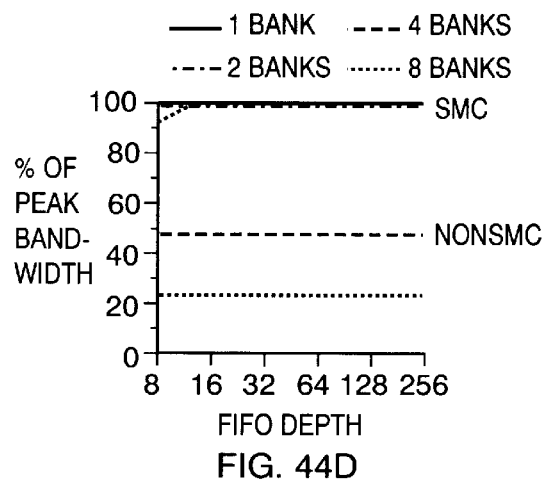
Figure 44E:
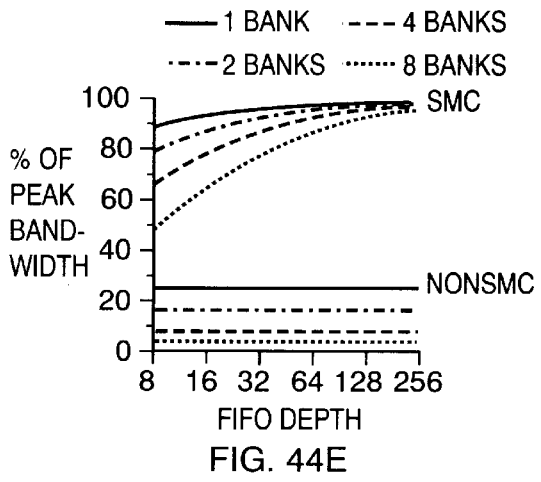
Figure 44F:
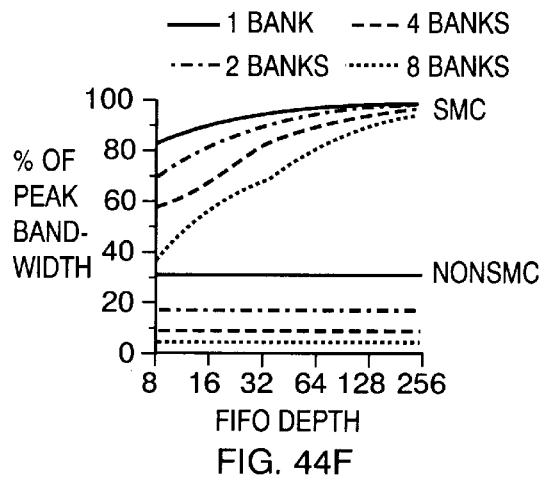
Figure 45A:
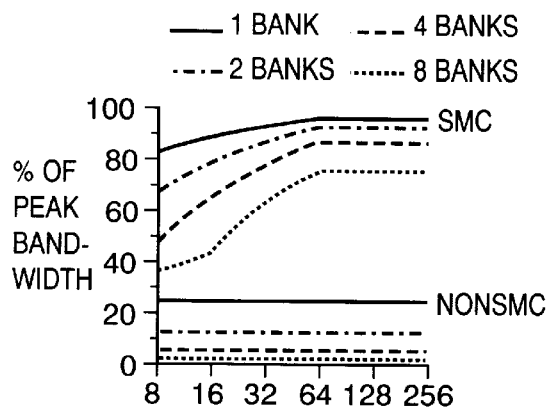
FIGS. 45a, 45b, 45c, 45d, 45e and 45f are graphical representations of R4—Short Vector Performance.
Figure 45B:
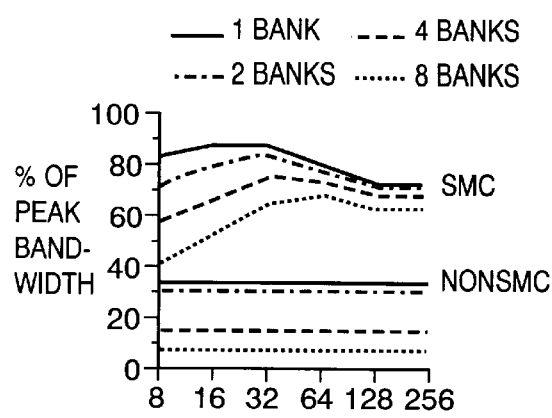
Figure 45C:
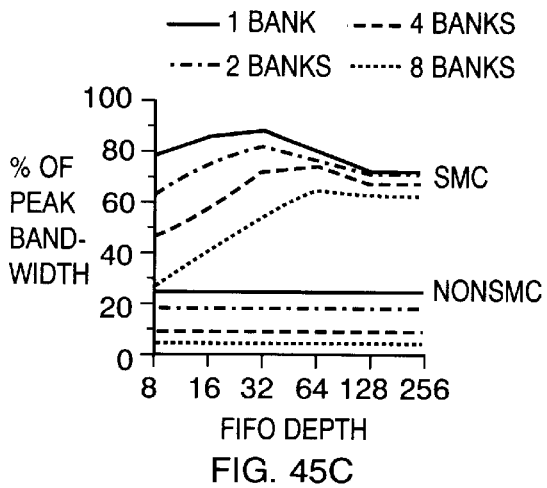
Figure 45D:
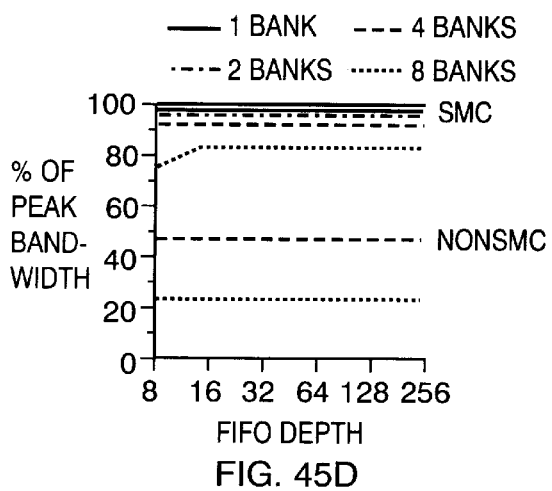
Figure 45E:
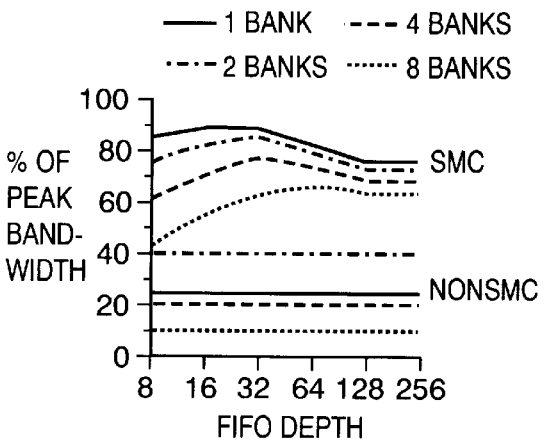
Figure 45F:
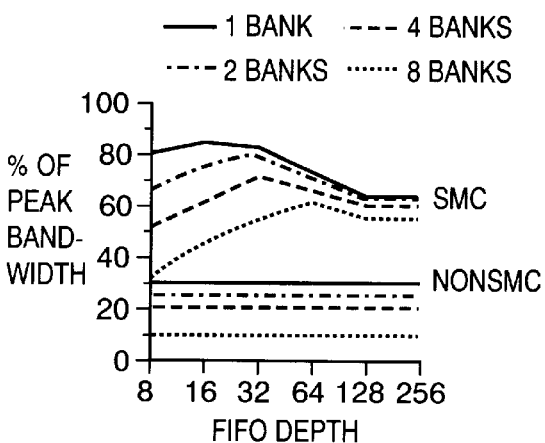
Figure 46A:
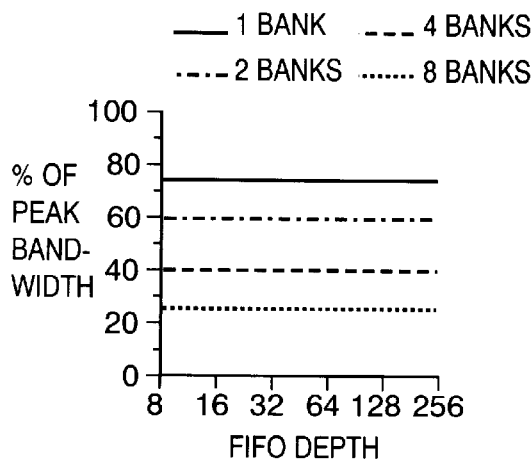
FIGS. 46a, 46b, 46c, 46d, 46e and 46f are graphical representations of T4—Long Vector Performance.
Figure 46B:
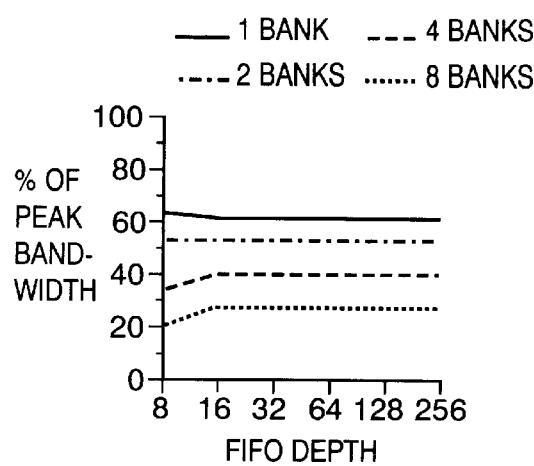
Figure 46C:
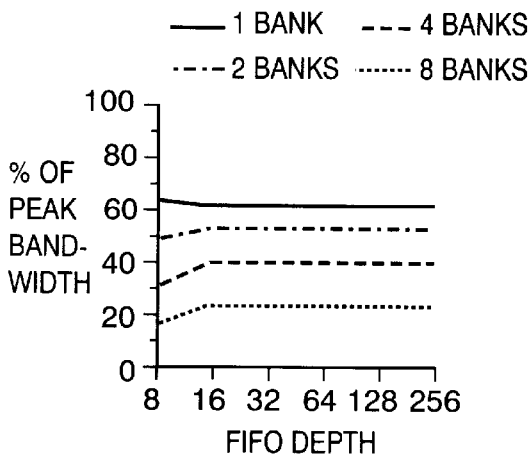
Figure 46D:
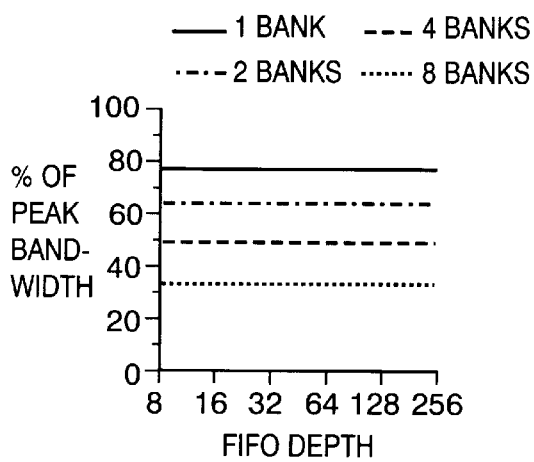
Figure 46E:
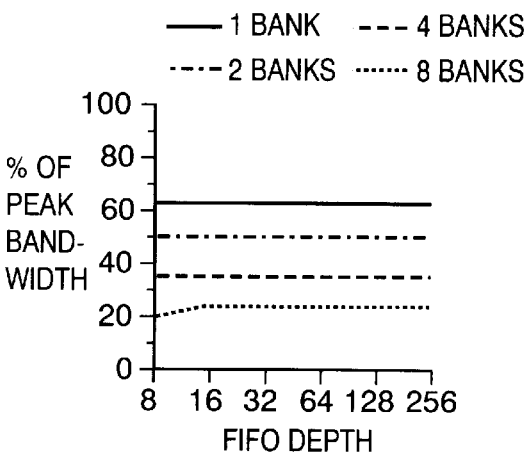
Figure 46F:
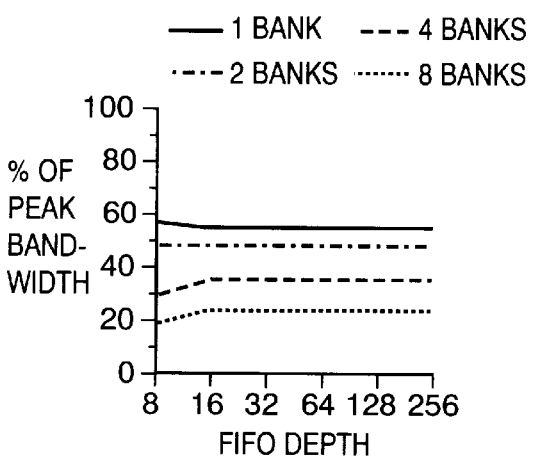
Figure 47A:
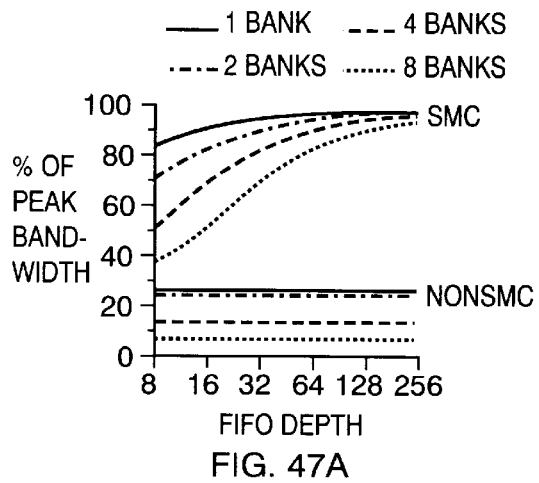
FIGS. 47a, 47b, 47c, 47d, 47e and 47f are graphical representations of T4—Medium Vector Performance (for better nonSMC alignment)
Figure 47B:
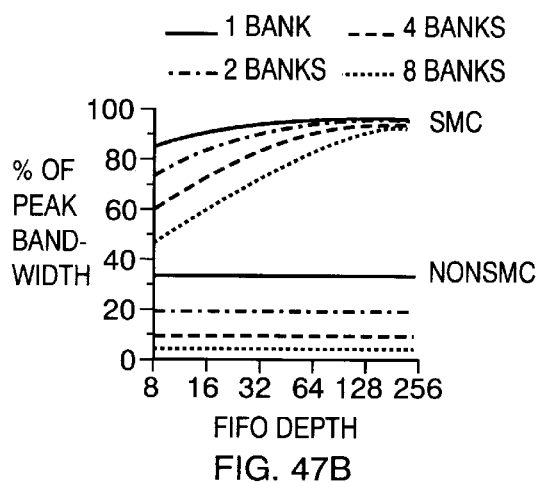
Figure 47C:
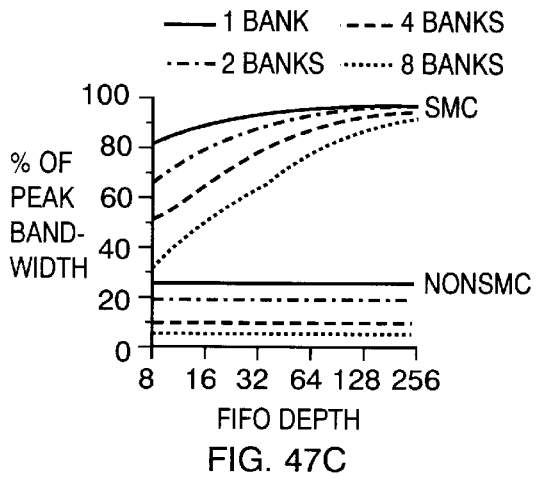
Figure 47D:
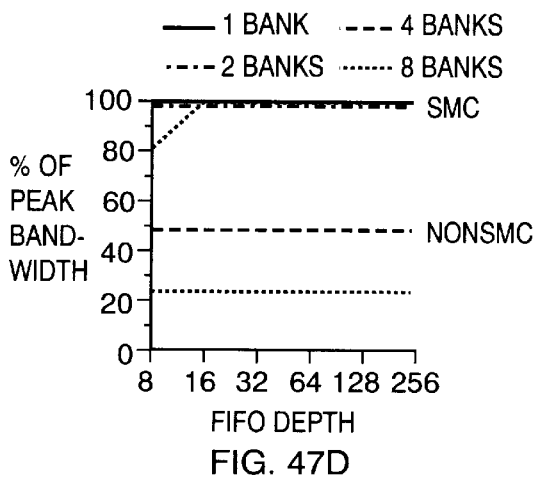
Figure 47E:
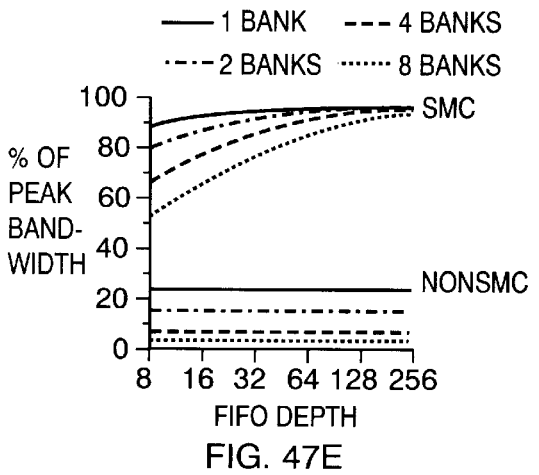
Figure 47F:
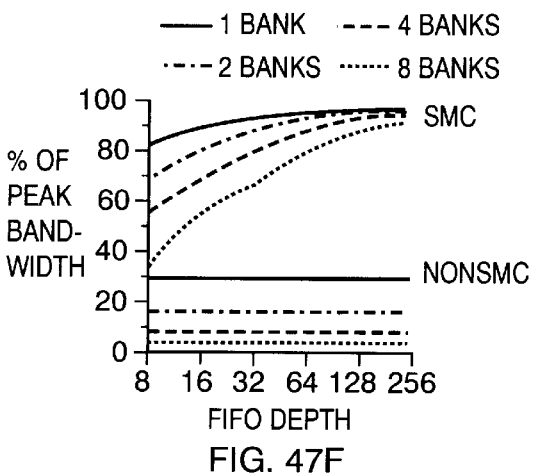
Figure 48A:
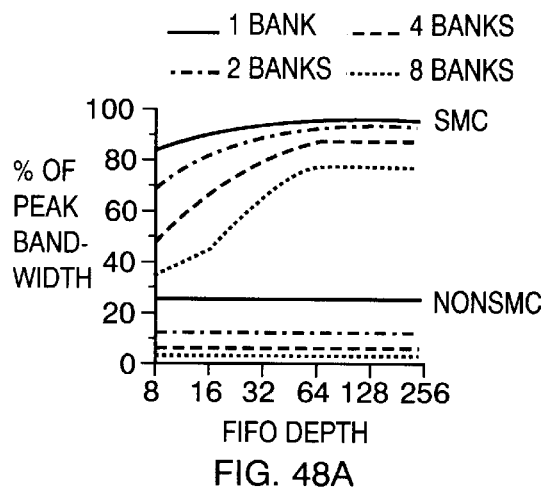
FIGS. 48a, 48b, 48c, 48d, 48e and 48f are graphical representations of T4—Short Vector Performance.
Figure 48B:
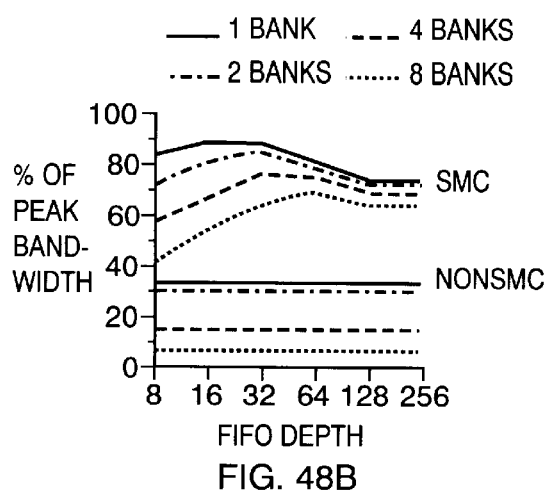
Figure 48C:
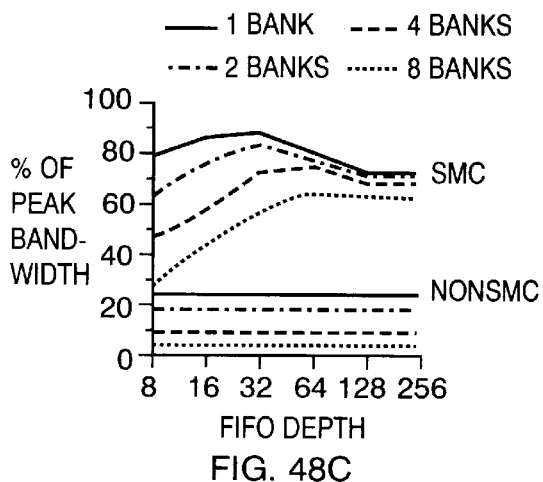
Figure 48D:
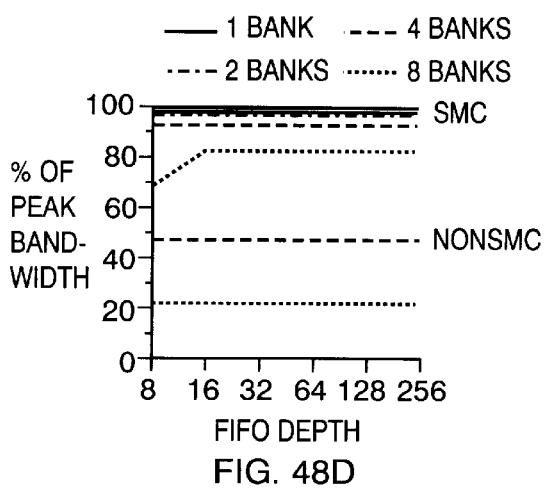
Figure 48E:
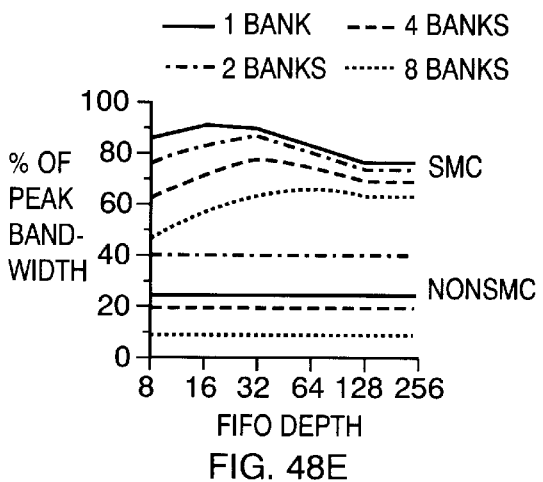
Figure 48F:
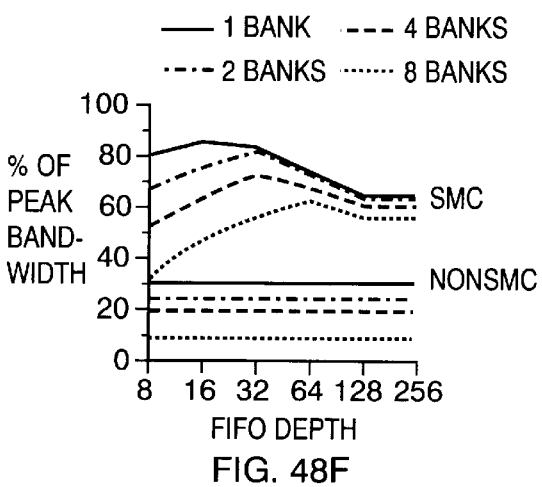
Figure 49A:
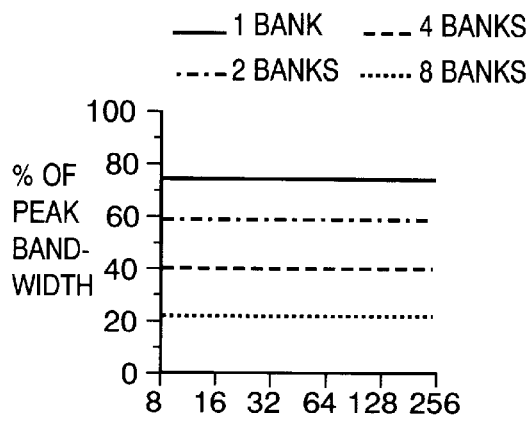
FIGS. 49a, 49b, 49c, 49d, 49e and 49f are graphical representations of P5—Long Vector Performance.
Figure 49B:
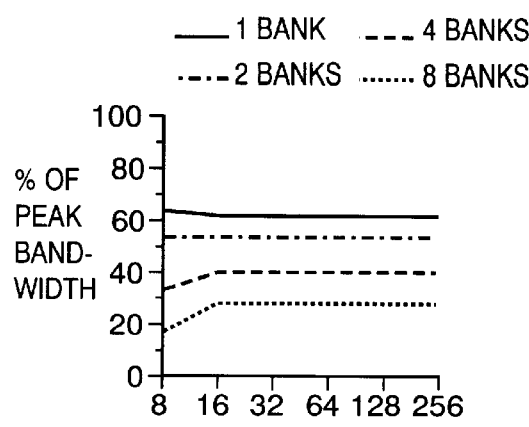
Figure 49C:
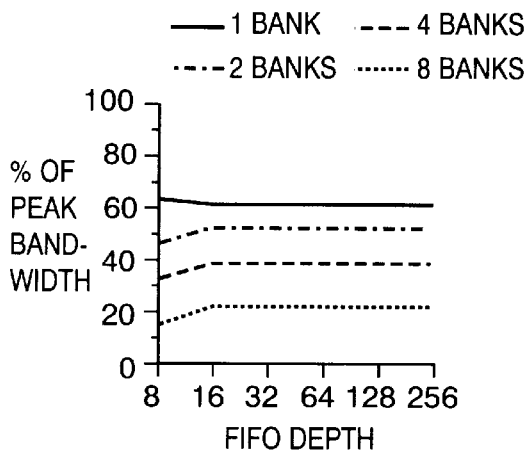
Figure 49D:
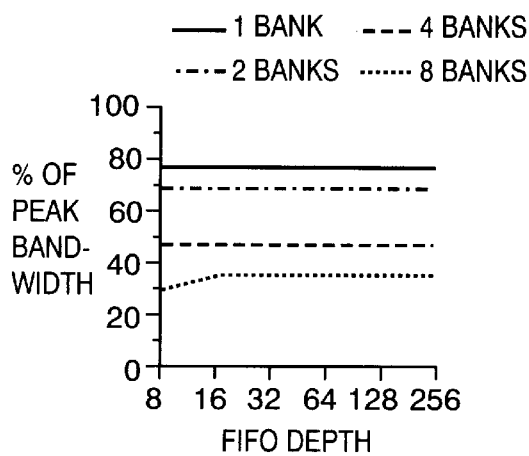
Figure 49E:
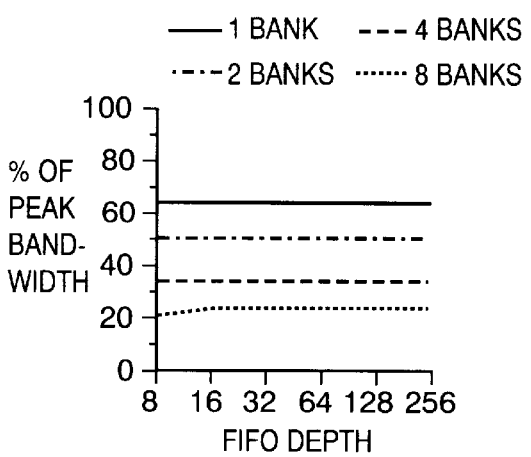
Figure 49F:
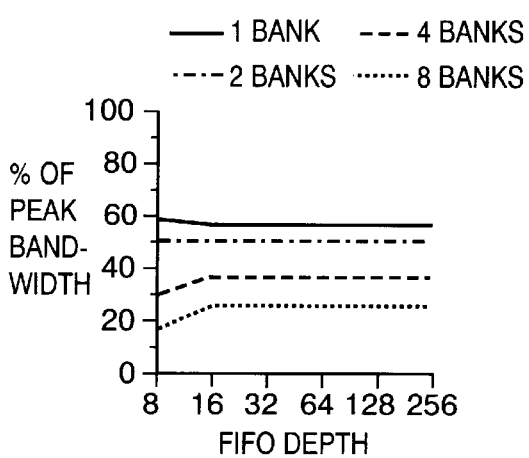
Figure 50A:
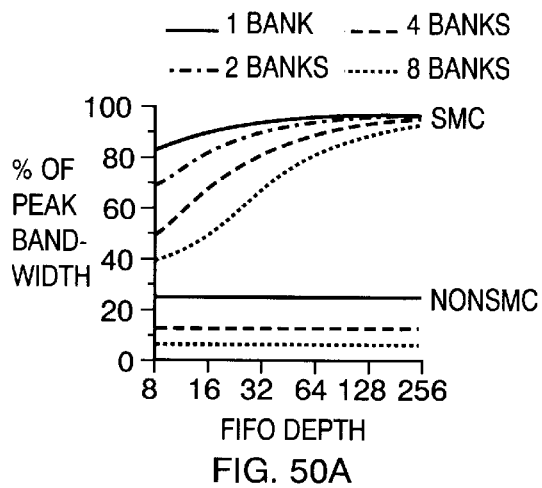
FIGS. 50a, 50b, 50c, 50d, 50e and 50f are graphical representations of P5—Medium Vector Performance (for better nonSMC alignment)
Figure 50B:
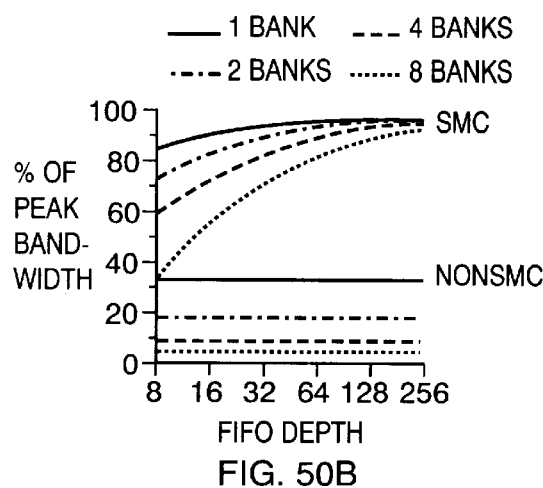
Figure 50C:
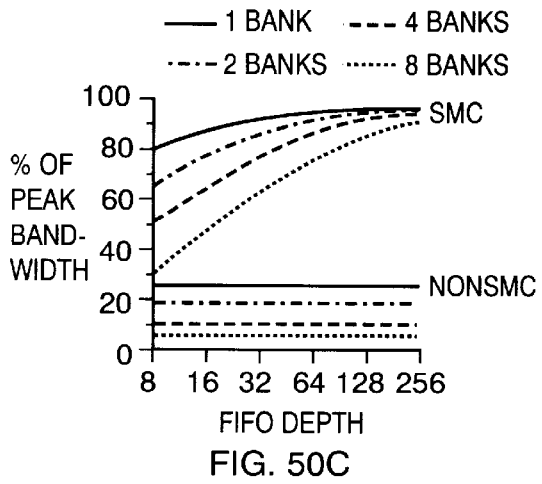
Figure 50D:
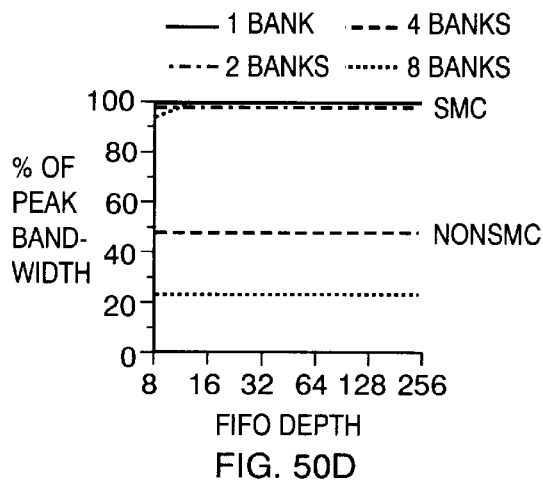
Figure 50E:
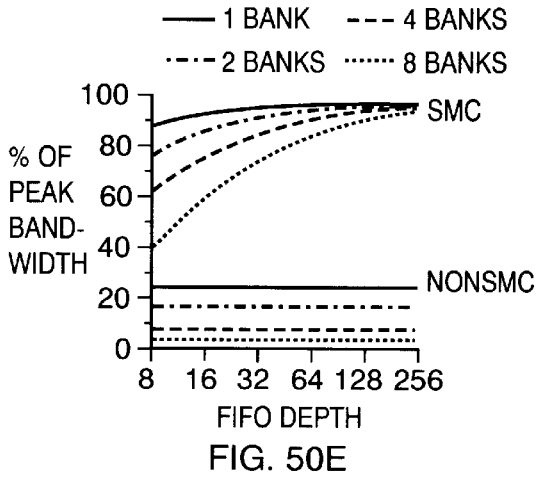
Figure 50F:
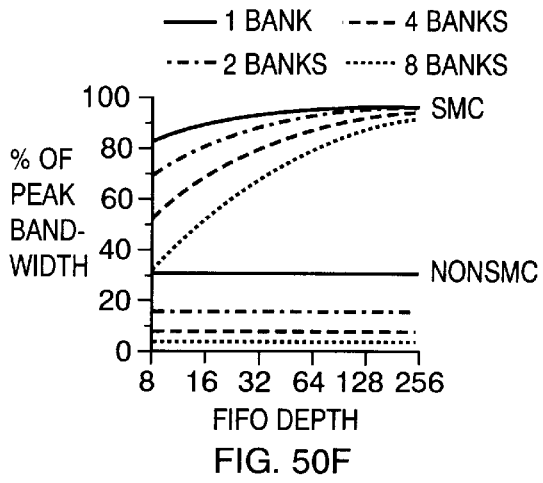
Figure 51A:
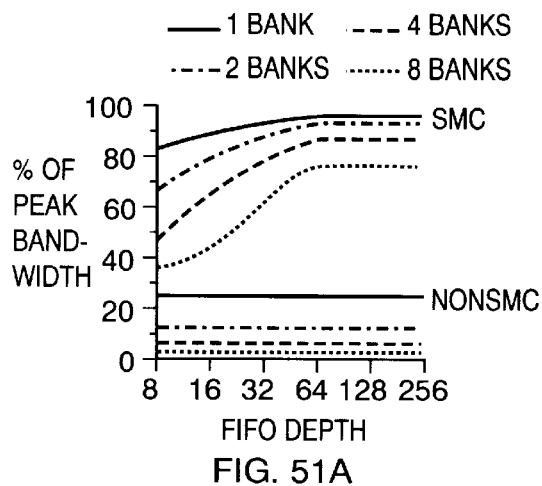
FIGS. 51a, 51b, 51c, 51d, 51e and 51f are graphical representations of P5—Short Vector Performance.
Figure 51B:
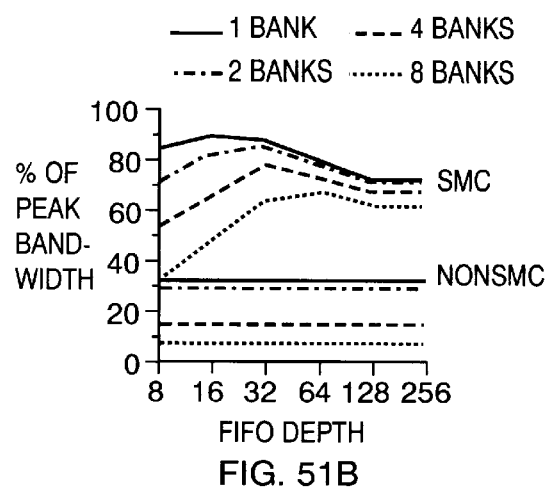
Figure 51C:
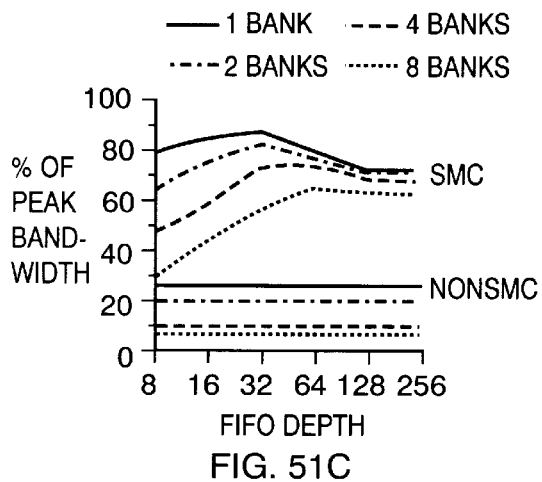
Figure 51D:
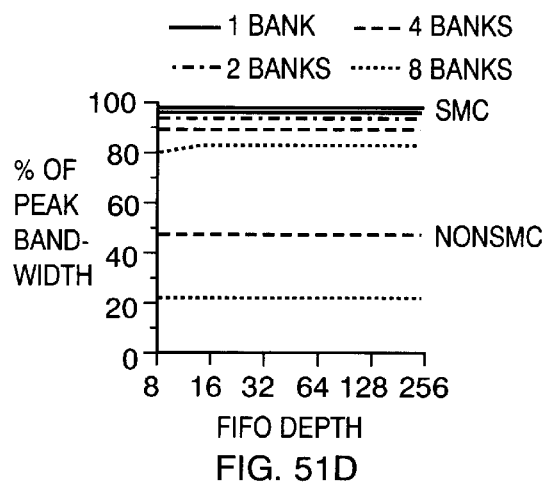
Figure 51E:
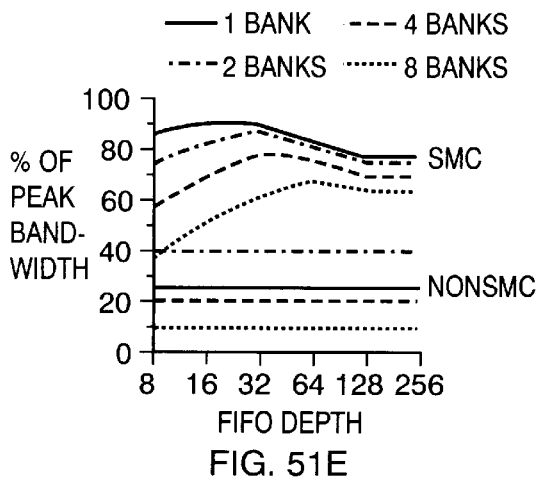
Figure 51F:
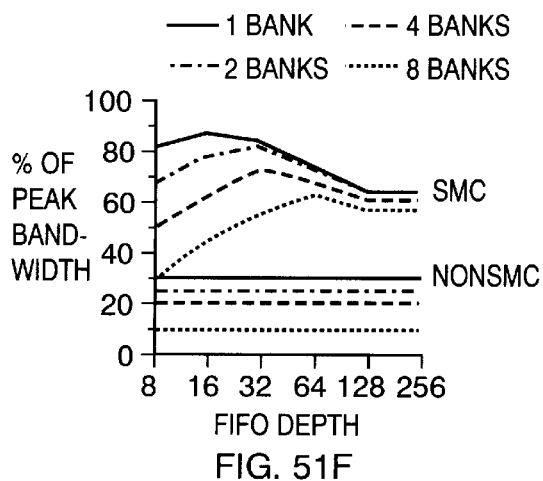
Figure 52A:
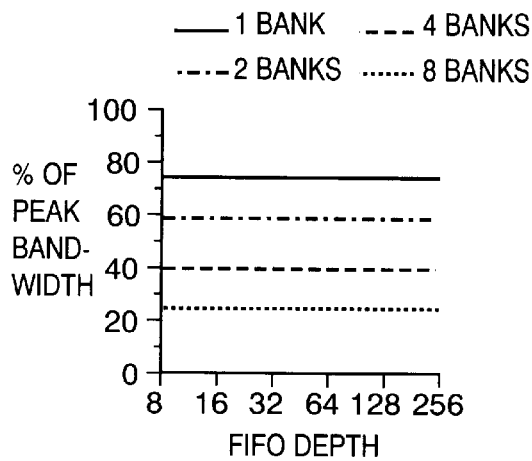
FIGS. 52a, 52b, 52c, 52d, 52e and 52f are graphical representations of R5—Long Vector Performance.
Figure 52B:
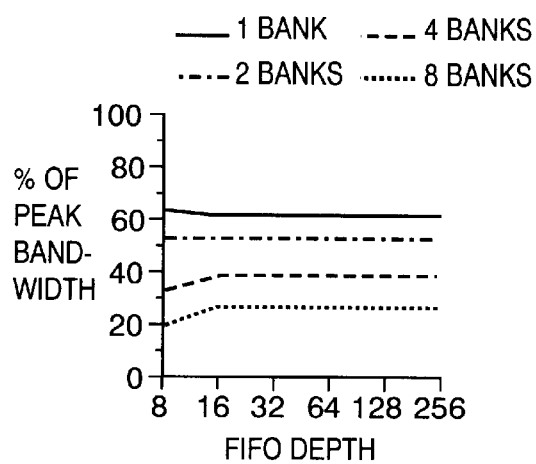
Figure 52C:
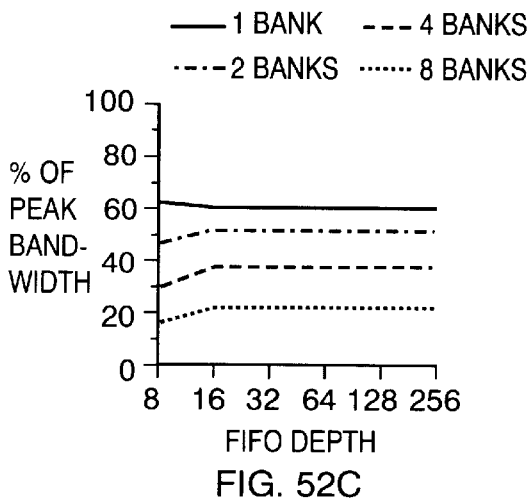
Figure 52D:
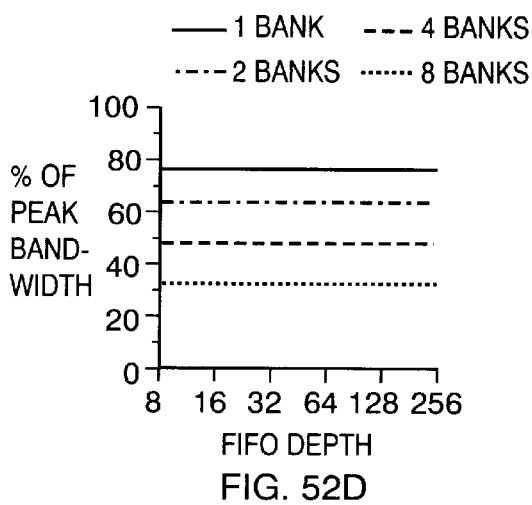
Figure 52E:
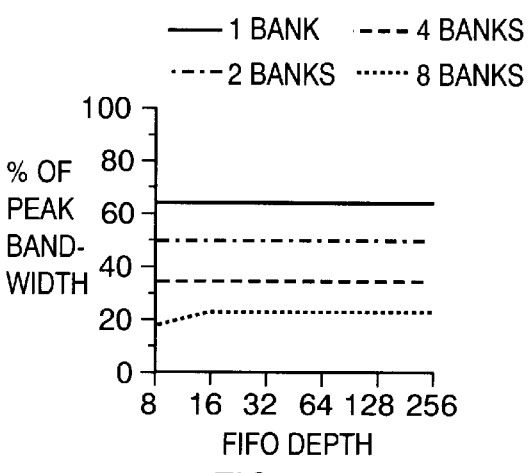
Figure 52F:
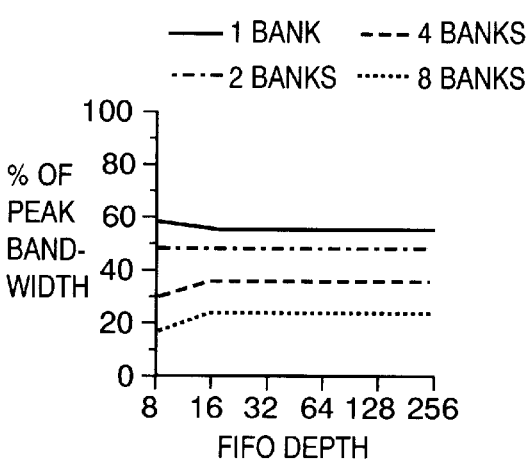
Figure 53A:
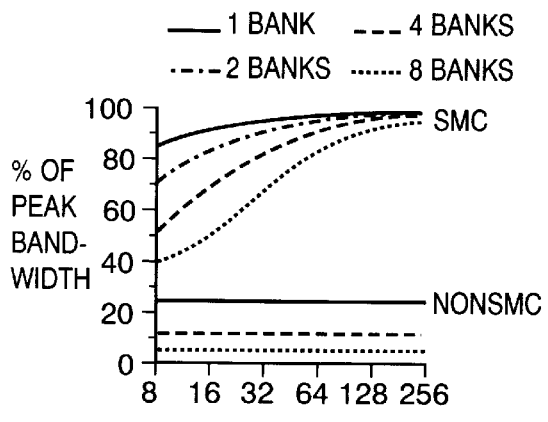
FIGS. 53a, 53b, 53c, 53d, 53e and 53f are graphical representations of R5—Medium Vector Performance (for better nonSMC alignment)
Figure 53B:
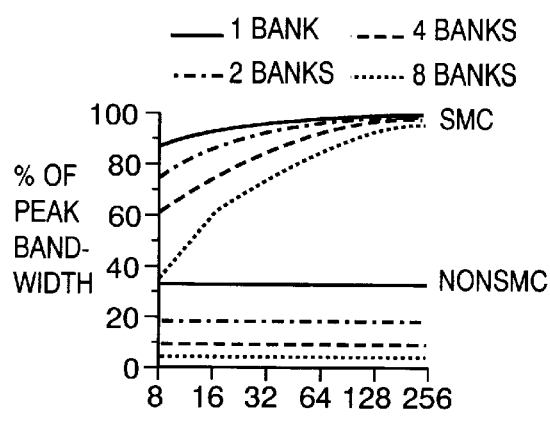
Figure 53C:
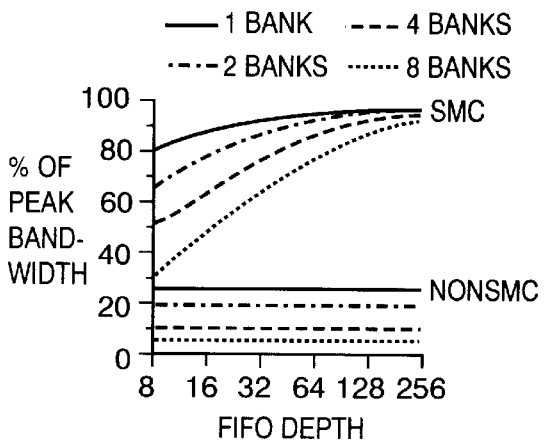
Figure 53D:
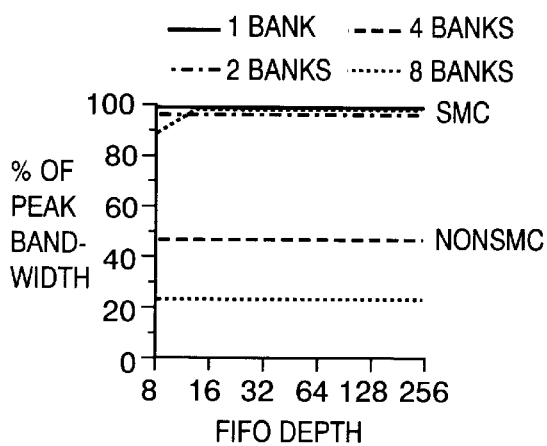
Figure 53E:
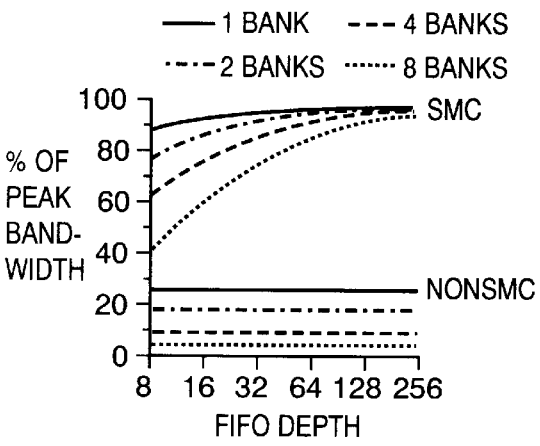
Figure 53F:
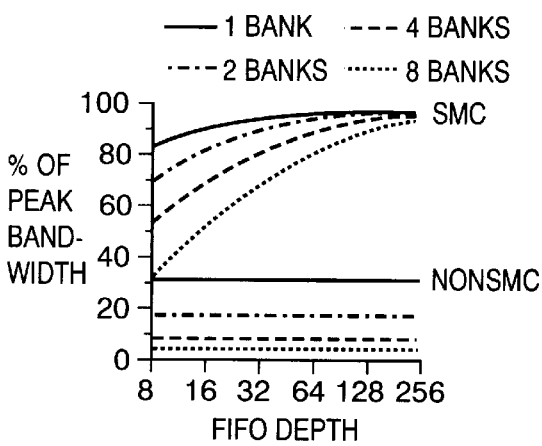
Figure 54A:
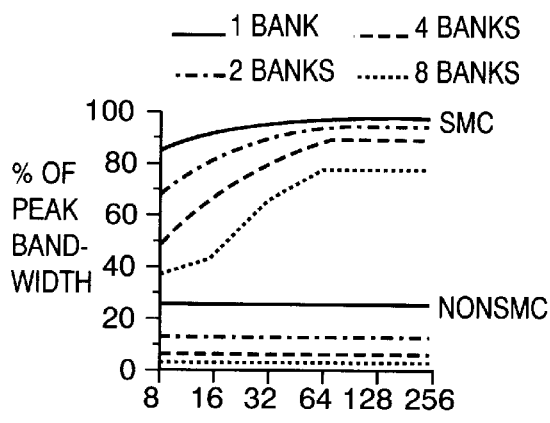
FIGS. 54a, 54b, 54c, 54d, 54e and 54f are graphical representations of R5—Short Vector Performance.
Figure 54B:
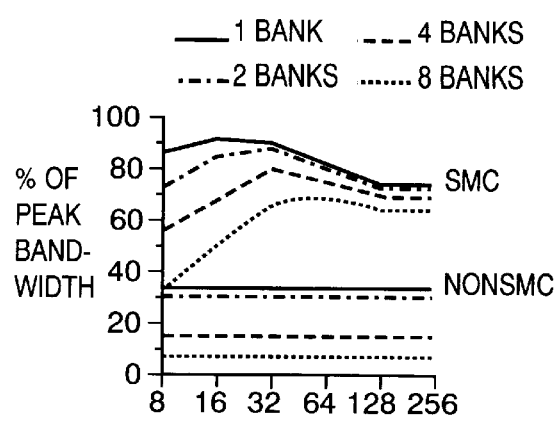
Figure 54C:
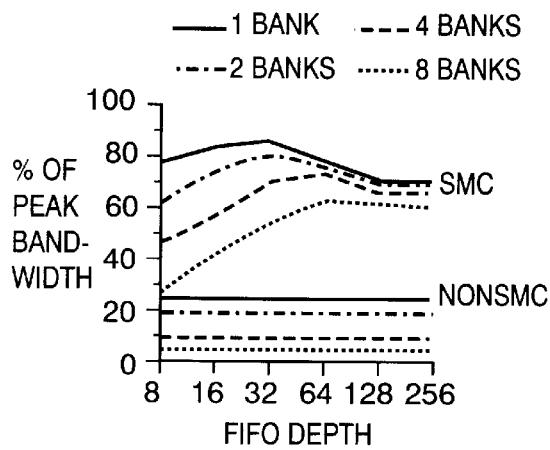
Figure 54D:
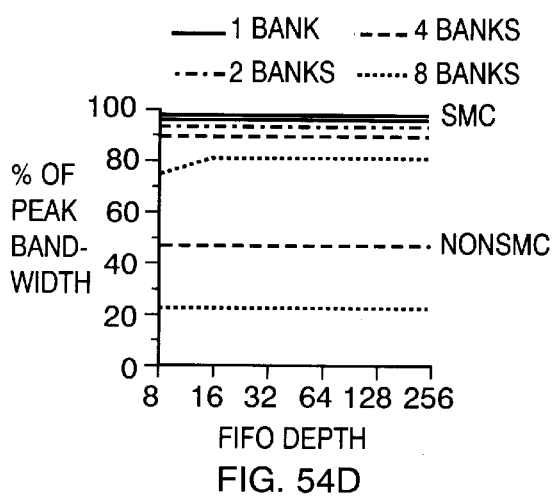
Figure 54E:
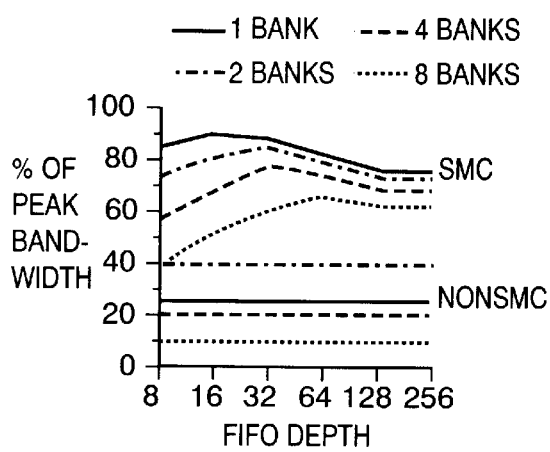
Figure 54F:
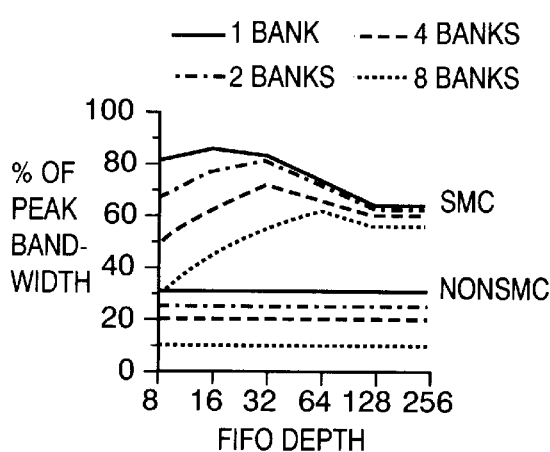
Figure 55A:
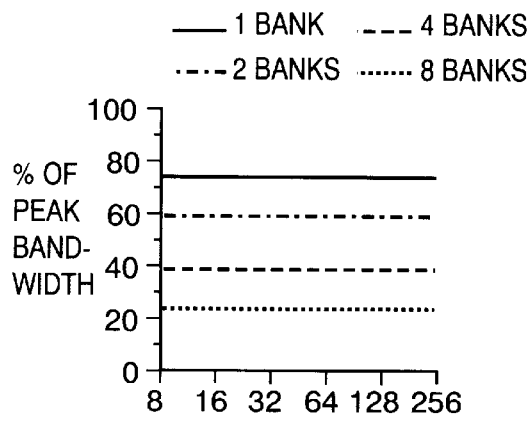
FIGS. 55a, 55b, 55c, 55d, 55e and 55f are graphical representations of T5—Long Vector Performance.
Figure 55B:
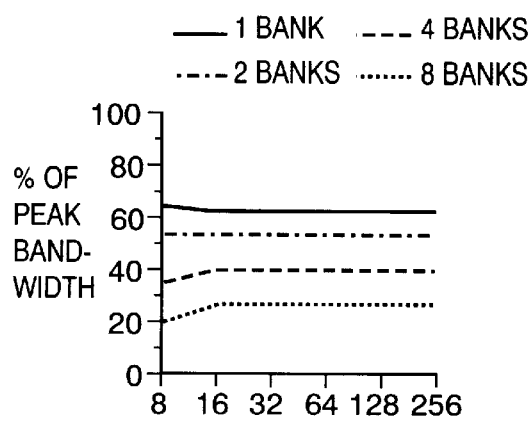
Figure 55C:
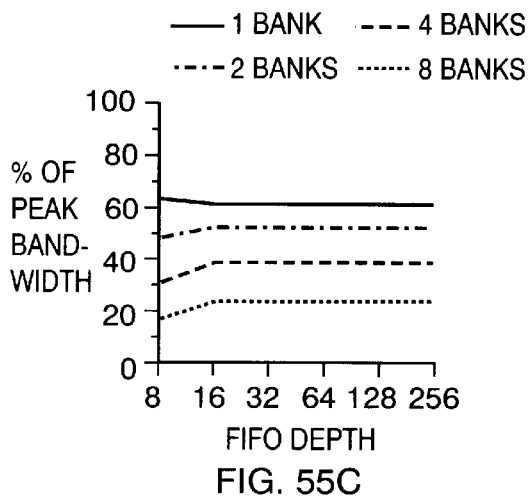
Figure 55D:
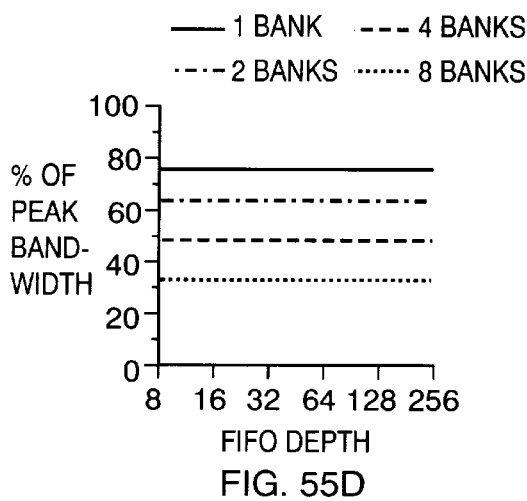
Figure 55E:
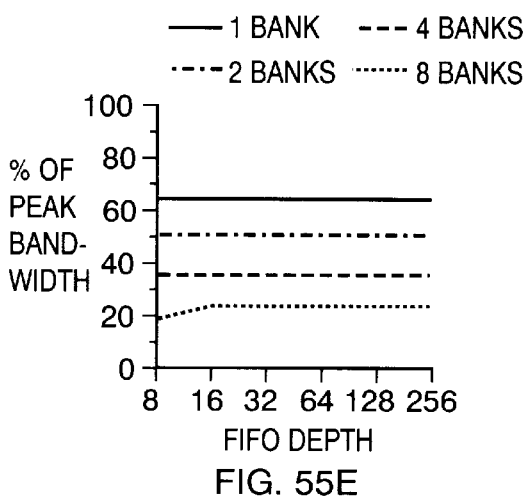
Figure 55F:
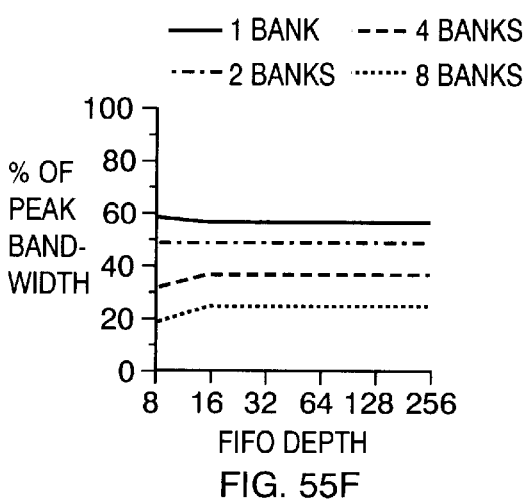
Figure 56A:
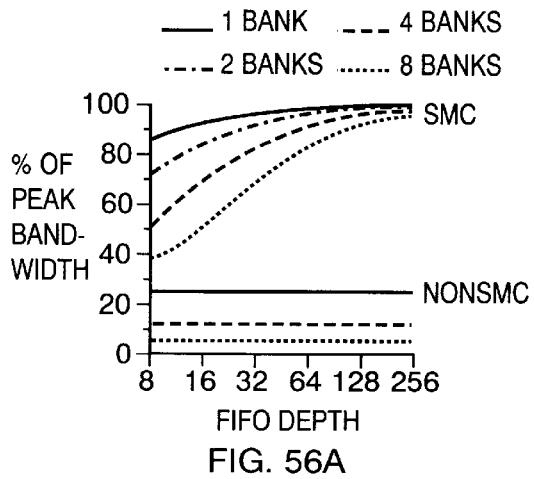
FIGS. 56a, 56b, 56c, 56d, 56e and 56f are graphical representations of T5—Medium Vector Performance (for better nonSMC alignment)
Figure 56B:
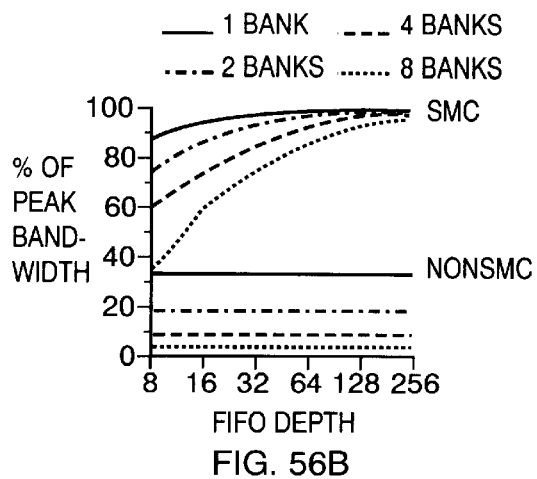
Figure 56C:
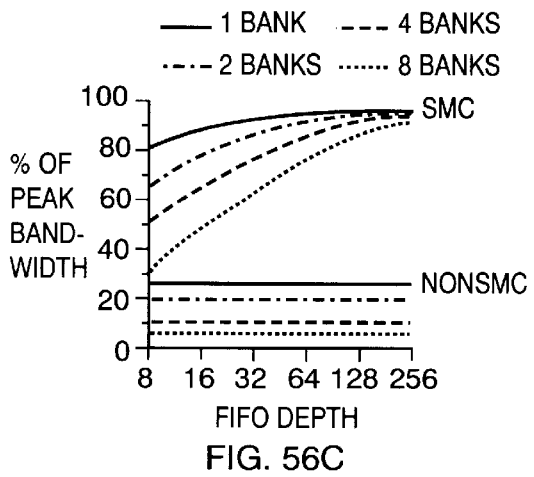
Figure 56D:
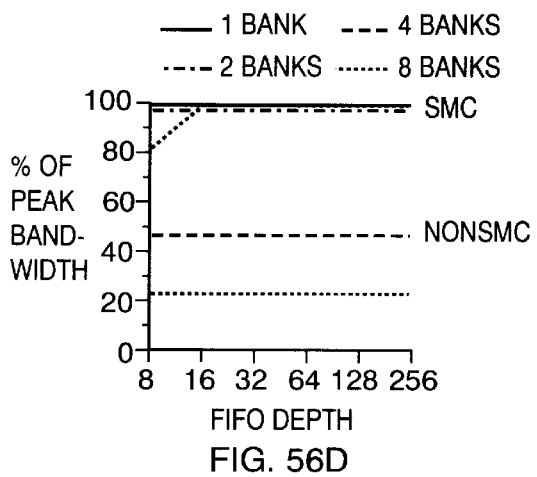
Figure 56E:
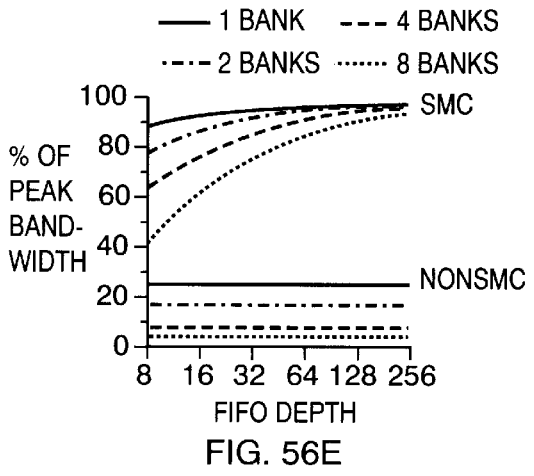
Figure 56F:
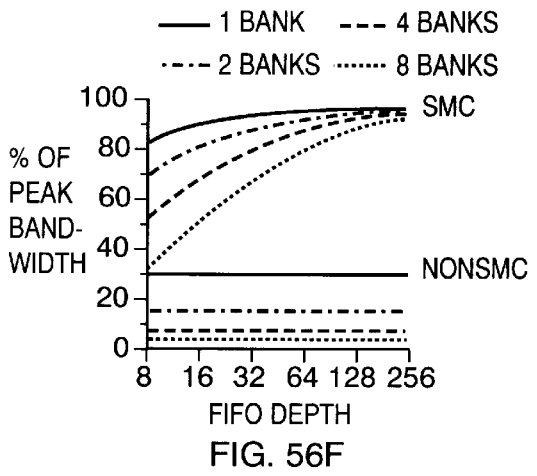
Figure 57A:
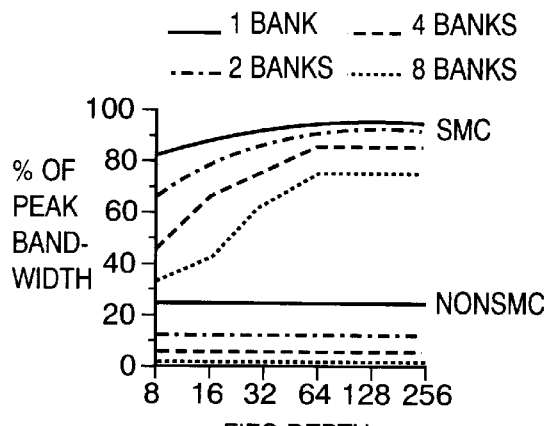
FIGS. 57a, 57b, 57c, 57d, 57e and 57f are graphical representations of T5—Short Vector Performance.
Figure 57B:
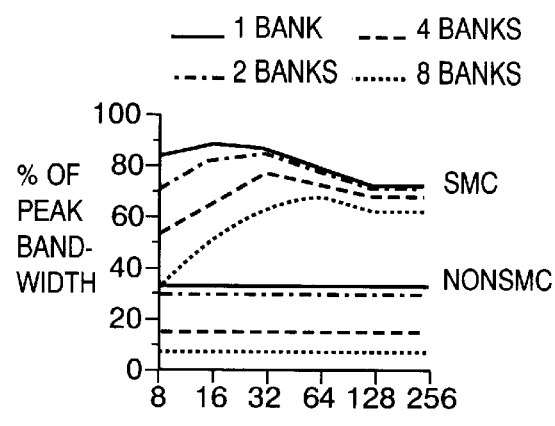
Figure 57C:
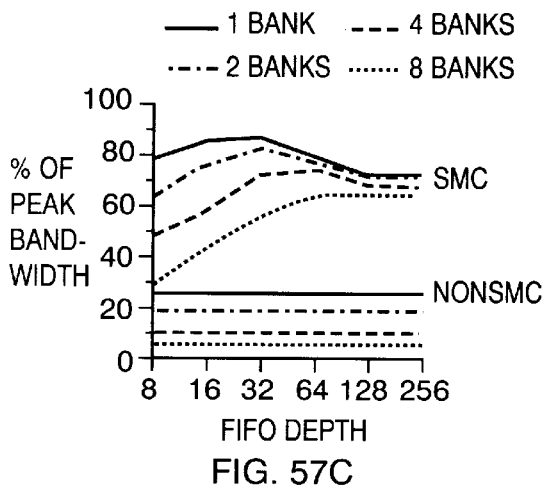
Figure 57D:
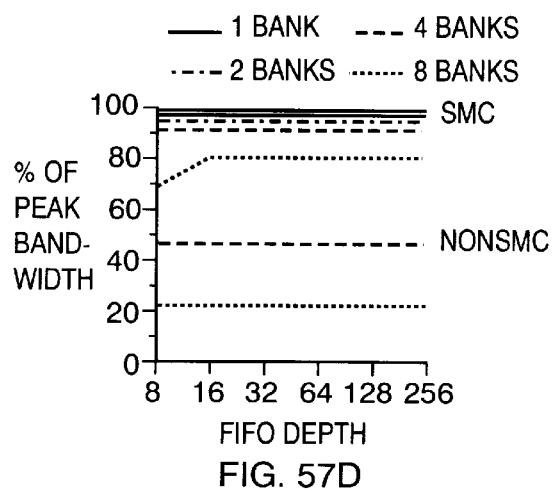
Figure 57E:
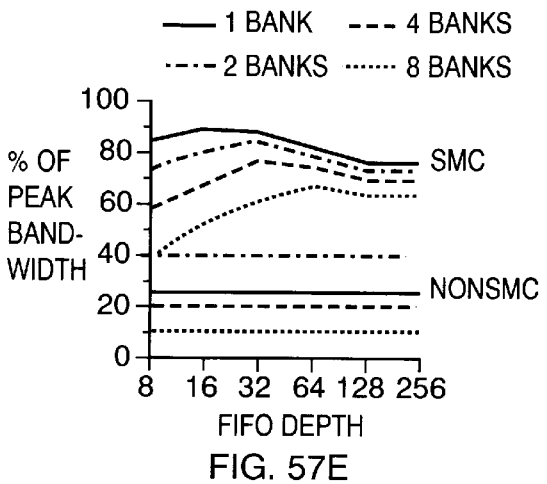
Figure 57F:
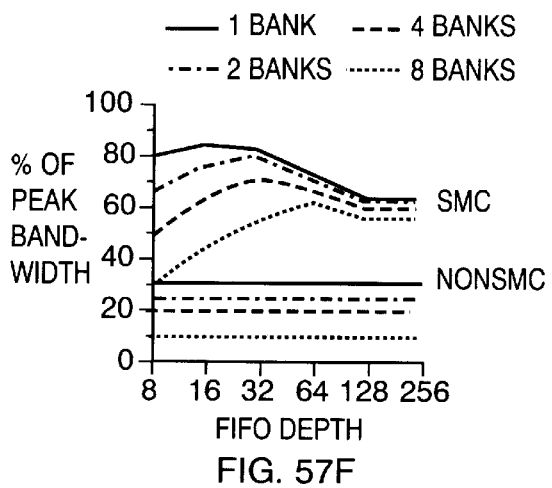
Figure 58A:
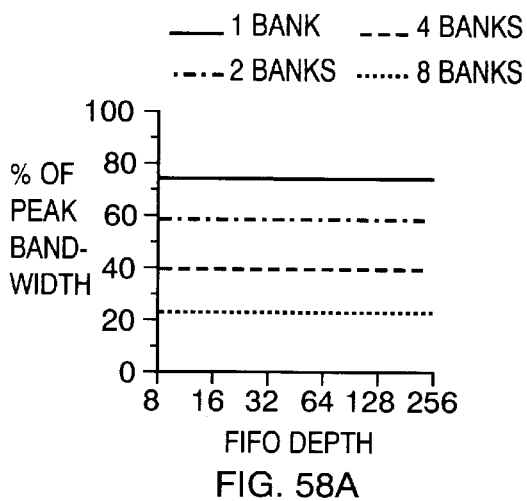
FIGS. 58a, 58b, 58c, 58d, 58e and 58f are graphical representations of A1—Long Vector Performance.
Figure 58B:
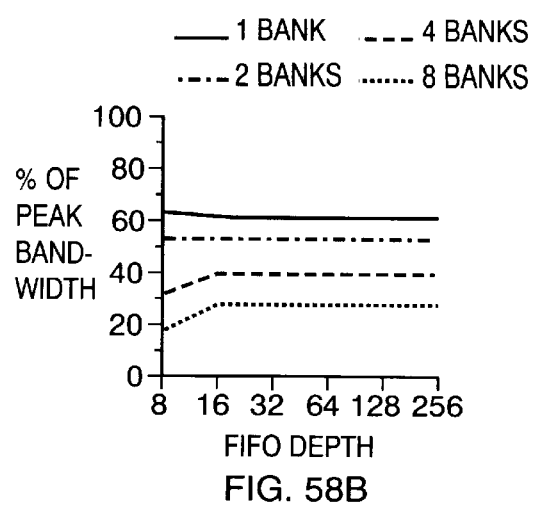
Figure 58C:
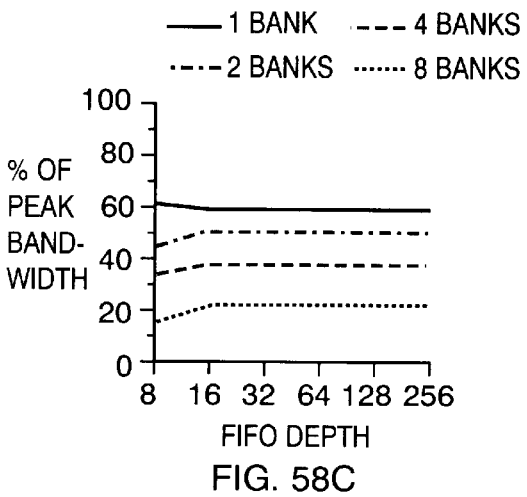
Figure 58D:
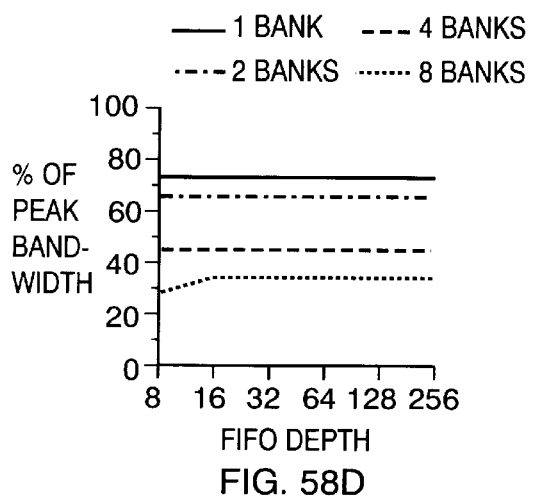
Figure 58E:
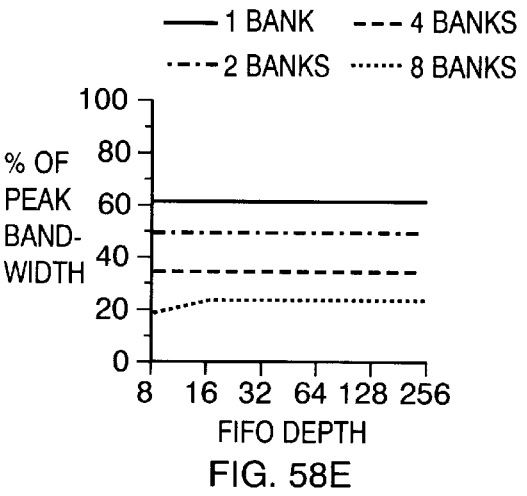
Figure 58F:
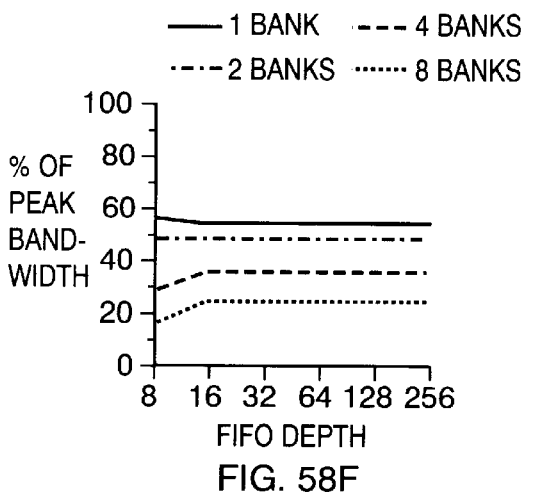
Figure 59A:
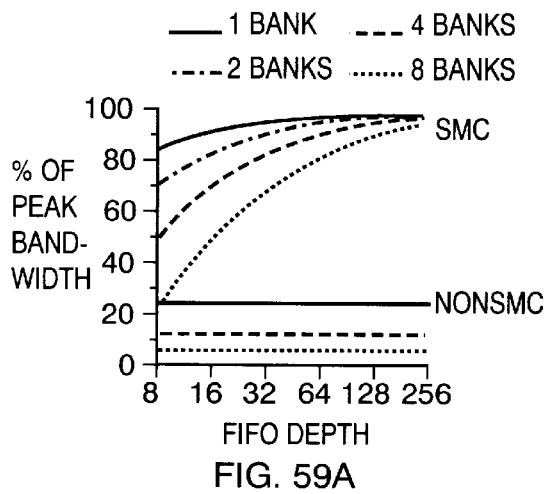
FIGS. 59a, 59b, 59c, 59d, 59e and 59f are graphical representations of A1—Medium Vector Performance.
Figure 59B:
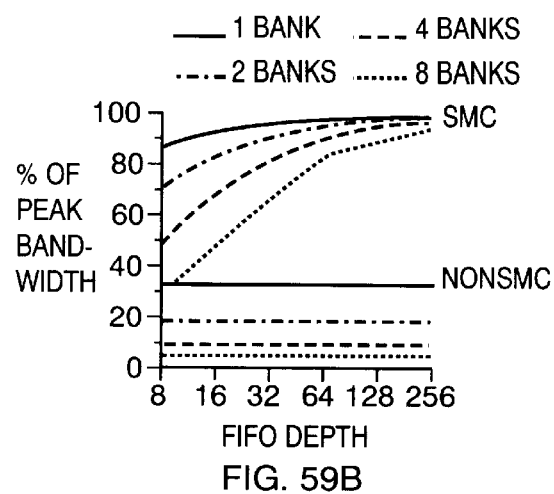
Figure 59C:
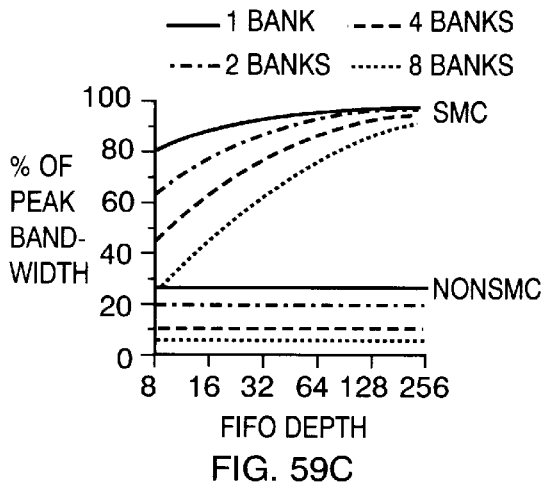
Figure 59D:
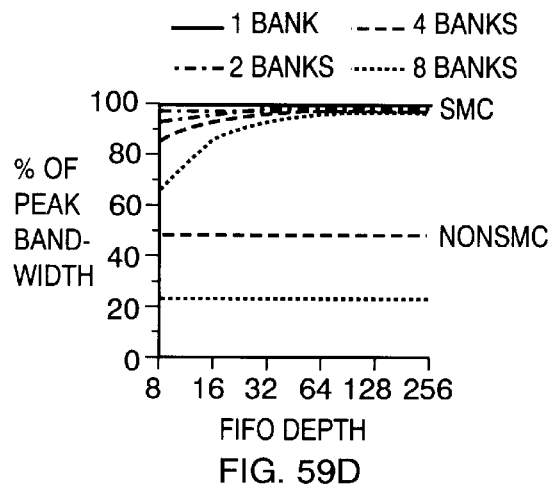
Figure 59E:
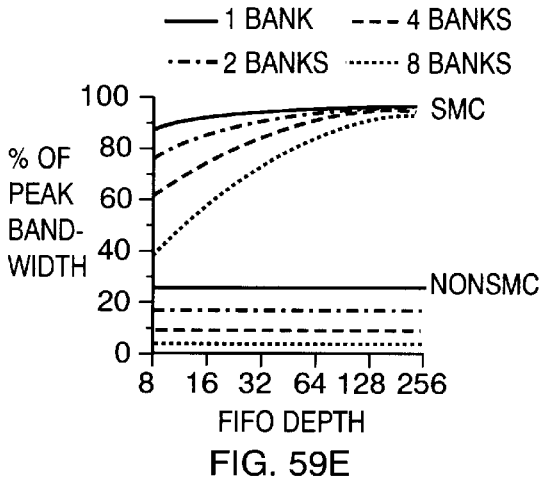
Figure 59F:
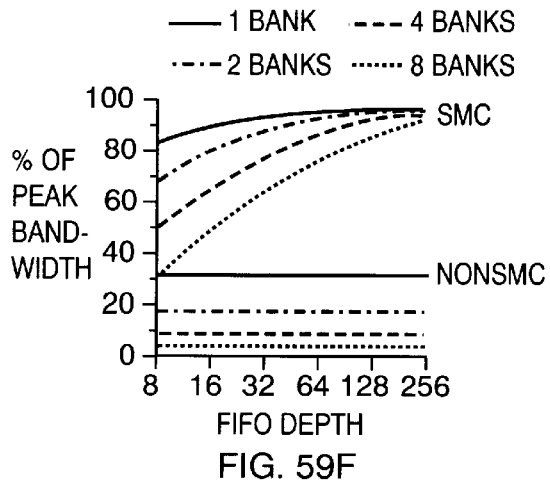
Figure 60A:
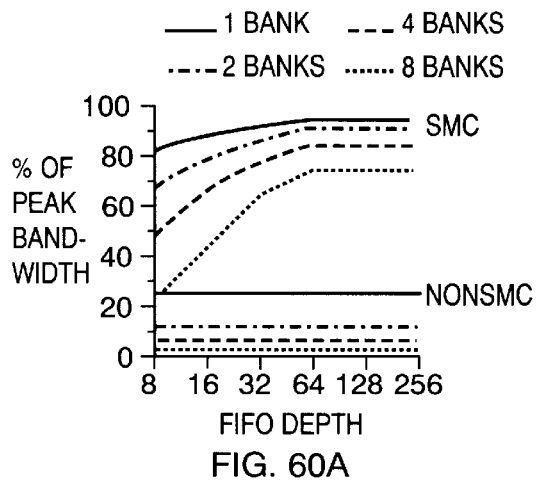
FIGS. 60a, 60b, 60c, 60d, 60e and 60f are graphical representations of A1—Short Vector Performance.
Figure 60B:
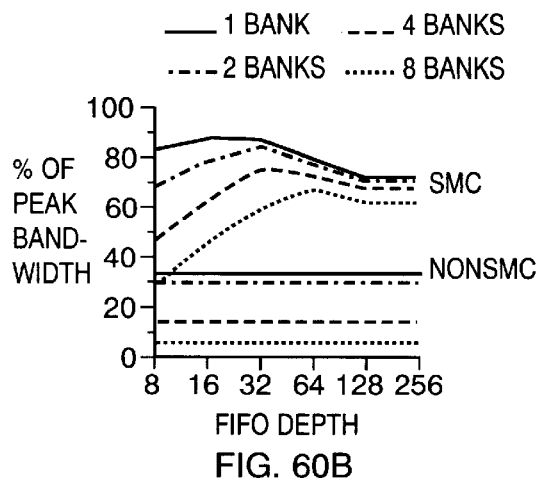
Figure 60C:
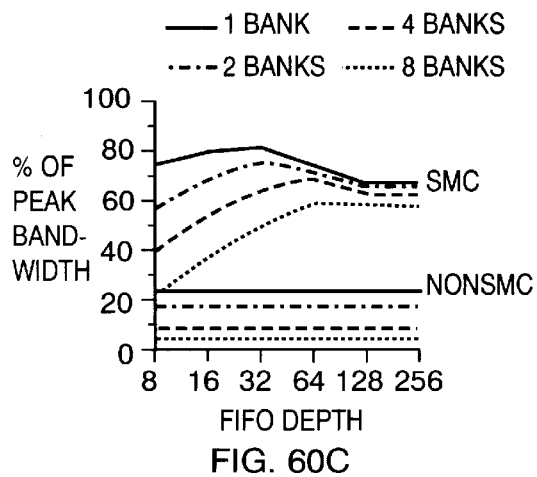
Figure 60D:
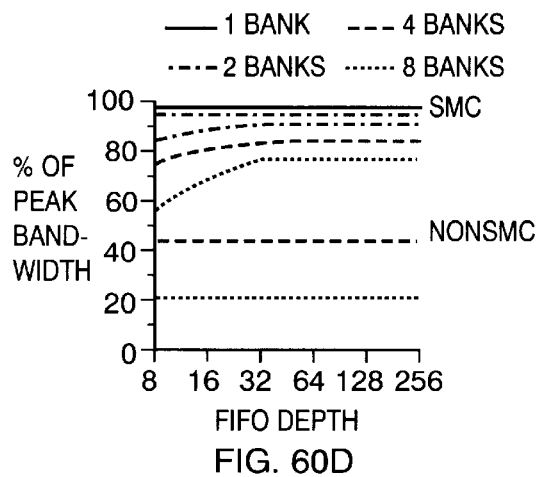
Figure 60E:
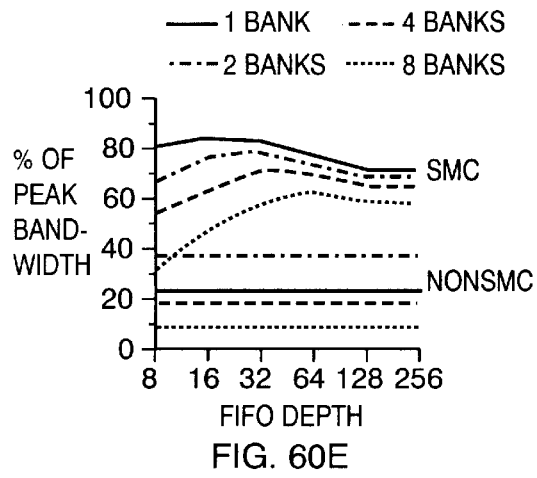
Figure 60F:
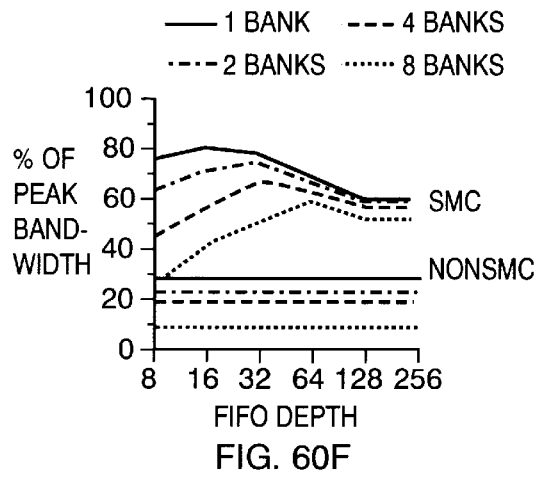
Figure 61A:
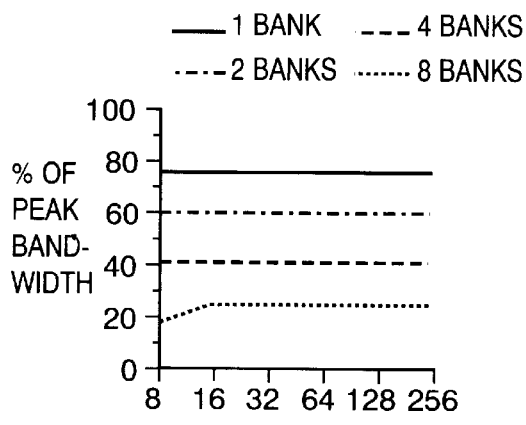
FIGS. 61a, 61b, 61c, 61d, 61e and 61f are graphical representations of Varying Miss/Hit Cost Ratios on a Single-Bank Memory System.
Figure 61B:
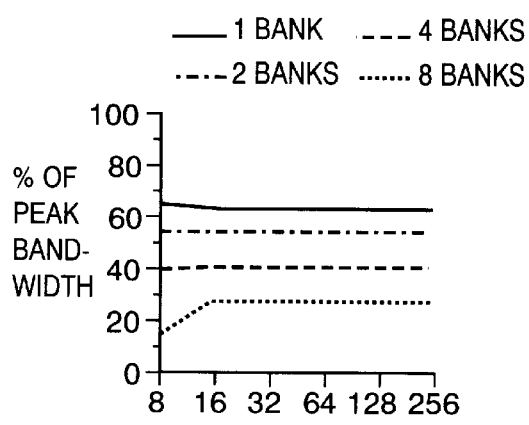
Figure 61C:
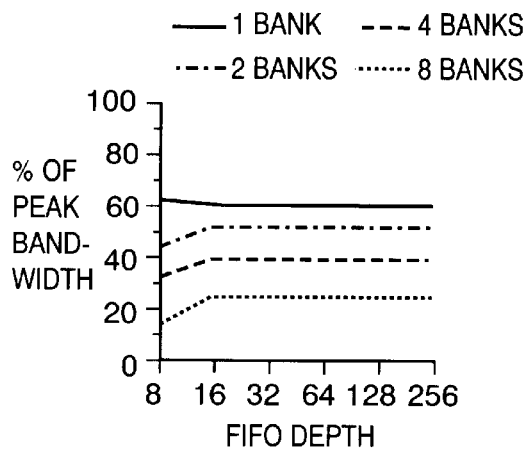
Figure 61D:
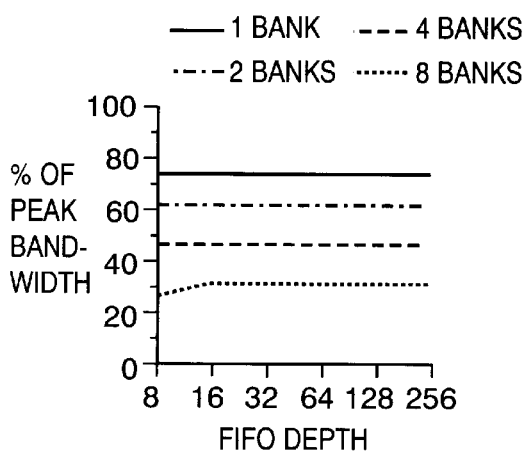
Figure 61E:
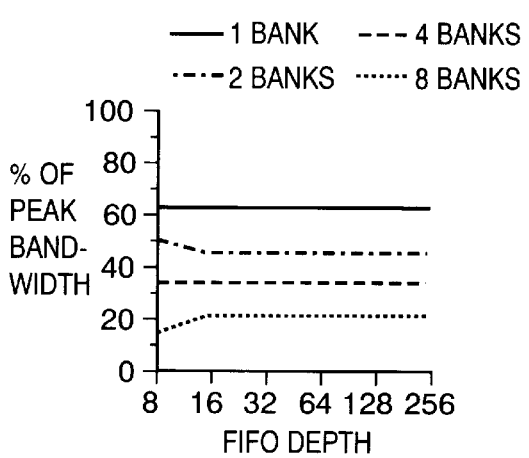
Figure 61F:
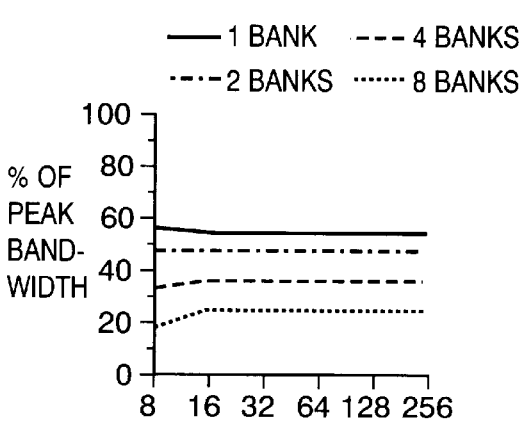
Figure 62A:
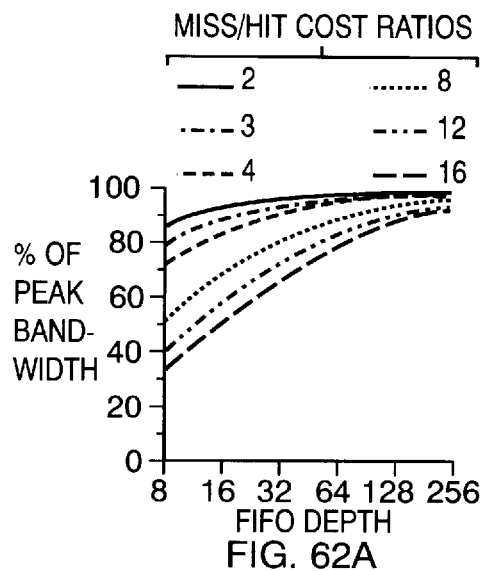
FIGS. 62a, 62b, 62c, 62d, 62e and 62f are graphical representations of Varying Miss/Hit Cost Ratios on a Two-Bank Memory System.
Figure 62B:
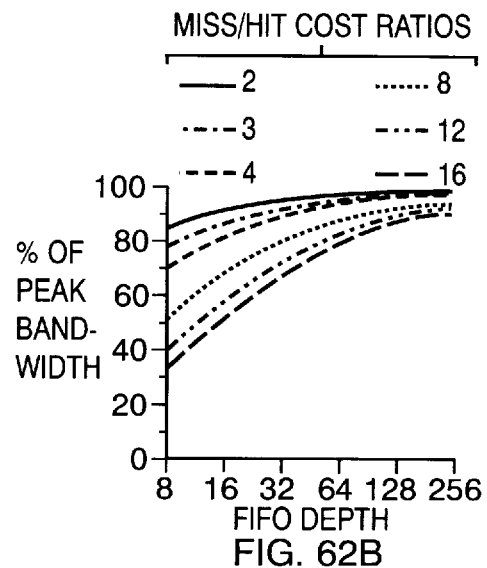
Figure 62C:
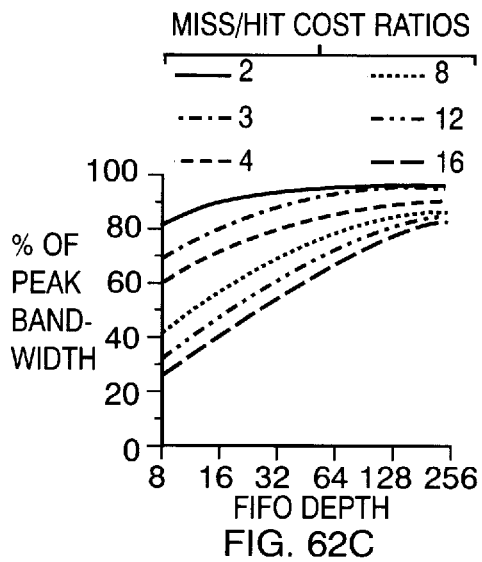
Figure 62D:
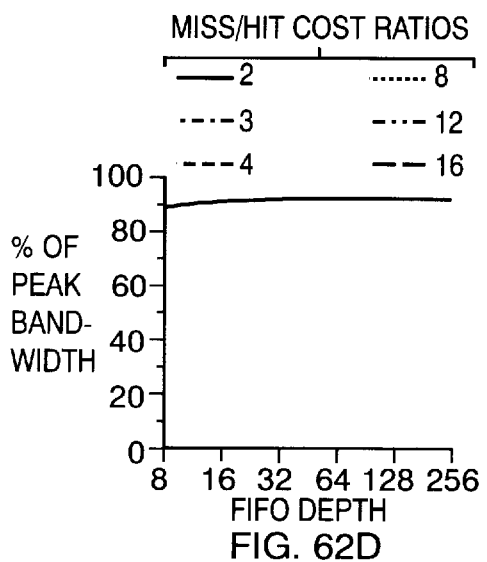
Figure 62E:
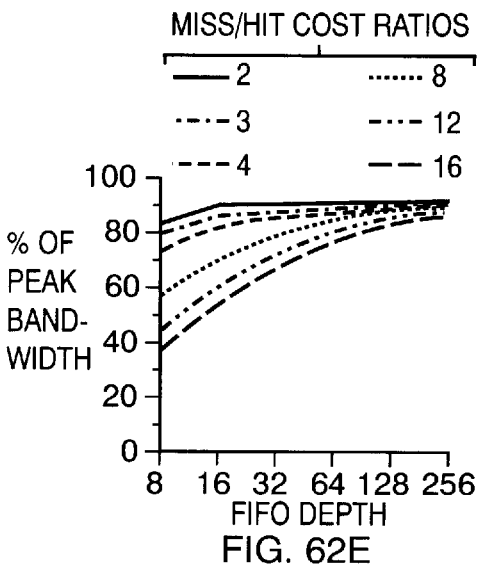
Figure 62F:
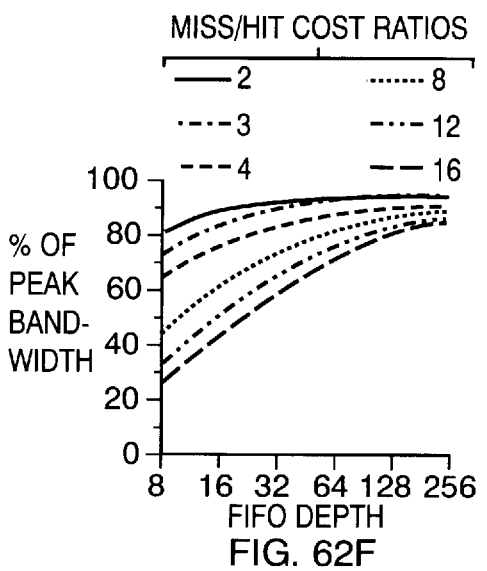
Figure 63A:
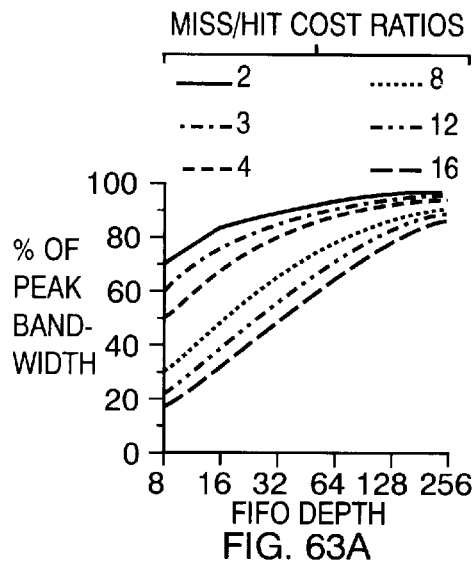
FIGS. 63a, 63b, 63c, 63d, 63e and 63f are graphical representations of Varying Miss/Hit Cost Ratios on a Four-Bank Memory System.
Figure 63B:
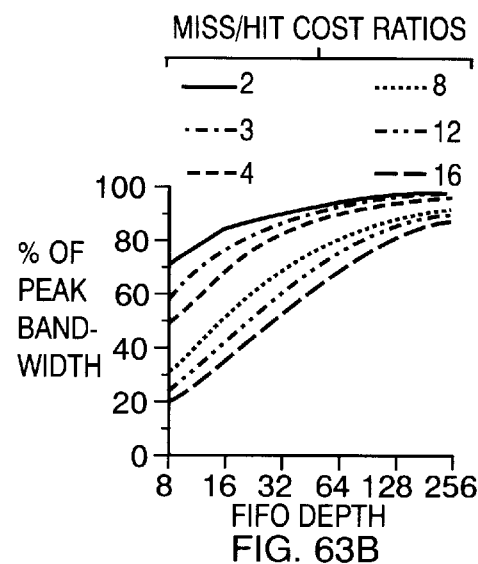
Figure 63C:
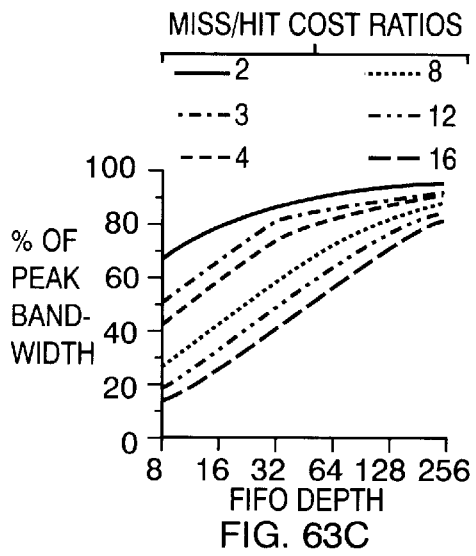
Figure 63D:
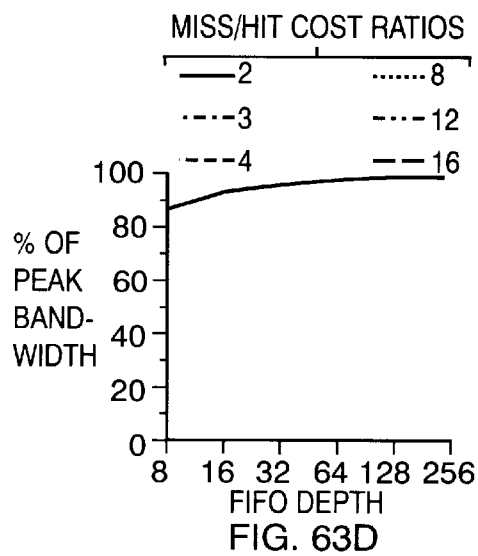
Figure 63E:
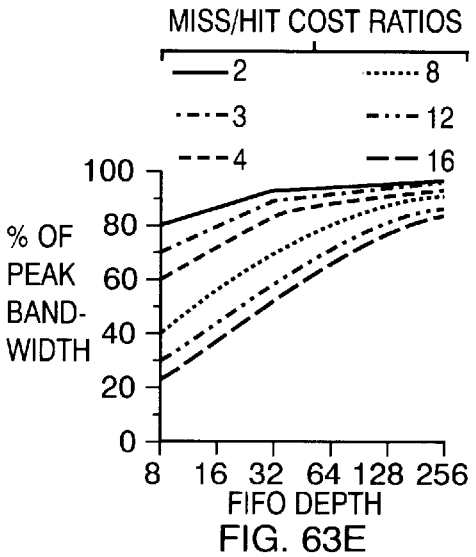
Figure 63F:
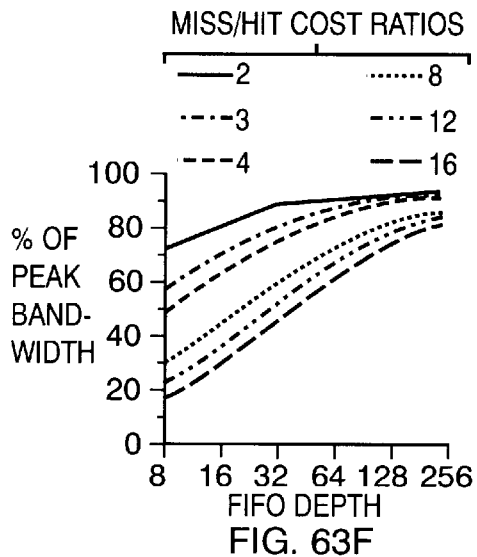
Figure 64A:
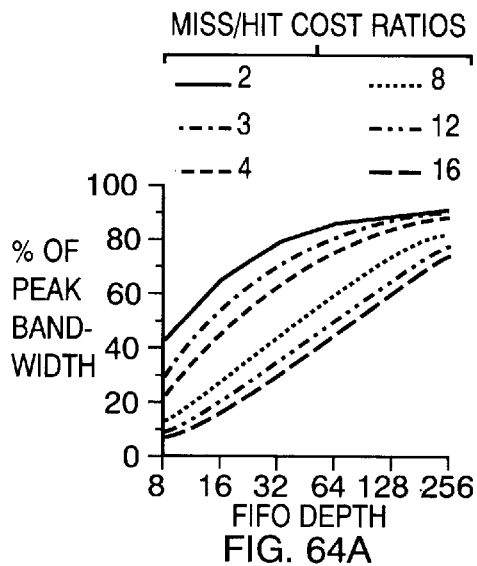
FIGS. 64a, 64b, 64c, 64d, 64e and 64f are graphical representations of Varying Miss/Hit Cost Ratios on an Eight-Bank Memory System; and, FIGS. 65a, 65b, 65c, 65d, 65e and 65f are graphical representations of hydro—Varying Miss Costs on Four Memory System.
Figure 64B:
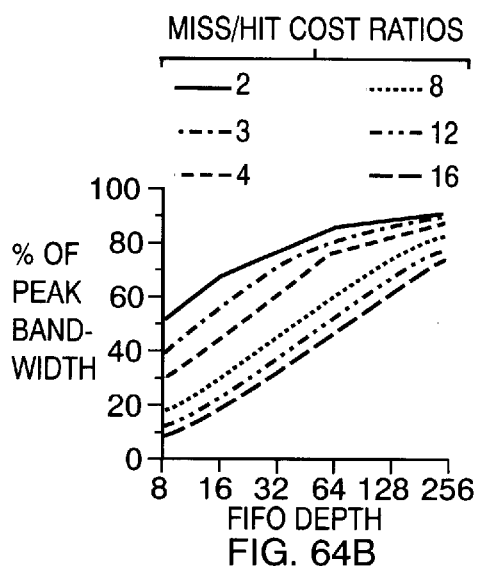
Figure 64C:
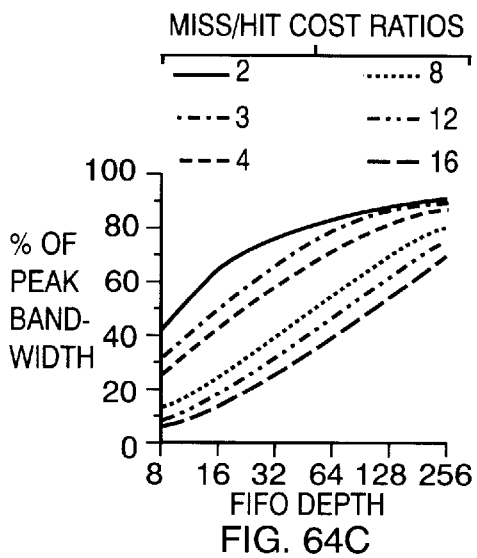
Figure 64D:
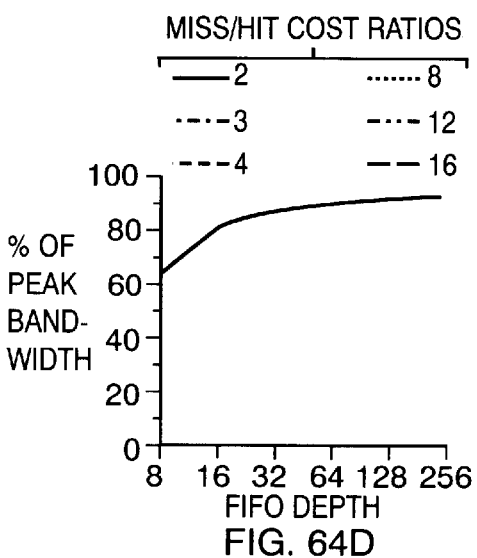
Figure 64E:
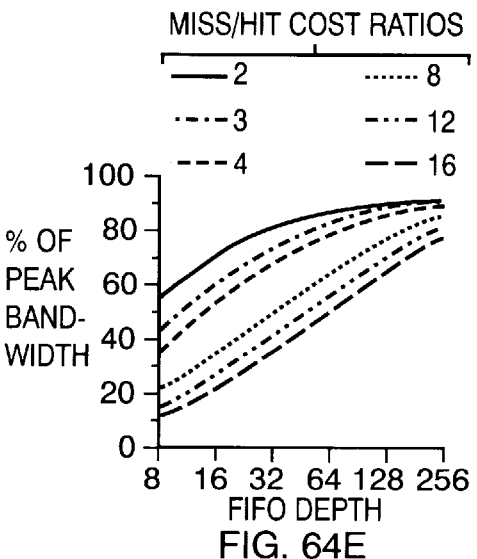
Figure 64F:
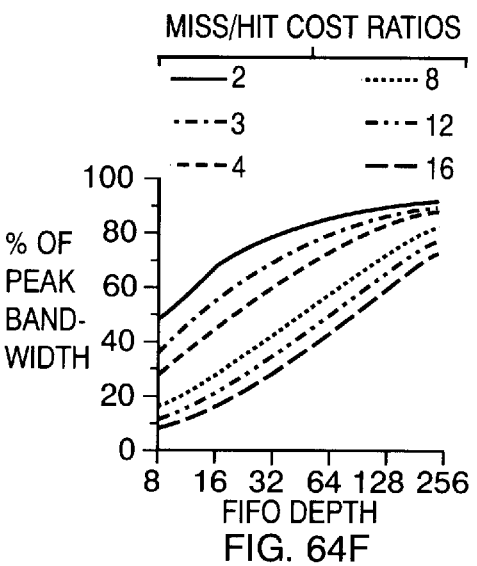
Figure 65A:
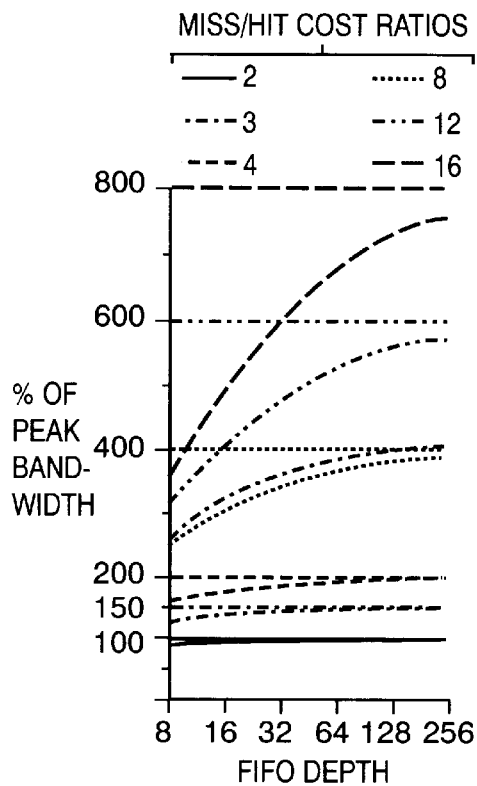
Figure 65B:
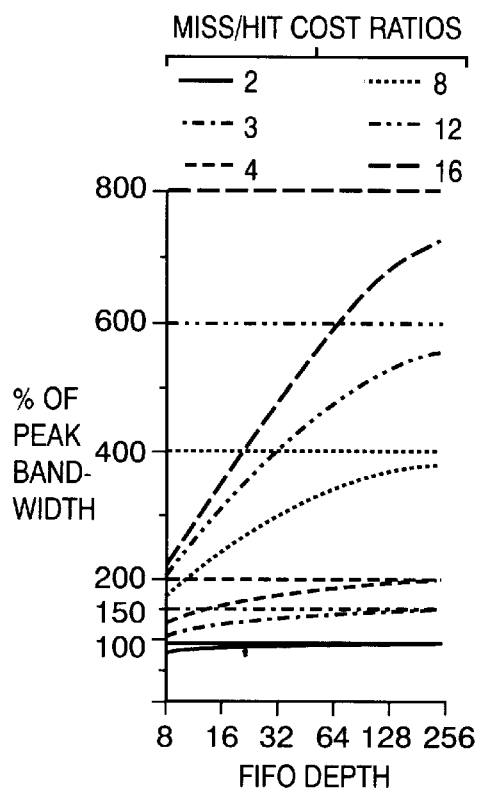
Figure 65C:
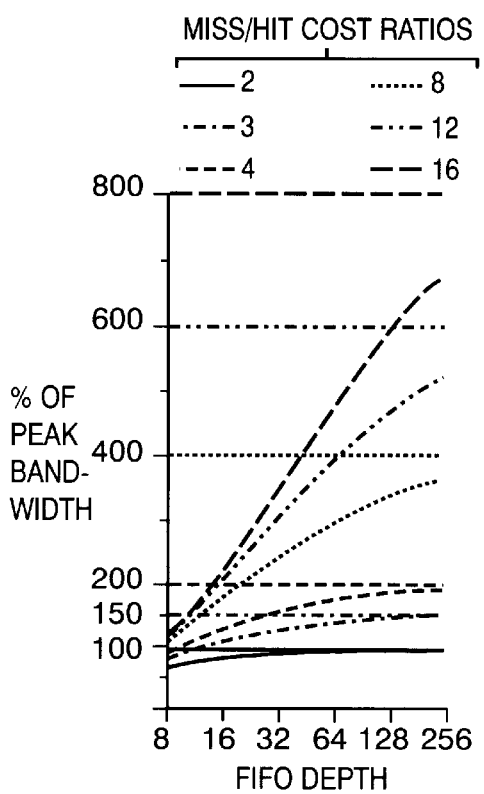
Figure 65D:
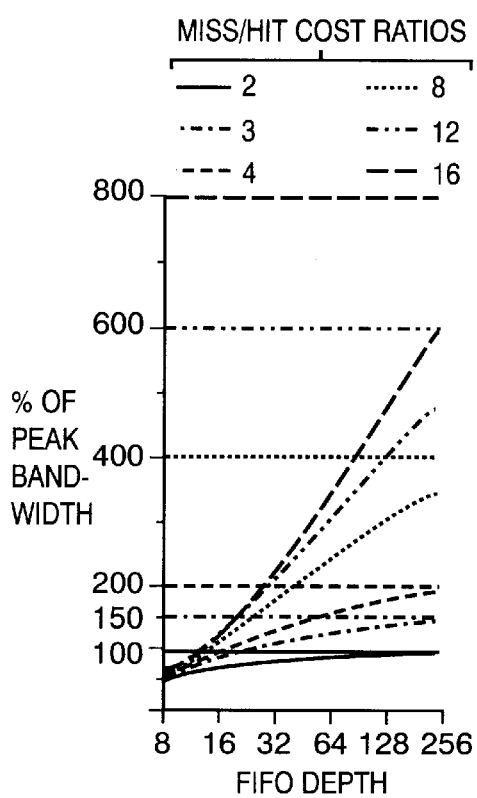

Algorithm A2 is a slightly more sophisticated version of A1, incorporating a threshold similar to that of the algorithms in Group 3. If the SMC determines that the next access from the current FIFO will generate a DRAM page miss, it decides whether or not to switch to a different FIFO. When it must issue an access that misses a bank's current page, it attempts to choose the access from a FIFO that contains ready accesses equal to at least half its depth. If the current FIFO requires enough service, the access is issued for it. Otherwise the SMC looks at the next FIFO in sequence, and so on. If no FIFOs meet the threshold, the algorithm issues no accesses at that time. Performance of this algorithm is illustrated in FIGS. 9, 13 and 16. As expected, simulation results for these algorithms exhibit the same degradation in performance that were seen with many of the other algorithms for shallow FIFOs on memory systems with a high degree of concurrency.

For long vectors, performance tends to be lower than that of Algorithm P1 for most benchmarks run with FIFOs up to 32 double-words deep. Hydro is the exception to this:

Algorithm A1 out performs the Group 1 schemes for all FIFO depths and memory systems. For deeper FIFOs, A1's performance for all benchmarks is within a few percent of that for the Group 4 algorithms, but for shallow FIFOs (especially on a memory system with many banks), its performance dips to 16.9% of peak less.

For medium vectors, performance again tends to be lower than that of the Group 1 algorithms for FIFOs of depth eight, sixteen, and thirty-two. When compared with Group 4, these algorithms provide virtually identical performance for deeper FIFOs, but performance is often over 10% of peak worse for shallow FIFOs and higher interleavings.

Short vector performance is similar to that of Algorithm P1, but A1 performed worse in a few instances. Most benchmarks fare worse with eight-deep FIFOs, regardless of the number of banks in the memory system. A1's performance on the swap kernel on a two-bank system is about 5% of peak below that of P1's.

On long vectors, A2 performs almost identically to A1. On medium vectors, however, A2 fares significantly worse for deeper FIFOs on the copy benchmark. Smaller drops in performance are evident for the swap and hydro benchmarks for FIFOs of sixty-four or more double-words. Medium vector performance for the other benchmarks is about the same as for A1, with performance generally dropping by less than 2% of attainable bandwidth. On short vectors, the bandwidth delivered by A2 on the copy benchmark is much lower—almost 20% of peak difference for a single-module system. A2 performs about the same as A1 on the scale benchmark, and performance for the two algorithms is similar for the daxpy, vaxpy, and swap kernels with FIFOs at least sixteen deep. A2 consistently out performs A1 for very shallow FIFOs and 8-bank interleavings, and for swap in general on all but the single-bank memory (but only by one or two percent of peak, in the latter case). Neither of these is a strong argument in favor of A2.

TABLE 6

Performance of Scheme A1 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | − | | − | | | |
| | 2 | + | | | | | + | + | + | + | + | |
| | 4 | +1.0 | | | | | | + | + | + | + | + |
| | 8 | −10.0 | + | | | | −13.8 | + | | | | |
| daxpy | 1 | +1.2 | + | | | | − | − | − | + | + | + |
| | 2 | −2.6 | − | +1.2 | | | −3.4 | −2.2 | −1.1 | − | | + |
| | 4 | −9.6 | −2.6 | | | | −11.5 | −5.4 | −2.1 | −2.0 | −1.0 | − |
| | 8 | −12.6 | −7.1 | −4.1 | | | −10.1 | −11.5 | −6.0 | −2.1 | −2.1 | − |
| hydro | 1 | | | | | | − | − | − | − | | + |
| | 2 | +2.4 | +2.7 | | | | +4.6 | +4.6 | +4.2 | +3.1 | +2.6 | +2.0 |
| | 4 | −1.5 | +4.4 | | | | | +9.3 | +5.6 | +5.0 | +0.0 | +5.0 |
| | 8 | −2.8 | −1.7 | + | −4.7 | | −2.0 | +2.1 | +8.0 | +11.7 | +9.6 | +8.2 |
| scale | 1 | | | | | | | | | | | |
| | 2 | −6.0 | −2.7 | − | − | − | −8.6 | −3.2 | −1.0 | − | − | − |
| | 4 | −11.0 | −4.0 | − | − | − | −14.1 | −0.0 | −3.2 | −1.5 | − | − |
| | 8 | −9.1 | −0.5 | +1.0 | +1.0 | +1.9 | −13.3 | −14.2 | −0.0 | −3.2 | −1.5 | − |
| swap | 1 | − | | | | | − | | − | − | − | + |
| | 2 | −5.5 | −1.4 | −1.5 | − | | −4.7 | −2.1 | −1.6 | − | − | + |
| | 4 | −0.1 | −4.0 | −1.6 | − | + | −6.7 | −5.9 | −1.0 | −1.4 | − | |
| | 8 | −10.0 | −0.9 | −2.5 | − | −1.4 | <20.7 | −0.0 | −5.9 | −2.5 | −1.6 | − |
| vaxpy | 1 | + | + | | | | − | − | − | | + | + |
| | 2 | − | − | −1.0 | − | − | −1.7 | − | − | − | − | + |
| | 4 | −5.2 | −4.0 | −1.1 | − | − | −7.5 | −4.4 | −2.2 | −1.1 | − | + |
| | 8 | −5.1 | −4.0 | − | − | − | −6.2 | −10.4 | −2.3 | −2.7 | −1.9 | − |

TABLE 7

Performance of Scheme A2 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | −11.9 | − | | | | | |
| | 2 | + | −2.5 | | | −11.9 | | + | + | − | − | + |
| | 4 | +1.0 | − | | | −11.5 | | + | + | − | − | + |
| | 8 | −10.9 | + | | | −0.4 | −13.8 | − | − | − | − | |
| daxpy | 1 | +1.2 | + | | | | − | − | − | + | + | + |
| | 2 | −2.6 | − | +1.2 | | | −3.4 | −2.2 | −1.1 | − | − | + |
| | 4 | −9.0 | −2.6 | | | | −11.5 | −5.4 | −2.1 | −2.0 | − | − |
| | 8 | −11.5 | −7.1 | −4.1 | | | −16.1 | −11.5 | −6.0 | −2.1 | −2.1 | − |
| hydro | 1 | | | | | | | | | | | − |
| | 2 | −4.9 | +3.3 | − | − | | +4.6 | +4.8 | +4.2 | +3.1 | +2.0 | +2.0 |
| | 4 | −1.5 | +4.0 | −1.0 | −2.4 | − | | +0.3 | +5.5 | +5.0 | +6.0 | +5.0 |
| | 8 | −1.7 | −1.7 | + | −8.2 | −2.0 | −2.6 | +2.1 | +8.3 | +11.7 | +10.6 | +8.2 |
| scale | 1 | | | | | | | | | | | |
| | 2 | −0.0 | −2.7 | − | − | − | −0.0 | −3.1 | −1.6 | − | − | − |
| | 4 | −11.0 | −4.0 | − | − | − | −14.1 | −0.5 | −3.1 | −1.5 | − | − |
| | 8 | −9.1 | −0.5 | +1.0 | +1.0 | +1.0 | −13.3 | −14.2 | −8.6 | −3.2 | −1.5 | − |
| swap | 1 | − | − | − | −3.5 | − | − | − | − | − | − | + |
| | 2 | −5.3 | −1.9 | −2.2 | −3.3 | − | −5.6 | −2.2 | −1.8 | − | − | + |
| | 4 | −8.3 | −4.9 | −1.5 | −2.0 | − | −0.7 | −5.9 | −1.9 | −1.4 | − | |
| | 8 | −14.7 | −6.1 | −3.6 | − | −1.8 | −19.9 | −8.6 | −5.9 | −2.6 | −1.6 | −1.0 |
| vaxpy | 1 | + | + | | | | + | − | − | − | − | − |
| | 2 | −2.8 | − | − | − | − | −2.2 | −1.0 | −1.4 | − | − | + |
| | 4 | −5.9 | −3.4 | − | − | − | −7.5 | −2.2 | −2.2 | −1.7 | − | − |
| | 8 | −4.4 | −7.0 | + | − | − | −8.2 | −10.4 | −2.3 | −2.7 | −1.9 | − |

Performance of the different access ordering schemes tends to be very similar. Herein is summarized the performance of the remaining five FIFO-selection algorithms (6 through 10) when paired with the T bank-selection scheme. Table 2 through 7 indicate relative performance of these schemes as compared to Scheme T1.

Algorithm 6 is identical to Algorithm 1, except that the search for the FIFO requiring the most service from the current bank begins with the last FIFO accessed by any bank. Performance of Algorithm 6 is summarized in Table 8.

Algorithm 7 is similar, except that when a page-miss is inevitable, it chooses the next access from the FIFO requiring the most service from all banks, starting the search with the last FIFO accessed by the current bank. Algorithm 8 is identical, except that the search for the FIFO requiring the most service begins with the last FIFO accessed by any bank. Performance for Algorithms 7 and 8 are summarized in Tables 9 and 10 respectively.

Algorithm 10 resembles Algorithm 5 in that neither explicitly tries to initiate accesses that hit the current DRAM page. Algorithm 10 issues the next access it finds, and considers the FIFOs in round-robin order beginning with the last FIFO accessed by any bank. Algorithm 5 begins its search with the last FIFO accessed by the current bank. Algorithm 10's performance is summarized in Table 12.

TABLE 8

Performance of Scheme T6 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | | | | | | |
| | 2 | | | | | | | | | | | |
| | 4 | | | | | | | | | | | |
| | 8 | | | | | | | | | | | |
| daxpy | 1 | | | | | | | | | | | |
| | 2 | | | | | | | | | | + | |
| | 4 | | | | | | | | − | | | |
| | 8 | | | | | | | | | | | |
| hydro | 1 | | | | | | | | | | | |
| | 2 | | | | | | | | | | | |
| | 4 | | | | | | | | | | | |
| | 8 | | | | | | | | + | | | |

TABLE 8-continued

Performance of Scheme T6 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| scale | 1 | | | | | | | | | | | |
| | 2 | | | | | | | | | | | |
| | 4 | | | | | | | | | | | |
| | 8 | −8.3 | | | | | −13.5 | | | | | |
| swap | 1 | | | | | | | | | | | |
| | 2 | | +1.1 | | | | | − | + | + | − | − |
| | 4 | | | | | | | − | + | + | + | | |
| | 8 | | | | | | | | | | | + | + |
| vaxpy | 1 | | | | | | | | | | | | |
| | 2 | | | | | | | + | + | + | | | |
| | 4 | | | | | | | + | + | + | + | + | − |
| | 8 | −1.2 | | | | | | − | | + | | | |

TABLE 9

Performance of Scheme T7 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | | | | | | |
| | 2 | | | | | | − | + | + | + | + | + |
| | 4 | | | | | | + | + | + | + | + | + |
| | 8 | | | | | | | | | | | |
| daxpy | 1 | | | | | | | | | | | |
| | 2 | +1.4 | + | − | | | +1.4 | + | + | + | + | + |
| | 4 | −2.5 | + | +1.8 | | | −1.7 | + | − | + | + | + |
| | 8 | −4.4 | −3.3 | −3.4 | | | −6.8 | −4.4 | − | − | | + |
| hydro | 1 | | | | | | | | | | | |
| | 2 | +3.4 | +4.2 | +2.3 | | | +7.0 | +6.5 | +5.2 | +3.3 | +2.8 | +1.7 |
| | 4 | −1.4 | +1.2 | −1.9 | | | −1.3 | +4.6 | +7.1 | +5.9 | +5.8 | +5.0 |
| | 8 | +1.5 | −1.9 | | −3.6 | | +2.6 | + | +1.0 | +13.2 | +7.5 | +4.8 |
| scale | 1 | | | | | | | | | | | |
| | 2 | | | | | | + | + | + | + | + | + |
| | 4 | | | | | | + | + | + | + | + | + |
| | 8 | | | | | | | | | | | |
| swap | 1 | | | | | | | | | | | |
| | 2 | − | | | | | + | − | + | + | + | + |
| | 4 | | −1.5 | | | | − | − | − | + | + | + |
| | 8 | −6.6 | | | | | −11.2 | | − | − | − | − |
| vaxpy | 1 | | | | | | | | | | | |
| | 2 | −2.0 | | −4.6 | − | − | −1.1 | + | + | − | − | + |
| | 4 | −6.5 | −7.7 | −4.9 | − | | −6.6 | −6.5 | −3.9 | − | − | − |
| | 8 | −1.7 | −5.9 | −2.3 | + | + | −2.9 | −10.2 | −5.8 | −2.2 | − | −2.4 |

TABLE 10

Performance of Scheme T8 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | | | | | | |
| | 2 | | | | | | − | + | + | + | + | + |

TABLE 10-continued

Performance of Scheme T8 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| | 4 | | | | | | + | + | + | + | + | + |
| | 8 | | | | | | | | | | | |
| daxpy | 1 | | | | | | | | | | | |
| | 2 | +1.4 | + | − | | | +1.4 | + | + | + | + | + |
| | 4 | −1.6 | | −1.6 | | | + | +1.0 | − | + | − | + |
| | 8 | −9.1 | −2.4 | −3.3 | | | −12.8 | + | − | − | | + |
| hydro | 1 | | | | | | | | | | | |
| | 2 | +4.1 | +4.2 | +2.3 | | | +7.3 | +6.5 | +5.2 | +3.3 | +2.8 | +1.7 |
| | 4 | − | +2.7 | −3.8 | | | − | +3.6 | +8.9 | +5.9 | +5.8 | +5.2 |
| | 8 | +1.1 | −1.7 | −4.3 | −3.6 | | +2.6 | + | +1.0 | +13.2 | +10.3 | +5.5 |
| scale | 1 | | | | | | | | | | | |
| | 2 | | | | | | + | + | + | + | + | + |
| | 4 | | | | | | + | + | + | + | + | + |
| | 8 | −8.3 | | | | | −13.3 | | | | | |
| swap | 1 | | | | | | | | | | | |
| | 2 | | | | | | + | − | + | + | + | + |
| | 4 | | | | | | | + | +1.1 | + | + | + |
| | 8 | −6.6 | | | | | −10.0 | | | + | + | + |
| vaxpy | 1 | | | | | | | | | | | |
| | 2 | −1.0 | + | −4.6 | − | − | −1.1 | + | + | − | − | + |
| | 4 | −7.4 | −4.7 | −5.3 | | | −6.6 | −6.5 | −3.9 | − | − | − |
| | 8 | −1.6 | −6.3 | −4.1 | −2.3 | | −2.9 | −10.2 | −5.6 | −2.2 | − | −2.4 |

Algorithm 9 resembles Algorithm 4, in that it tries to issue accesses that hit the current DRAM page, but when it cannot, it chooses the next access found. Algorithm 4 begins its search for this access with the last FIFO accessed by the current bank while Algorithm 9 begins with the last FIFO accessed by any bank. Table 11 summarizes this algorithm's performance.

TABLE 11

Performance of Scheme T9 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | − | | | | | − |
| | 2 | | | | | | | + | + | + | + | + |
| | 4 | | | | | | + | + | + | + | + | + |
| | 8 | | | | | | | | | | | |
| daxpy | 1 | | | | | | − | − | − | − | − | − |
| | 2 | | | | | | + | − | + | + | + | + |
| | 4 | | | | | | | + | | + | + | + |
| | 8 | + | | −1.3 | | | − | | | | | |
| hydro | 1 | | | | | | | | | | | |
| | 2 | +4.9 | +4.2 | +1.4 | | | +7.2 | +6.5 | +5.3 | +3.3 | +3.0 | +2.2 |
| | 4 | +4.5 | +3.0 | +2.1 | | | +7.1 | +10.2 | +7.2 | +6.2 | +6.5 | +5.3 |
| | 8 | + | +2.9 | +2.4 | −3.6 | | + | +9.2 | +10.4 | +13.2 | +10.0 | +0.8 |
| scale | 1 | | | | | | | | | | | |
| | 2 | | | | | | + | + | + | + | + | + |
| | 4 | | | | | | + | + | + | + | + | + |
| | 8 | −6.3 | | | | | −13.3 | | | | | |
| swap | 1 | | | | | | − | − | − | − | − | − |
| | 2 | − | | | | | + | + | + | + | + | + |
| | 4 | | | +1.9 | | | | + | + | + | + | + |
| | 8 | −3.0 | − | | | | −0.0 | | | | + | + |
| vaxpy | 1 | | | | | | − | − | − | − | + | + |
| | 2 | −1.2 | | | | | + | + | + | + | + | + |
| | 4 | | | | | | + | + | −1.4 | − | + | + |
| | 8 | −1.4 | | −2.4 | | | + | | − | + | | |

TABLE 12

Performance of Scheme T10 with Respect to T1
Differences in Attained Percentage of Peak Bandwidth

| benchmark | banks | medium vectors FIFO depth | | | | | long vectors FIFO depth | | | | | |
|---|---|---|---|---|---|---|---|---|---|---|---|---|
| | | 8 | 10 | 32 | 64 | 120 | 8 | 16 | 32 | 61 | 128 | 256 |
| copy | 1 | | | | | | − | | − | | | |
| | 2 | | | | | | −2.8 | −1.2 | + | − | + | + |
| | 4 | | | | | | + | + | + | + | + | + |
| | 8 | | | | | | | | | | | |
| daxpy | 1 | +1.2 | + | | | | − | − | − | − | + | + |
| | 2 | −1.6 | + | +1.2 | | | −4.5 | − | + | + | + | + |
| | 4 | −4.6 | −3.7 | −1.1 | | | −5.5 | −2.9 | − | − | + | + |
| | 8 | −11.9 | −4.2 | −7.2 | −4.7 | | −17.6 | −4.4 | −2.0 | − | − | 0.2 |
| hydro | 1 | | | | | | − | − | − | − | − | + |
| | 2 | +4.0 | +4.2 | +1.4 | | | +5.8 | +6.0 | +5.1 | +3.3 | +2.90 | +2.2 |
| | 4 | −7.7 | +3.7 | +2.1 | | | −2.3 | +6.5 | +6.5 | +5.9 | +6.5 | +5.3 |
| | 8 | −2.3 | −7.7 | −2.8 | −10.7 | | −2.8 | − | +0.5 | +12.7 | +10.4 | +8.7 |
| scale | 1 | | | | | | | | | | | |
| | 2 | | | | | | + | + | + | + | + | + |
| | 4 | | | | | | + | + | + | + | + | + |
| | 8 | −8.3 | | | | | −13.3 | | | | | |
| swap | 1 | − | | | | | − | − | − | − | − | + |
| | 2 | −3.4 | −1.0 | | | | −3.0 | −1.7 | − | − | + | + |
| | 4 | −10.8 | −7.1 | | | | −8.7 | −4.0 | −1.5 | − | − | + |
| | 8 | −19.9 | −10.6 | −0.2 | −0.0 | −10.1 | −29.2 | −10.2 | −15.6 | −1.4 | − | − |
| vaxpy | 1 | + | + | | | | − | , | − | | + | + |
| | 2 | + | + | + | + | | −5.4 | −0.2 | + | + | + | + |
| | 4 | −9.0 | −10.4 | | + | | −11.7 | −5.0 | | | − | + | + |
| | 8 | −4.3 | −14.8 | −3.0 | −3.9 | + | −6.2 | −10.2 | −5.0 | − | − | + |

Algorithms 1, 2, 3, 4, 5, and 7 thus use a local FIFO priority, whereas the other algorithms use a global FIFO priority. Likewise, schemes 1, 2, 3, and 6 uses local (subFIFO) status information to choose the next "best" access. The others use global (FIFO) status information to make this decision. of these algorithms, only T9 and T10 represent viable alternatives to the schemes T1–T3 and T6. Algorithm T6 offers no real advantage as its performance is almost identical to T1's. Algorithms T7 and T8 perform inconsistently in comparison to T1, sometimes yielding results several percentage points lower even for relatively deep FIFOS. They both perform better for the hydro benchmark and long vectors, but their performance on the other benchmarks, and even hydro with shorter vectors, is unpredictable, and unimpressive. Algorithm T9, on the other hand, only performs worse for very shallow FIFOs and memory systems with many banks. In general, its performance is competitive with the schemes from the previous section, although Algorithm T4 tends to perform slightly better in general for the utilized benchmarks. Algorithm T10 performs much worse for shallow FIFOs and high interleaving factors, but if it were sufficiently cheap to implement, it might be a reasonable alternative, provided deep FIFOs were also implemented.

FIG. 61 through FIG. 65 illustrate SMC performance for long vectors (10,000 elements) as the memory's DRAM page-miss to page-hit cost ratio increases. As before, all performance curves are given as a percentage of peak bandwidth, thus for the systems with a miss/hit cost ratio of sixteen, it's as if the page-misses required sixteen times as long to service. FIG. 61 through FIG. 63 may therefore appear a bit misleading, since the miss/hit ratio is likely to increase primarily as the result of a reduction of the page-hit time, rather than an increase in the page-miss time. At a ratio of sixteen, the SMC is delivering a somewhat smaller percentage of a much larger available bandwidth which results in a significant net increase. To illustrate this, FIG. 65 shows the performance of hydro for long vectors if the page-miss cost is held constant and the page-hit cost decreased, increasing the total bandwidth proportionately.

If the number of modules fixed is held and the page-miss/page-hit cost ratio increased, deeper FIFOs are required in order to amortize the page-miss costs. Relative performance is approximately constant if FIFO depth is scaled linearly with miss/hit cost. The near-horizontal gray lines in FIG. 61(a), FIG. 61(c), and FIG. 61(e) highlight this effect. Consider the hydro benchmark, for example. For an eight-bank memory with a miss/hit cost ratio of sixteen, an SMC with 256-deep FIFOs delivers 75.11% of peak bandwidth. With FIFOs that are 128 deep, the SMC achieves a similar performance—75.93%—with a miss/hit cost ratio of eight. Likewise, when the miss/hit cost ratio is four and the FIFO depth is halved again, the SMC delivers 77.43% of peak bandwidth.

As the interleaving factor grows, so must the FIFO depth. This is evident in the results of all benchmarks, including scale, which nonetheless achieves near-optimal bandwidth for all memory systems. Since this computation only involves one vector, every access after the first hits the current DRAM page. Performance is therefore invariant of the miss/hit cost ratio. For computations involving more than one vector, shallow buffers limit the number of page hits over which the SMC can amortize the cost of the inevitable page misses. Scale doesn't suffer from this, but its performance on the eight-bank memory system demonstrates another problem since with shallow FIFOs, the SMC cannot prefetch enough data to keep the processor from stalling. This inability to adequately overlap memory access with computation causes the benchmark to achieve over 20% less of the attainable bandwidth for eight- or sixteen-word buffers than it does for deeper FIFOs. Even the faster systems, those with a high interleaving factor or a high miss/hit cost ratio, still require only modest amounts of buffer storage.

The overwhelming similarity of the performance curves presented in the foregoing leads illustrates that neither the ordering strategy nor the processor's access pattern has a large effect on the SMC's ability to optimize bandwidth. In fact, the simpler algorithms usually do as well or better than their more sophisticated counterparts. For the benchmarks and memory systems simulated, algorithms involving a "threshold of service" requirement behave inconsistently, and generally fail to out perform the simpler schemes.

Explicitly trying to take advantage of the memory system's available concurrency by initiating accesses in parallel (P) turns out to be of no real benefit, and occasionally hinders performance. Given that the SMC can only process one access at a time, it makes sense to initiate only one access each bus cycle. Performance between the "greedy round-robin" (R) scheme and the simpler "token passing" (T) scheme is sufficiently similar that deciding which is preferable becomes a question of implementation cost. The additional complexity of implementing the former (R) scheme seems an unjustifiable expense, as the latter (T) scheme should prove simpler and indeed faster.

The choice of T4 or T5 over A1 depends on the complexity of the circuitry required to implement each. The bank-centric schemes, T4 and T5, give better overall performance, but if A1 is sufficiently inexpensive to implement, the cost/performance tradeoffs might be worthwhile.

The foregoing illustrates that FIFO depth must scale with the interleaving factor to achieve good performance on a memory system with a large number of banks. Even the best ordering algorithms will be stifled by inadequate buffer space. When faced with a choice between implementing a more complicated, and better-performing, access ordering scheme and building deeper FIFOs, the latter will generally yield better performance. Prefetching can be used in conjunction with the SMC to help compensate for the latency in FIFO references.

It has also been demonstrate that an SMC system causes no additional delay in responding to normal memory access requests, either scalar accesses or cache line accesses. Additionally, applications not using the SMC will incur no performance penalties.

An alternative to the dual controller implemention would be to use an associative buffer memory; only the control for accessing the memory would be the necessary.

The instant disclosure is scalable, allowing for practical reorderings for a broad range of scientific computations. Thus concurrency can be expanded as needed on the "memory side" of the SMC as needed, or at least until the performance of the SMC itself becomes the bottleneck. At that point, SMCs can be replicated on the bus. The information concerning future accesses can be broadcast and interpreted by those SMC's that control memories that contain data that will be accessed. There does not need to be a limit to the aggregate usable bandwidth of the system other than the bus itself, which presumably has been built to match the CPU.

The current trend is to simplify the hardware while increasing the complexity of the software and therefore the compiler is utilized to detect the ability to use the SMC. For certain applications, however, it may be beneficial to eliminate the compiler and incorporate the detection into the SMC hardware. The hardware can be designed to read the user program and use the SMC for all applications.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A memory controller for accessing memory, said memory controller comprising:
   at least one stream buffer, said at least one stream buffer being a FIFO and buffering data,
   control registers, said control registers receiving stream parameters from a data processor,
   a memory scheduling unit for decoupling memory access requests from a processor to enable access of data elements in an order that increases effective bandwidth over a program's natural order and that reduces average memory latency for data patterns,
   wherein a data processor sends said stream parameters to said control registers identifying data streams to be accessed and said memory scheduling unit generates memory addresses of the data elements based on said stream parameters and accesses the data elements in a dynamically determined order.

2. A method of accessing data comprising:
   a data processor,
   memory for storing data for use by said processor,
   a memory controller, said memory controller having stream buffers, said stream buffers buffering data,
      control registers, said control registers receiving stream parameters from said processor,
      a memory scheduling unit for dynamically decoupling, reordering and issuing
      accesses of data elements within patterns of memory accesses from said memory,
   a compiler, said compiler identifying said patterns of memory accesses, based on a user program, and generating instructions to transmit said memory access patterns to said memory controller,
   comprising the steps of:
      1. compiling user program code, consisting in part of:
         a. recognizing stream memory access patterns,
         b. generating machine instructions to cause said data processor to dynamically determine stream parameters based on said stream access patterns,
         c. generating machine instructions to transmit said stream parameters to said memory controller,
      2. initiating execution of a compiled user program by:
         a. executing machine instructions causing said data processor to calculate said parameters,
         b. executing said machine instructions in accordance with step 1(c) causing transmission of said stream parameters to said memory controller,
         c. receiving said stream parameters at said control registers,
         d. reading stream data elements by:
            accessing said data elements within said memory in an order dynamically determined by said memory scheduling unit,
            placing said data elements in said buffer,
            holding said data elements until said data elements are requested by said processor in said program's natural order,
            transmitting said data elements to said processor upon request for said data elements by said processor,
         e. writing data elements by:
            receiving said data elements in said buffer from said processor in said program's natural order,
            holding said data elements in said buffer,
            transmitting said data elements to said memory in an order dynamically determined by said memory controller,
            wherein data elements are accessed in said memory in an order determined by said memory scheduling unit.

3. The method of claim 2 further comprising the steps of using base address, stride, length and access mode as stream parameters, said stream parameters being of any length and stride representable within the capabilities of said data processor.

4. The method of claim 2 further comprising the step of said memory controller reading the data elements in said patterns from said memory in an order determined dynamically by said memory controller, said data elements being buffered in said memory controller until said processor reads said data elements in said program's natural order.

5. The method of claim 2 further comprising the step of said memory controller buffering said data elements transmitted from said processor in said program's natural order until written to said memory in an order determined dynamically by said memory controller.

6. The method of claim 2 wherein said step of activating a compiled user program further comprises specifying the reading or writing of said data elements to or from said memory.

7. The method of claim 2 further comprising the step of dynamically reordering said memory accesses to increase effective bandwidth over said program's natural order and reduce averaged memory latency for said data patterns.

* * * * *